United States Patent [19]
Honda et al.

[11] Patent Number: 5,583,418
[45] Date of Patent: Dec. 10, 1996

[54] BATTERY CHARGING STATION FOR ELECTRIC VEHICLES AND ELECTRIC VEHICLE USABLE THEREWITH

[75] Inventors: Satoshi Honda; Kenji Tamaki; Shoji Motodate; Yoshihiro Nakazawa; Kouichi Sugioka; Yoshinori Mita; Masao Ogawa, all of Saitama, Japan

[73] Assignee: Honda Giken Kogyo Kabushiki Kaisha, Tokyo, Japan

[21] Appl. No.: 214,752

[22] Filed: Mar. 18, 1994

Related U.S. Application Data

[62] Division of Ser. No. 891,948, Jun. 1, 1992, abandoned.

[30] Foreign Application Priority Data

| May 31, 1991 | [JP] | Japan | 3-155955 |
| Aug. 22, 1991 | [JP] | Japan | 3-233788 |
| Sep. 17, 1991 | [JP] | Japan | 3-262524 |

[51] Int. Cl.$^6$ ............................................. H02J 7/04
[52] U.S. Cl. .................................. 320/43; 320/2; 320/31
[58] Field of Search ................................ 320/2, 21, 31, 320/32, 43, 44, 39, 40

[56] References Cited

U.S. PATENT DOCUMENTS

| 3,773,131 | 11/1973 | Jaulmes | 180/34 |
| 4,216,839 | 8/1980 | Gould et al. | 180/65 R |
| 4,309,644 | 1/1982 | Reimers et al. | 320/2 X |
| 4,347,472 | 8/1982 | Lemelson | 320/2 |
| 4,406,342 | 9/1983 | Lacroix | 180/220 |
| 4,498,440 | 8/1984 | Evjen | 429/8 |
| 4,522,898 | 6/1985 | Esrom | 429/120 |
| 4,532,418 | 7/1985 | Messe et al. | 235/381 |
| 4,709,202 | 11/1987 | Koenck et al. | 320/43 |
| 4,800,328 | 1/1989 | Bolger et al. | 320/2 |
| 4,885,523 | 12/1989 | Koenck | 320/20 |
| 4,897,322 | 1/1990 | Jessen | 429/62 |
| 5,015,545 | 5/1991 | Brooks | 429/99 |
| 5,049,802 | 9/1991 | Mintus et al. | 320/2 |
| 5,082,075 | 1/1992 | Karolek et al. | 180/68.2 |
| 5,157,319 | 10/1992 | Klontz et al. | 320/2 |
| 5,202,617 | 4/1993 | Nor | 320/2 |

*Primary Examiner*—Robert Nappi

[57] ABSTRACT

An electric vehicle includes a wet type secondary battery wherein a battery housing is provided with electrode plates being operatively positioned within the battery housing. Connector terminals are operatively connected to respective electrode plates. The electrode plates are disposed in a horizontal plane when the battery housing is mounted relative to electric vehicle. A step floor is provided on the electric vehicle and operatively positioned relative to a lower portion of the electric vehicle wherein the battery housing is disposed below the step floor. A charging station is provided for charging the battery.

11 Claims, 46 Drawing Sheets

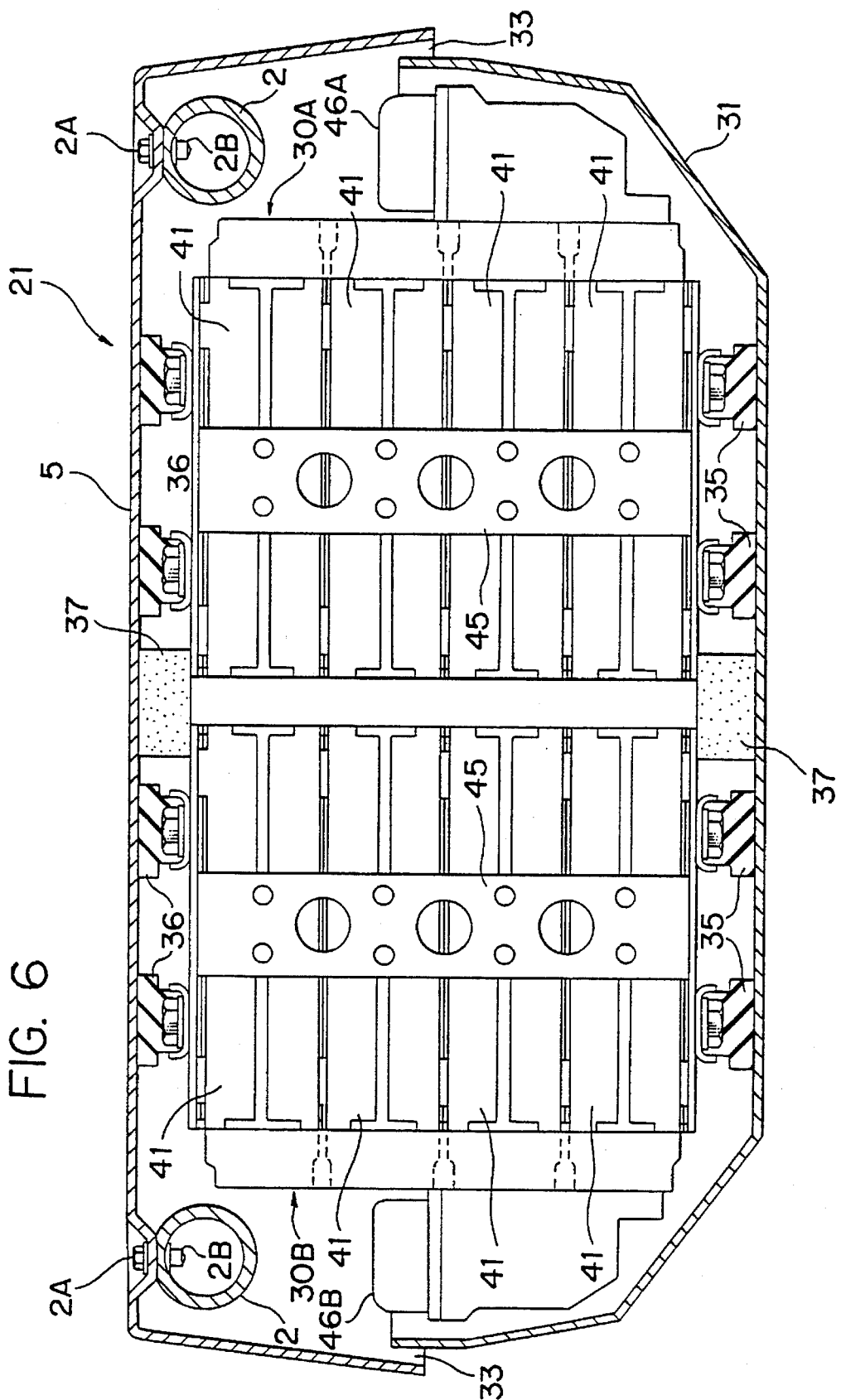

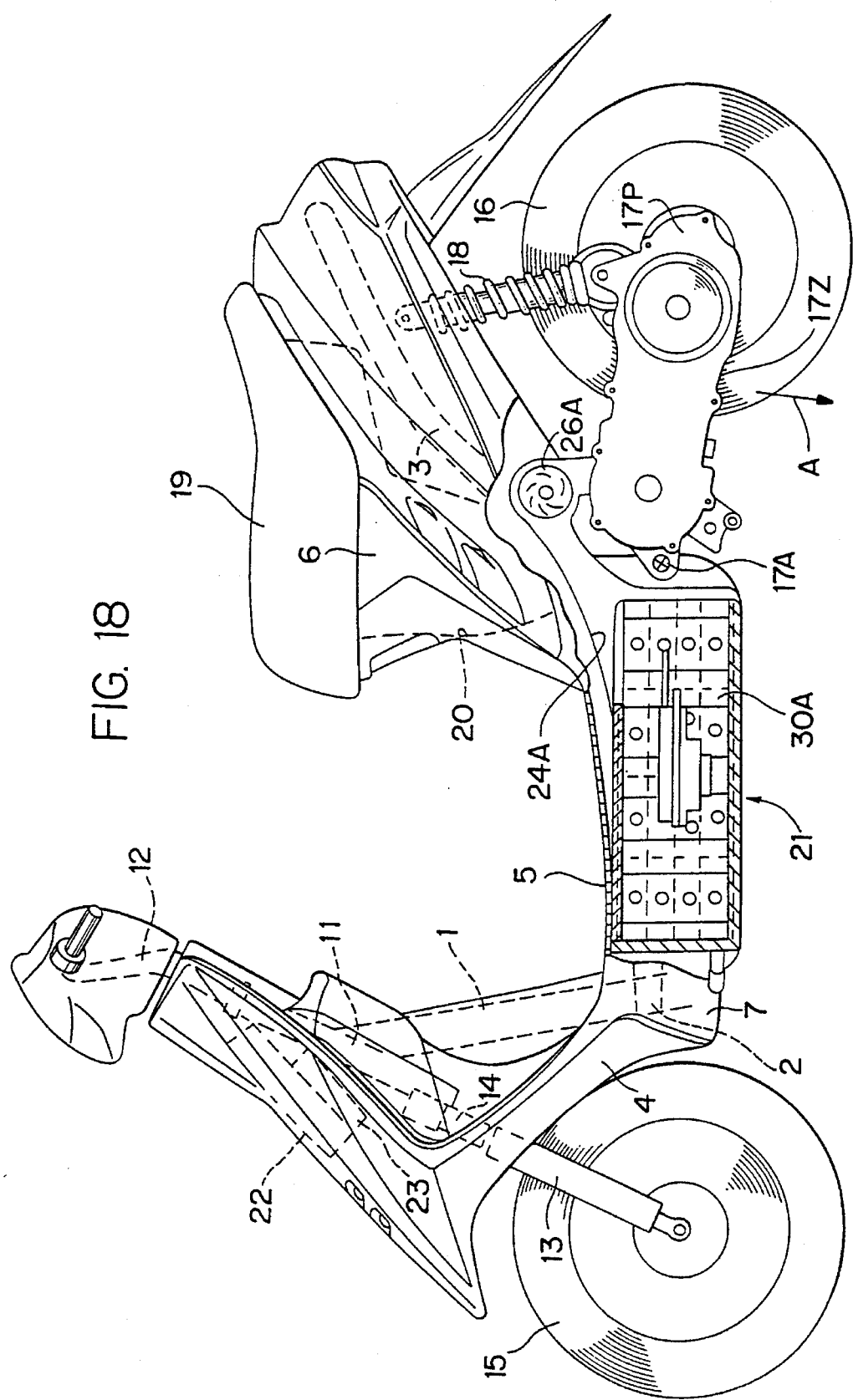

TO CHANGE OVER DISTRIBUTION SWITCH TO USE 4 CIRCUITS IN SERIES

REQUIRED VOLTAGE 200V—
REQUIRED CURRENT 100A

BATT 200V-100AH

REQUIRED VOLTAGE 50V
REQUIRED CURRENT 100A

BATT 50V-100AH

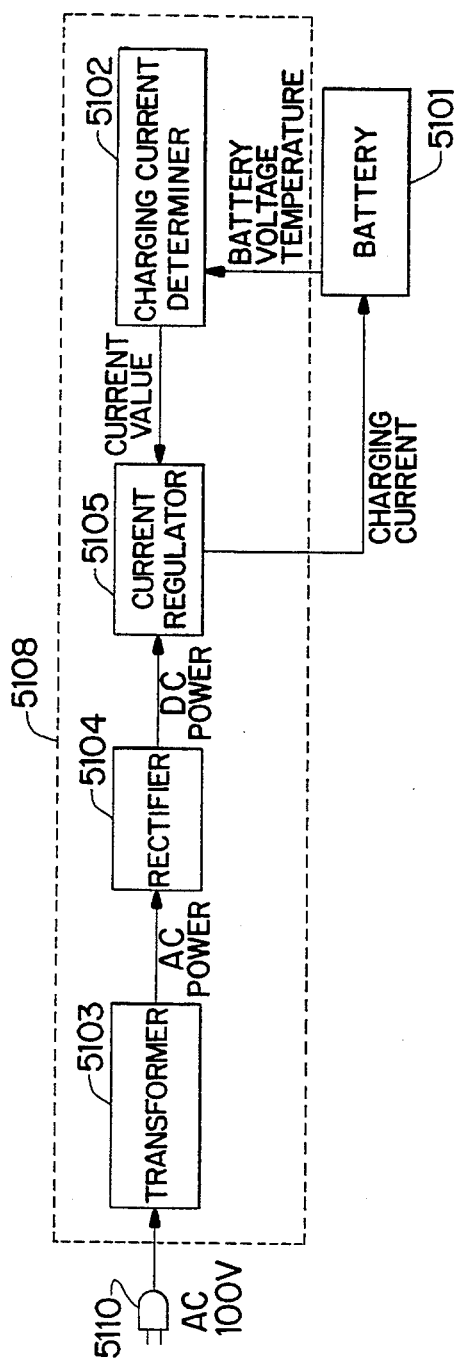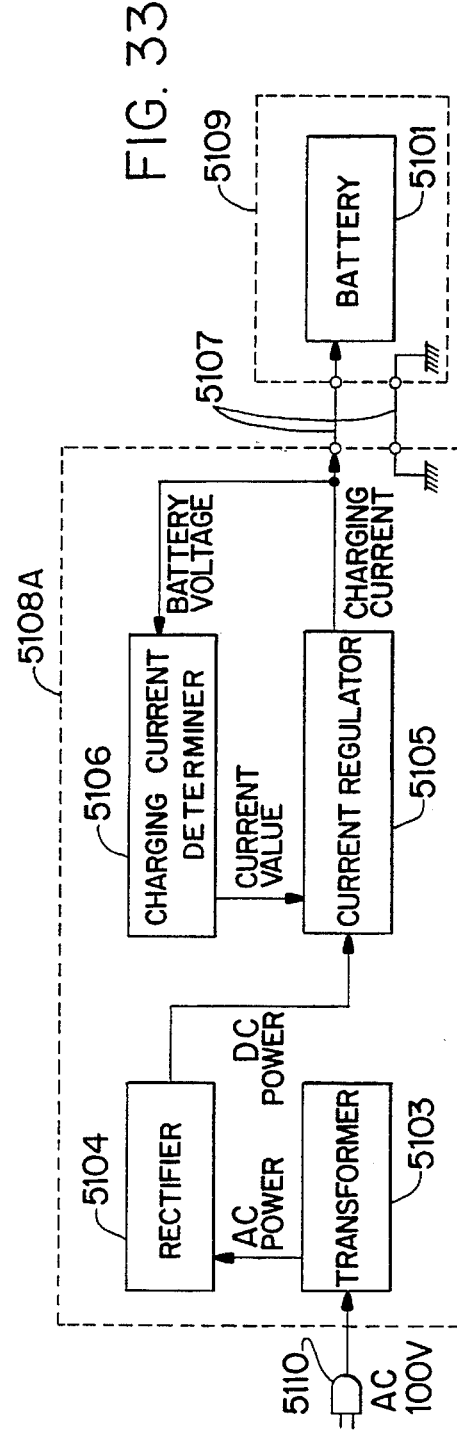

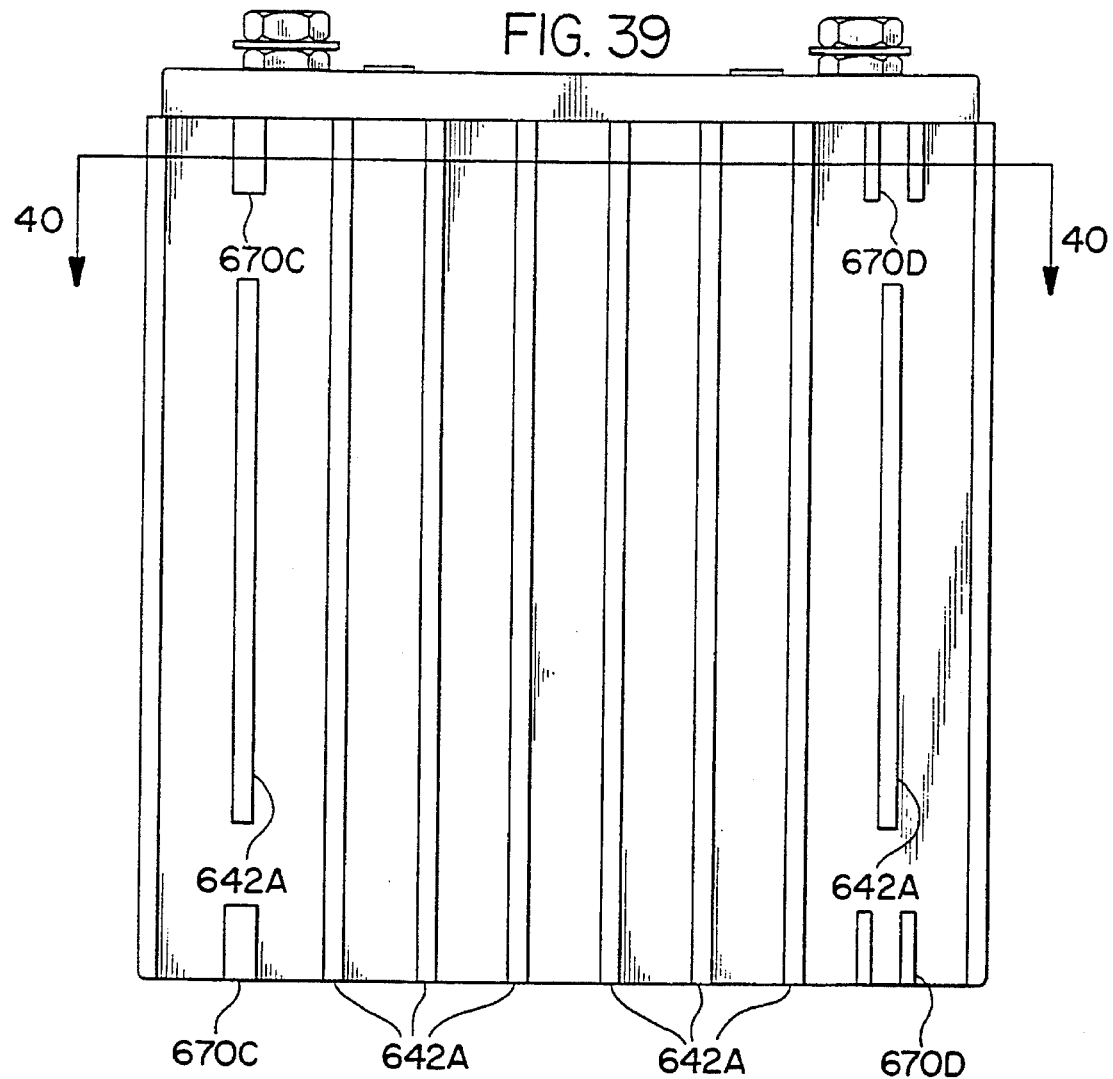
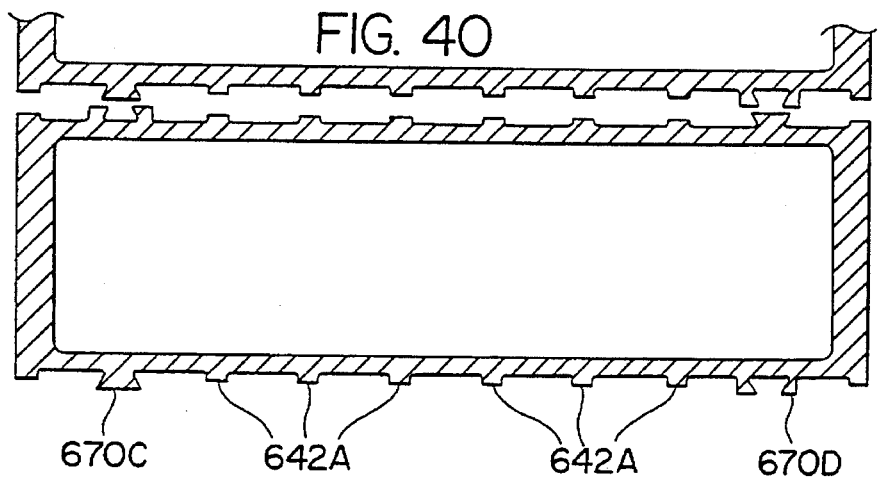

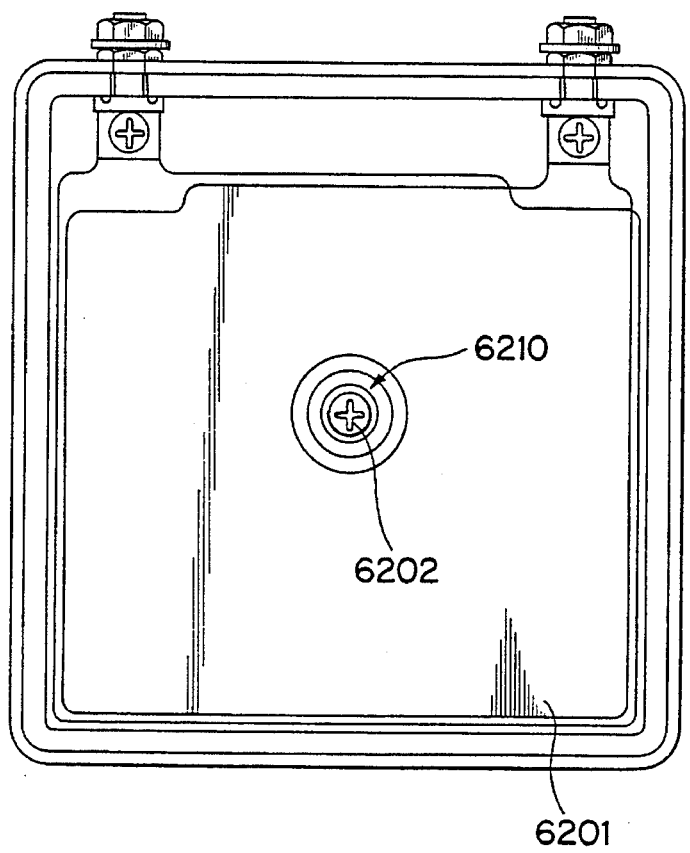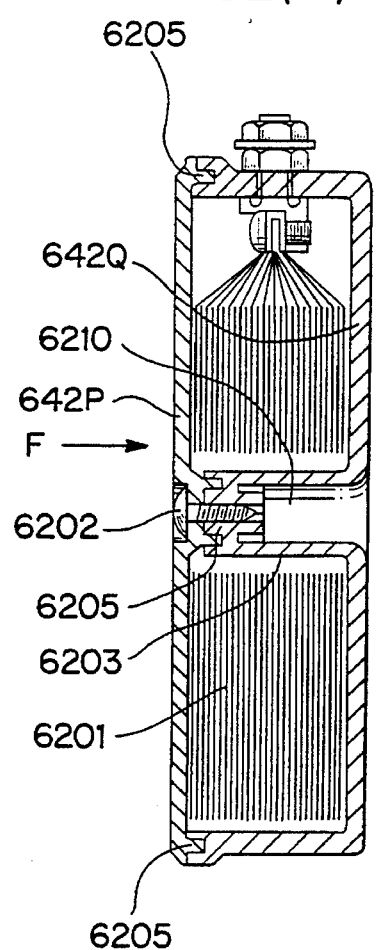
FIG. 62(a)
FIG. 62(b)

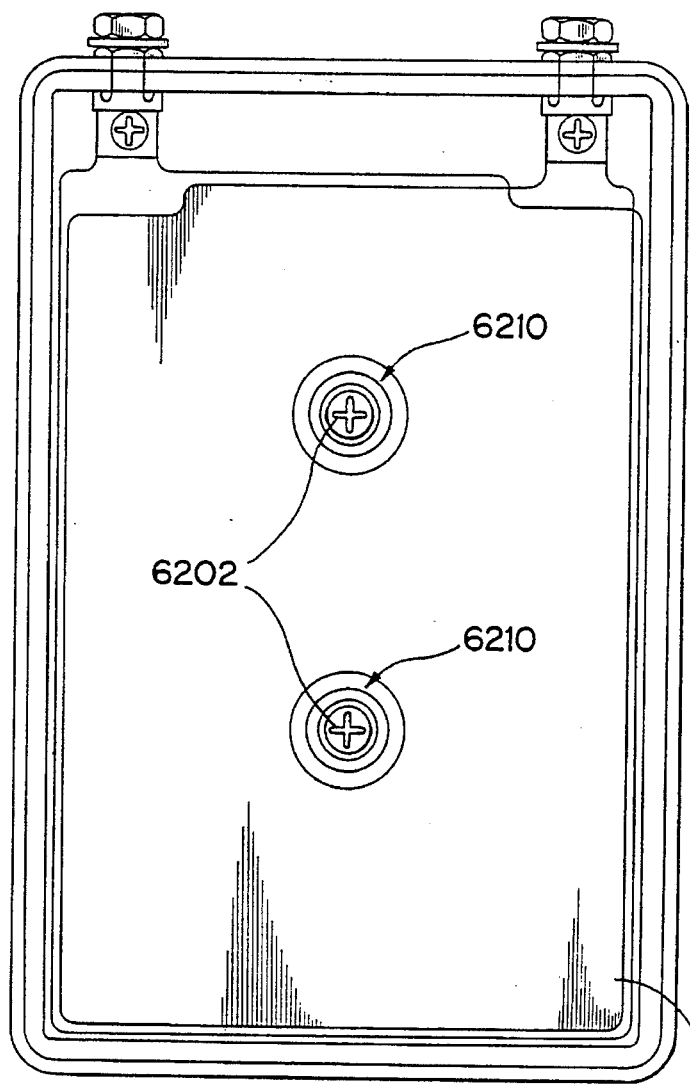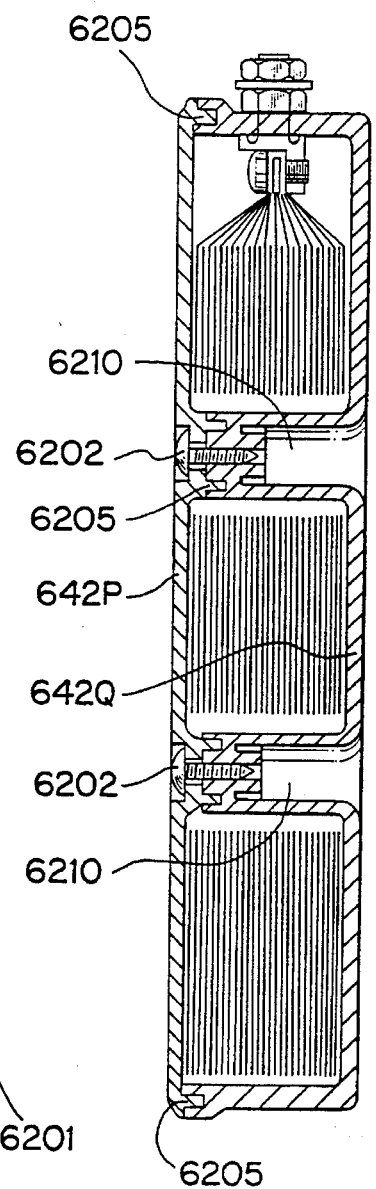

BATTERY CHARGING STATION FOR ELECTRIC VEHICLES AND ELECTRIC VEHICLE USABLE THEREWITH

This application is a divisional of application Ser. No. 07/891,948, filed on Jun. 1, 1992, the entire contents of which are hereby incorporated by reference now abandoned.

BACKGROUND OF THE INVENTION

1. Field of the Invention

This invention relates to an electric vehicle, and particularly to a wet type secondary battery which can prevent deterioration of the capacity of a battery to assure a long life.

2. Description of Background Art

A wet type secondary battery in which recharging is performed by a chemical action so that it can be utilized repetitively as a power source is used as an energy source for a drive motor for an electric vehicle or a power source for the starting of an internal combustion engine of a vehicle or for a light or the like.

A wet type secondary battery includes, for example, a nickel-zinc battery cell which employs nickel (Ni) for the positive electrode and employs zinc (Zn) as the negative electrode. Ordinary actions of the cell are indicated in chemical formulae 1.

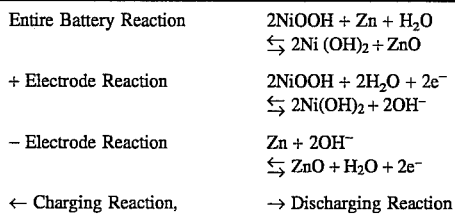

| Entire Battery Reaction | $2NiOOH + Zn + H_2O$ |
| --- | --- |
| | $\leftrightarrows 2Ni(OH)_2 + ZnO$ |
| + Electrode Reaction | $2NiOOH + 2H_2O + 2e^-$ |
| | $\leftrightarrows 2Ni(OH)_2 + 2OH^-$ |
| – Electrode Reaction | $Zn + 2OH^-$ |
| | $\leftrightarrows ZnO + H_2O + 2e^-$ |
| ← Charging Reaction, | → Discharging Reaction |

Further, such reactions as indicated in chemical formulae 2 occur at the last stage of charging.

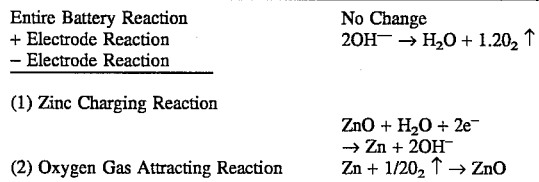

| Entire Battery Reaction | No Change |
| --- | --- |
| + Electrode Reaction | $2OH^- \rightarrow H_2O + 1.2O_2 \uparrow$ |
| – Electrode Reaction | |
| (1) Zinc Charging Reaction | $ZnO + H_2O + 2e^-$ |
| | $\rightarrow Zn + 2OH^-$ |
| (2) Oxygen Gas Attracting Reaction | $Zn + 1/2O_2 \uparrow \rightarrow ZnO$ |

Oxygen gas which is produced at the last stage of charging from the nickel electrode is produced due to a rise in a potential between the electrodes, and the quantity of charging electricity is decreased by an amount corresponding to the quantity of electricity flowing through the nickel electrode which is consumed for the production of oxygen gas. On the other hand, when oxygen gas produced at the nickel electrode is not absorbed by the zinc electrode, the zinc electrode accepts a charge corresponding to an amount by which the quantity of charging flows therethrough and it is overcharged over the nickel electrode. Consequently, an active substance of the zinc electrode is consumed, and the life expectancy of the wet type secondary electrode is reduced.

In order to eliminate such a disadvantage, the wet type secondary battery should be of an enclosed type so that oxygen gas produced at the nickel electrode may be absorbed by the zinc electrode. With such construction, a charging active material produced by overcharging is changed into a discharging active material, and then, charging amounts at the nickel and zinc electrodes are balanced at the same value. Consequently, a long life can be achieved.

However, even with such construction, if deposits produced at the zinc electrode grow until they reach the nickel electrode, short-circuiting in the cell occurs, and the wet type secondary battery cannot achieve its function any more.

Accordingly, in order to prevent such short-circuiting in the cell, a separator which has a predetermined physical strength to permit permeation of ions therethrough but which prevents permeation of a deposited material of zinc therethrough and which is low in gas permeability and is formed from a hydrophilic ion permeable film is disposed between the nickel electrode and the zinc electrode. Such a wet type secondary battery is disclosed, for example, in International Publication No. WO84/00642 which was filed through the Patent Cooperation Treaty.

When such a wet type secondary battery as described above is mounted on an electric vehicle, the battery is disposed such that electrode plates thereof are directed in a vertical direction. With such an orientation, electrolyte is likely insufficient at upper portions of the electrode plates. However, electrolyte is excessive at the lower portions of the electrode plates.

Since the sectional area of an ion passage is insufficient at a location at which electrolyte is insufficient, the internal resistance is increased to increase a difference in potential so that production of gas upon charging is increased. However, a reaction is likely to accelerate and heat generation is high upon discharging. On the other hand, at another location at which electrolyte is excessive, the internal resistance is low and the potential difference is low, but a condition wherein the zinc electrodes are surrounded by liquid is provided and the efficiency thereof in absorbing oxygen gas from the nickel electrodes is deteriorated.

If such a difference in reaction occurs on the same electrode plate, then consumption of an active material occurs from an upper portion of the electrode which is in an active condition, and reduction of the area of reaction, that is, reduction of the capacity, occurs at an early stage, which is not preferable.

Conventionally, various electric motorcycles and electric automobiles, hereinafter referred to as "electric vehicles," have been proposed as disclosed, for example, in Japanese Patent Application No. 3-105098. The electric vehicles are superior to vehicles on which internal combustion engines are mounted with regard to the level of exhaust gas and so forth and compatibility with diversification of energy resources.

In such electric vehicles, it is necessary to charge the battery mounted thereon. As one of charging methods therefor, there is a method wherein charging is performed using commercial power supplied from a domestic plug socket. With such charging method, a charger for charging is either carried on a vehicle or installed separately. See FIG. 34.

FIG. 32 is a block diagram showing the construction of a vehicle-carried charger. Referring to FIG. 32, a vehicle-carried charger 5108 includes a transformer 5103 including a plug 5110 to be connected to a domestic plug socket, a rectifier 5104, a current regulator 5105 and a charging current determiner means 5102. The charging current determiner means 5102 obtains information concerning the battery voltage, the battery temperature and so forth of the battery 5101, determines a charging current value in accordance with a predetermined technique and outputs this determination to the current regulator 5105 to control the current regulator 5105.

FIG. 33 is a block diagram showing construction of a separately installed charger. Referring to FIG. 33, similar reference characters to those of FIG. 32 denote similar or equivalent portions. Charging current determiner means 5106 of the separately installed charger 5108A detects, by way of a pair of power source cables 5107, a battery voltage of the battery 5101 mounted on an electric vehicle 5109. The charging current determiner means 5106 determines a charging current value from the detected battery voltage and controls the current regulator 5105 with the charging current value.

With such charging methods, the following problems occur. When a charger is mounted on a vehicle, the weight of the charger is a dead weight during traveling. Thus, there is a possibility that the charger may be damaged during the traveling of the vehicle. A vehicle-mounted charger must be selected taking its weight into consideration. Consequently, the current regulating capacity of the charger is restricted. As a result, the charging time is increased and the convenience of use is restricted.

While a separately installed charger does not have such a defect as a vehicle-mounted charger, the judgment of the completion of the charging of a battery is made by detection of a battery voltage which is performed by way of a power source cable interconnecting the battery and the charger or by management of a charging time. This system cannot accurately fully charge the battery due to a temperature variation in the battery or a voltage drop by the power source cable. Further, since a separately installed charger is manufactured in accordance with an electric vehicle to be used, it cannot be used for charging when the type of the battery such as lead, Ni-Cd, Ni-Zn or the like or the charging method is different or the voltage is different due to a difference of a cell.

For such a charging method, a system has been proposed wherein a charging station similar to a gasoline station adapted for internal combustion engine vehicles is installed and charging is performed by the charging station. An example of such charging station is shown in FIG. 34.

Referring to FIG. 34, a charging station 5111 has the function of connecting an electric vehicle 5201 thereto using a power source cable 5112 and supplying at least a charging current. In addition, the station has another function of measuring, in accordance with the necessity, the charged power and displaying a fee and so forth on a display panel 5111A.

Such a charging station 5111 is likely used to assure a cruising distance of a return path on the way of traveling of the electronic vehicle, for example, on the way of commuting or shopping, and so forth. Accordingly, it is desirable to employ a charger which is short in charging time and, in other words, can take a high charging current.

However, a charger of such a high current is not suitable as a vehicle-carried charger as described hereinabove with reference to FIG. 32. In addition, a charging method and/or a charging current are different for different types of electric vehicles. Thus, it is not suitable to provide a charger on a charging station side intended for use together with various electric vehicles.

The traveling distance of an electric vehicle relies upon the battery capacity. A battery of a large capacity is employed for an electric vehicle. However, if the battery is increased in size and the weight of the vehicle is increased, then the traveling distance is decreased as a result. Therefore, an expensive battery which is small in size but has a large capacity is employed as a battery for an electric vehicle. Accordingly, if a problem occurs with any one of the separators so that one of cells of the battery cannot be used any more, not only a heavy burden is economically imposed on a user but also heavy labor is required for exchanging the battery.

In view of such regards as described above, there is a tendency that, as a battery for an electric vehicle, a so-called assembly battery is utilized which is constituted from a plurality of small batteries, battery cells, which are electrically connected in series. If such an assembly battery is employed, in case only one of the cells is not available, it is only necessary to exchange the battery cell, and accordingly, the economic burden and the labor required for maintenance can be restricted to be a minimum.

SUMMARY AND OBJECTS OF THE INVENTION

The present invention has been made to solve the problems described above, and it is an object of the present invention to provide an electric vehicle wherein the reduction in capacity of a wet type secondary battery can be prevented.

In order to solve the problems, a wet type secondary battery is mounted on an electric vehicle such that the electrode plates thereof extend horizontally. The wet type secondary battery is disposed below a step floor.

The medium passageways for passing a cooling medium therethrough are formed between each adjacent one of a plurality of cells which constitute the wet type secondary battery. Each of the cells is constructed in an individual cell case and ribs are provided on outer peripheral portions of the cell case, and the wet type secondary battery is constructed by contacting the cell cases closely with each other such that the individual ribs are contacted with each other. Recessed portions and projected portions are formed on an outer periphery of each of the cell cases. Positioning of the cell cases is performed with the recessed portions fitted with the projected portions.

A fan or similar device is provided for compulsively passing a cooling medium into the medium passageways connected to the wet type secondary battery carried on the vehicle. The fan is energized during charging of the wet type secondary battery when the temperature of the wet type secondary battery exceeds a predetermined temperature. A duct is provided between the medium passageways and a power unit of the electric vehicle, and the fan is disposed in the duct.

In view of the fact that the wet type secondary battery is disposed horizontally, the distribution of electrolyte is leveled at different portions of the electrode plates. The wet type secondary battery is disposed below the step floor. Thus, the vehicle height and the center of gravity of the electric vehicle can be constructed at a lower level.

Since the medium passageways for passing a cooling medium therethrough are formed between each adjacent cell which constitute the wet type secondary battery, it is easy to perform cooling of the wet type secondary battery. The medium passageways are formed from the ribs formed on the outer peripheries of the cell cases. The positioning of the cell cases is performed by fitting the projected portions and recessed portions formed on the outer peripheries of the individual cell cases with each other. Thus, the positioning can be performed accurately. A cooling medium is compulsively passed in the medium passageways by energization of the fan. Thus, the cooling capacity of the wet type secondary battery is enhanced.

The fan is compulsively energized during charging of the wet type secondary battery and/or when the temperature of the wet type secondary battery exceeds the predetermined temperature, wasteful consumption of power is thereby prevented. The duct is connected between the medium passageways and the power unit of the electric vehicle, cooling of the wet type secondary battery is thereby performed efficiently during traveling of the vehicle without energizing the fan.

Since the separator is low in gas permeability as described above, an absorbing reaction of oxygen gas is performed only at an outer peripheral portion of the zinc electrode which is exposed in the case. A deviation in reaction distribution of the zinc electrode is caused by this, and discharging active materials and charging active materials are caused to be present in a one-sided condition on the zinc electrode such that the discharging area of the zinc electrode is substantially decreased with respect to the opposing nickel electrode. Consequently, the discharging capacity is decreased and the life is reduced.

Meanwhile, in a wet type secondary battery of the type wherein an electrode plate, for example, the positive electrode, is wound by liquid impenetrable paper impregnated with electrolyte so that electrolyte may be supplied to the two electrode plates, if charging and discharging are repeated, then it sometimes occurs that the electrolyte leaks from the liquid paper and moves to a location between the liquid impenetrable paper and the cell case. It sometimes occurs that partial withering of electrolyte on a surface of an electrode is caused by such movement of the electrolyte. The life expectancy is also reduced by this process.

The present invention has been made to solve the problems described above, and it is a further object of the present invention to provide a wet type secondary battery which prevents reduction in charging capacity, withering of electrolyte and so forth and can obtain an increased life expectancy.

In order to solve the problems, the present invention is characterized in that hydrophobic gas permeable films are disposed at a plurality of locations of a separator which is formed from a hydrophilic ion permeable film.

Further, the present invention is also characterized in that, in a wet type secondary battery which includes a group of electrode plates consisting of a positive electrode, a negative electrode and a separator and liquid impenetrable paper impregnated with electrolyte and interposed between the positive electrode and the negative electrode, a liquid complementing layer in which electrolyte is filled is provided between the group of electrode plates and a cell case in which the group of electrode plates is accommodated.

Since the hydrophobic gas permeable films are disposed at the plurality of locations of the separator which is formed from a hydrophilic ion permeable film, oxygen gas produced at the positive electrode passes substantially uniformly through the separator itself and comes to the negative electrode, and the oxygen gas attracting reaction at the negative electrode is leveled.

Further, in the wet type secondary battery which includes liquid impenetrable paper between a positive electrode and a negative electrode, a liquid complementing layer in which electrolyte is filled is provided between a group of electrode plates and a cell case in which the electrode plates are accommodated. Even if electrolyte leaks from the liquid impenetrable paper after charging and discharging are repeated, electrolyte of the liquid complementing layer moves by an amount of such leakage to the liquid impenetrable paper, and there is no possibility that a partial withering area of electrolyte may appear on a surface of an electrode.

To solve the problem concerning the charging of vehicles, as idea is to connect, as shown in FIG. 35, a converting adapter 5113 between the charging station 5111 and an electric vehicle 5202. The converting adapter 5113 converts a voltage and/or a current such that it may be accepted by the electric vehicle 5202 for performing a charging function.

With this method, however, such a adapter must be provided for each different type of electric vehicle among which charging methods are different. Further, since the charging current is high, the adapter itself is large and heavy and is not easy to handle.

The present invention has been made to solve these further problems described above. It is therefore a still further object of the present invention to provide a charging system, that is, an electric vehicle and a charging system, wherein the weight is not increased on the electric vehicle side and the charging station side can cope with various types of electric vehicles without employing a converting adapter.

In order to solve the problems described above, the present invention is characterized in that at least one of the charging controller for outputting information of a charging current, the charging voltage or the like to be supplied to a battery and a storing memory in which a type of the vehicle, the battery or the like is stored is provided on an electric vehicle side while power devices such as a transformer, a rectifier, a current regulator and so forth are provided on a charging station side. The charging current, the charging voltage and so forth are determined using at least one of the stored information such as vehicle or battery type and the provided information regarding charging of the battery of the electric vehicle.

Further, the present invention is also characterized in that memories for storing therein a remaining capacity, a nominal capacity and an actual capacity of the battery is further provided on the electric vehicle side. In addition, on the charging station side, an actual capacity of the battery is detected using at least one of the remaining capacity and the actual capacity as well as the remaining capacity of the battery and a charging current value.

Further, the present invention is also characterized in that it comprises a plurality of sets of charging apparatuses each including a transformer, a rectifier and a current regulator and further comprises a distribution switch for change-over controlling an output of each of the current regulators and a station controller for determiner a charging current, a charging voltage and so forth using at least one of the information of a charging current, a charging voltage and so forth supplied from the electric vehicle and a type of the vehicle, the battery or the like, and an output of the current regulators is changed over by the distribution switch under the control of the station controller.

With the construction described above, the charging station can determine an optimum charging voltage and an optimum charging current using data supplied thereto from the electric vehicle.

Meanwhile, on the charging station side, an actual capacity of the battery of the electric vehicle and a charging ending time can be detected.

Further, outputs of the current regulators can be connected in series in response to a charging voltage required by the electric vehicle. Finally, charging can be performed at one time for a plurality of vehicles.

Another problem is that a conventional assembly battery for an electric vehicle is insufficient in recognition of the feasibility of maintenance. There is a problem that, even when some of the battery cells constituting the assembly battery are to be replaced, much time is required.

The present invention has been made to solve the problem described above. It is therefore a still further object of the present invention to provide a battery cell which is easy to maintain and handle and a battery for an electric vehicle which includes a combination of such battery cells.

In order to attain the object described above, according to the present invention, a battery cell is provided with two different kinds of metal electrode plates in the inside thereof. The battery cell is generally a substantial parallelepiped shape with positive and negative terminal electrodes exposed on an upper face thereof and comprises a plurality of tapping hubs disposed on the upper face on which the terminal electrodes are exposed. Projected ribs are provided on each of one pair of mutually parallel side faces at positions at which, when the battery cell is placed on another battery cell, the projected ribs are opposed to each other. The projections are provided on each of the other pair of mutually parallel side faces at positions at which, when the battery cell is placed on another battery cell, the projections are opposed to each other.

Further, a battery is provided for an electric vehicle wherein the battery cell described above is combined by a plural number vertically and horizontally such that the upper faces thereof at which the terminal electrodes are exposed may be arranged on the same plane. The battery cells are electrically connected in series comprising a first connecting plate for being engaged by the projections on the side faces of the other pairs of the plurality of battery cells placed one on another in a vertical direction such that the projected ribs formed on one battery cell and on another battery cell adjacent the one battery may be opposed to each other to secure the plurality of battery cells. A second connecting plate is provided for securing the plurality of battery cells, which are placed one on another in the vertical direction, such that the plurality of battery cells are placed one on another in a horizontal direction. An electrode plate is provided for interconnecting the terminal electrodes of each adjacent one of the battery cells. A cocoon-shaped insulating cover covers each of the electrode plates. A base plate is disposed across the plurality of battery cells and screwed to the tapping hubs of the battery cells. A connector is secured to the base plate and includes lead electrodes connected to the positive electrode and the negative electrode at the last ends of the plurality of cells connected in series.

Since the separator is low in gas permeability as described above, an absorbing reaction of oxygen gas is performed only at an outer peripheral portion of the zinc electrode which is exposed in the case. A deviation in reaction distribution of the zinc electrode is caused by this, and discharging active materials and charging active materials are caused to be present in a one-sided condition on the zinc electrode such that the discharging area of the zinc electrode is substantially decreased with respect to the opposing nickel electrode. Consequently, the discharging capacity is decreased and the life is reduced.

In a wet type secondary battery of the type wherein an electrode plate, for example, the positive electrode, is wound by liquid impenetrable paper impregnated with electrolyte so that electrolyte may be supplied to the two electrode plates, if charging and discharging are repeated, then it sometimes occurs that the electrolyte leaks from the liquid impenetrable paper and moves to a location between the liquid impenetrable paper and the cell case. It sometimes occurs that partial withering of electrolyte on a surface of an electrode is caused by such movement of the electrolyte. The life expectancy is deteriorated by this process.

The present invention has been made to solve the problems described above, and it is as still further object of the present invention to provide a wet type secondary battery which prevents reduction in charging capacity, withering of electrolyte and so forth and can obtain a long life.

In order to solve the problems, the present invention is characterized in that water repellent gas permeable films are disposed at a plurality of locations of a separator which is formed from a hydrophilic ion permeable film.

Further, the present invention is also characterized in that, in a wet type secondary battery which includes a group of electrode plates consisting of a positive electrode, a negative electrode and a separator and liquid impenetrable paper impregnated with electrolyte and interposed between the positive electrode and the negative electrode, a liquid complementing layer in which electrolyte is filled is provided between the group of electrode plates and a cell case in which the group of electrode plates is accommodated.

Since the water repellent gas permeable films are disposed at the plurality of locations of the separator which is formed from a hydrophilic ion permeable film, oxygen gas produced at the positive electrode passes substantially uniformly through the separator itself and comes to the negative electrode, and the oxygen gas attracting reaction at the negative electrode is leveled.

Further, if, in a wet type secondary battery which includes liquid impenetrable paper between a positive electrode and a negative electrode, a liquid complementing layer in which electrolyte is filled is provided between a group of electrode plates and a cell case in which the electrode plates are accommodated, then even if electrolyte leaks from the liquid keeping paper after charging and discharging are repeated, electrolyte of the liquid complementing layer moves by an amount of such leakage to the liquid impenetrable paper, and there is no possibility that a partial withering area of electrolyte may appear on a surface of an electrode.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a sectional view taken along line 6—6 of FIG. 1;

FIG. 18 is a side elevational view of another embodiment of the present invention;

FIG. 32 is a block diagram showing construction of a vehicle-carried charger;

FIG. 33 is a block diagram showing construction of a separately installed charger;

FIG. 39 is a front elevational view of a battery cell which is another embodiment of the present invention;

FIG. 40 is a sectional view taken along line 40—40 of FIG. 37;

FIG. 62(a) is a sectional view illustrating a battery cell which is another embodiment of the present invention;

FIG. 62(b) is a transverse sectional view of the battery cell illustrated in FIG. 62(a);

FIG. 63(a) is a sectional view illustrating a battery cell which is another embodiment of the present invention;

FIG. 63(b) is a transverse sectional view of the battery cell illustrated in FIG. 63(a).

DETAILED DESCRIPTION OF THE PREFERRED EMBODIMENTS

In the following, the present invention will be described in detail with reference to the drawings. First, an example of a wet type secondary battery to be mounted on an electric vehicle of the present invention will be described.

Figure 3:
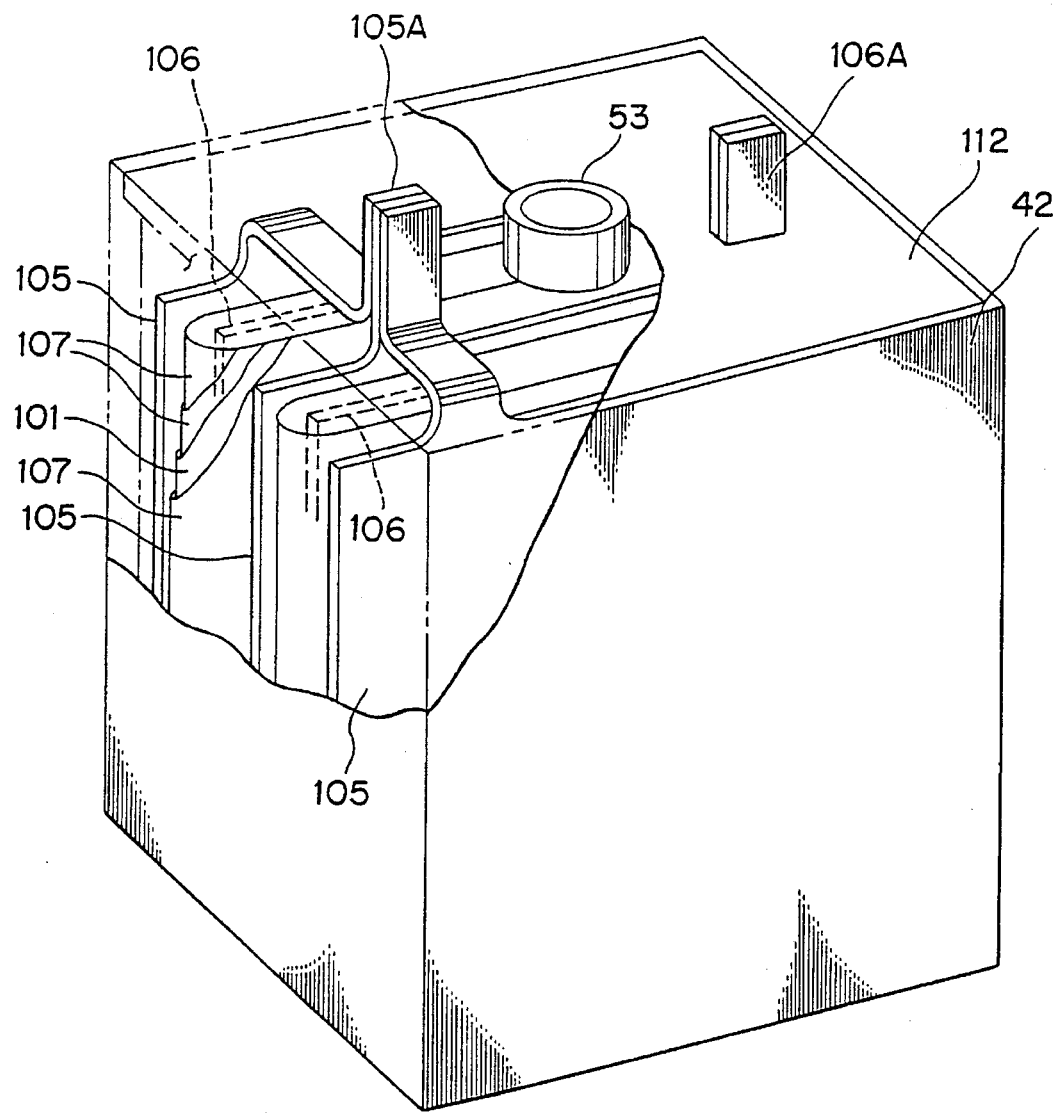
FIG. 3 is a perspective view, partly broken, of an example of a wet type secondary cell which is applied the embodiment of the present invention.

FIG. 3 is a perspective view, illustrated partly with a portion broken away, of an example of a wet type secondary battery which is applied to an embodiment of the present invention. Referring to FIG. 3, a plurality of zinc electrodes (negative electrodes) 105 and nickel electrodes (positive electrodes) 106 are disposed alternately in a cell case 42. While, in FIG. 3, the zinc electrodes 105 and the nickel electrodes 106 are shown as three and two, respectively, they may individually be provided in greater numbers.

Liquid keeping paper 107 impregnated with electrolyte is wound in two or more layers on each of the nickel electrodes 106, and a separator 101 is wound on the inner side of the liquid keeping paper 107 of the outermost layer. The separator 101, and if necessary, the liquid keeping paper 107, are securely mounted at upper and lower portions thereof by welding or the like such that only current collecting electrode 106A of the nickel electrodes 106 may be exposed outside. It is to be noted that the welding at the upper and lower portions may be omitted.

A cell cover 112 is provided for enclosing the cell case 42. A pressure exhaust valve 53 mounted on the cell cover 112 is provided for exhausting gas therethrough which is produced in the cell case 42. A current collecting electrode 105A forms a part of each of the zinc electrodes 105.

Figure 5:
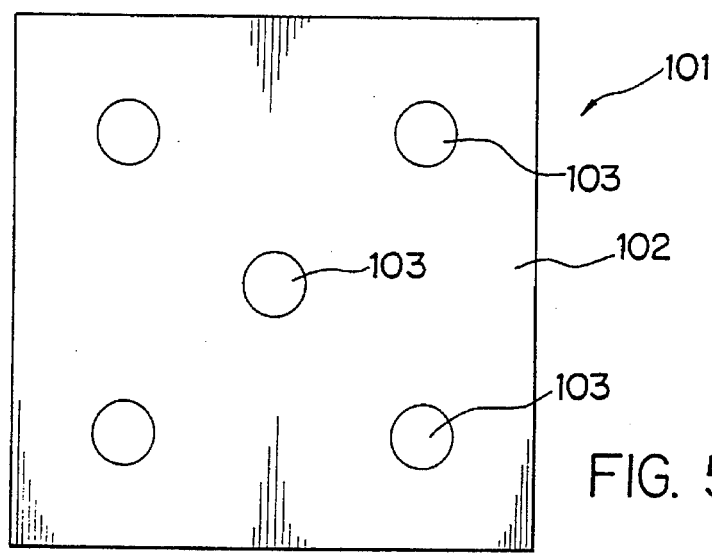
FIG. 5 is a plan view of the separator 101.
Figure 2:
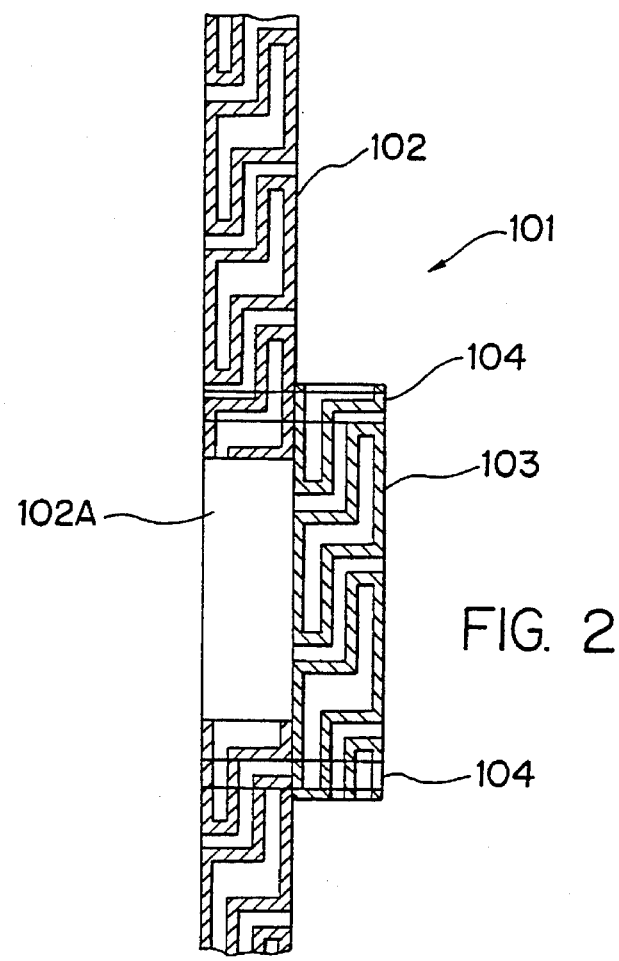
FIG. 2 is an enlarged sectional view of a separator 101.

FIG. 5 is a plan view of the separator 101. FIG. 2 is an enlarged section view of essential part of the separator 101. Referring to FIGS. 2 and 5, the separator 101 is constructed from a hydrophilic ion permeable film 102 and hydrophobic gas permeable films 103 securely mounted at a plurality of opening portions 102A formed partially in the hydrophilic ion permeable film 102. The hydrophilic ion permeable film 102 is a porous film formed in the form of a sponge by foaming or mechanical expansion of polyethylene, polypropylene or the like, and a surface active agent is applied to or filled in the hydrophilic ion permeable film 102. Also, the hydrophobic gas permeable films 103 are porous films each in the form of a sponge, but no surface active agent is used.

The opening portions 102A of a small diameter, for example, 6 mm or so, are formed in the hydrophilic ion permeable film 102. The hydrophobic gas permeable films 13 are securely mounted at the opening portions 102A, for example, by heat welding at welded portion 104.

If the separator 101 formed in this manner is used, then ion permeation which is important for electrode reactions can be assured sufficiently due to an action of the hydrophilic ion permeable film 102. Oxygen gas produced at the nickel electrodes upon overcharging passes through the hydrophobic gas permeable films 103. Also, gas reactions are leveled and prevention of reduction of the reaction areas of the zinc electrodes 105 can be achieved. Further, since the hydrophobic gas permeable films 103 are maintained away from the electrolyte, zinc deposits do not grow thereon. Short-circuiting in the cell by zinc deposits can be prevented similarly due to the hydrophilic ion permeable film 102.

It is to be noted that, the separator 101 has a composite structure of the hydrophilic ion permeable film 102 and the hydrophobic ion permeable films 103, the materials of them, the structures of the sections of them, or the shape, the diameter or the number of the opening portions 102A formed in the hydrophilic ion permeable film 102, in other words, the shape, the size and/or the quantity of the hydrophobic gas permeable films 103, or the like is not limited to that of the embodiment described above.

Further, the separator may naturally be used for a battery other than a nickel-zinc battery.

Figure 4:
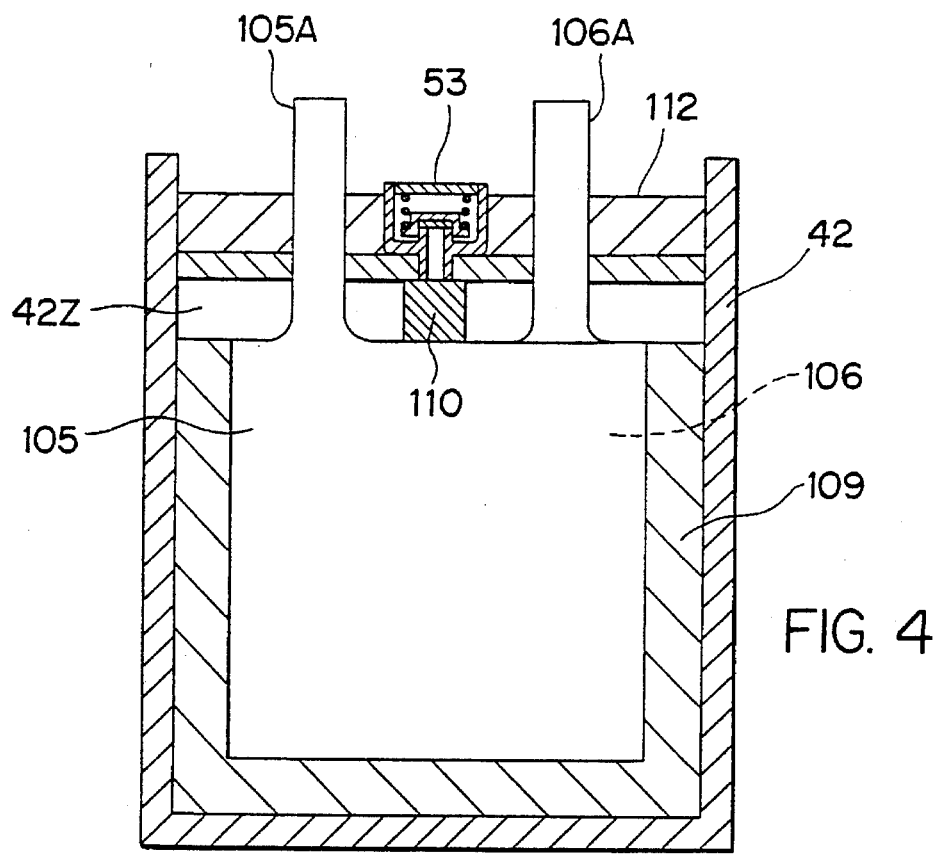
FIG. 4 is a sectional view of another view of a wet type secondary cell which is applied the embodiment of the present invention.

FIG. 4 is a sectional view of another example of a wet type secondary battery which is applied to the embodiment of the present invention. Referring to FIG. 4, similar reference characters to those of FIG. 3 denote similar or equivalent portions, and accordingly, description thereof is omitted herein. The present embodiment is constructed such that a pair of liquid complementing layers 109 and 110 are provided between the zinc electrodes 105 and nickel electrodes On each of the nickel electrodes 106 liquid keeping paper 107 and a separator 101 are wound, and the cell case 42 and cell cover 112 of the wet type secondary battery shown in FIG. 3. As the liquid keeping layers 109 and 110, for example, cellulose in which electrolyte is filled may be used.

In such a wet type secondary battery of the type wherein liquid keeping paper is wound around each electrode to supply electrolyte to the group of electrodes as shown in FIG. 3, if charging and discharging are repeated, then it sometimes occurs that electrolyte leaks from the liquid keeping paper 107 and moves to a location between the liquid keeping paper 107 and the cell case 42. It sometimes occurs that partial withering of electrolyte occurs on a surface of the electrode as a result of such movement of the electrolyte, which is not preferable for electrochemical reactions. On the other hand, if the liquid keeping layers 109 and 110 are provided between the group of electrodes and the cell case 42 and cell cover 112 as shown in FIG. 4, then the movement of electrolyte can be moderated and withering of electrolyte can be prevented.

It is to be noted that, while an air gap portion 42Z is present between the individual electrodes and the cell cover 112 in FIG. 4, the liquid keeping layer 110 may be formed such that the air gap portion 42Z may not be produced. Further, an air gap portion may be formed between the pressure exhaust valve 53 and the individual electrodes in order to facilitate exhaustion of oxygen gas through the pressure exhaust valve 53.

Figure 1:
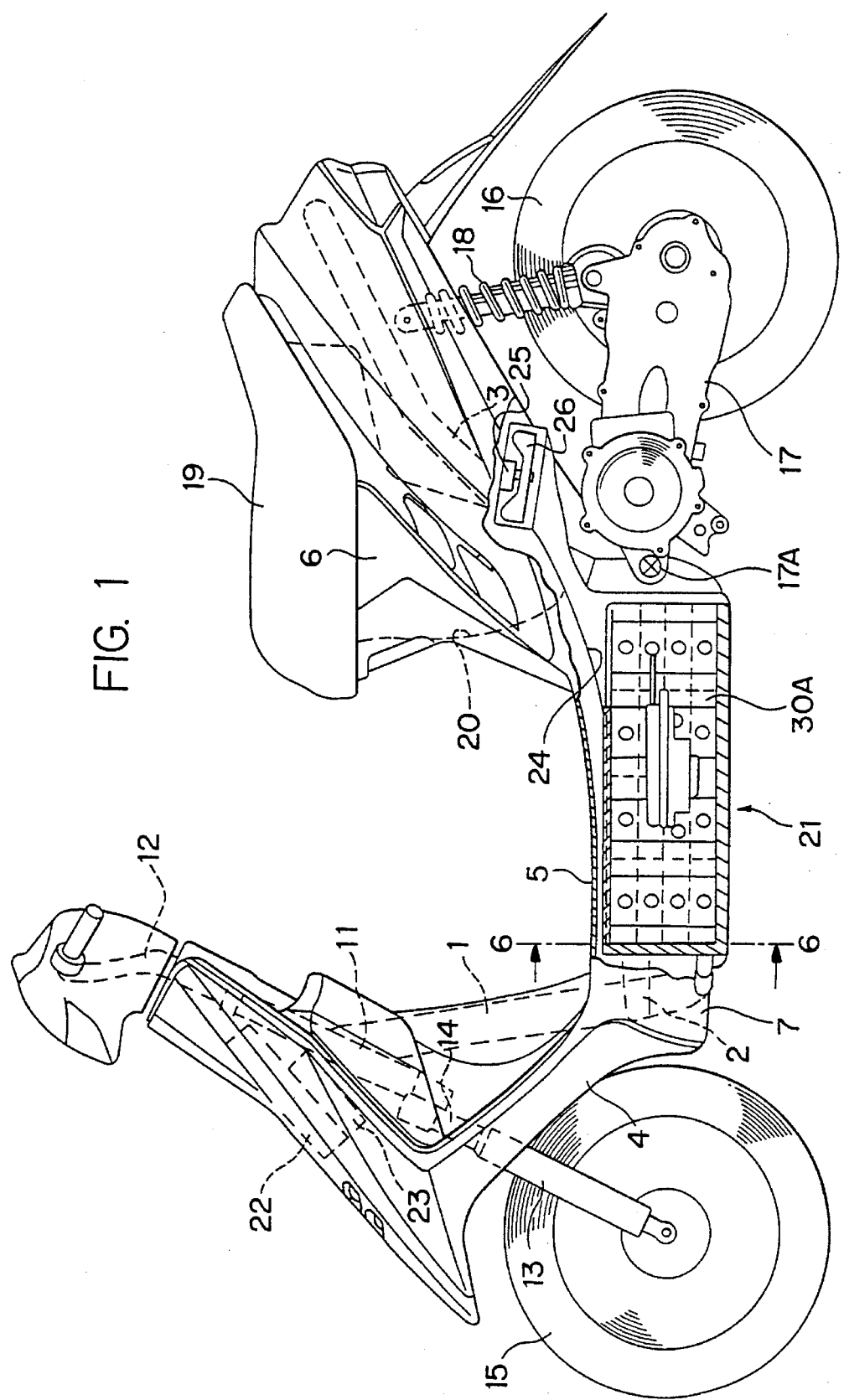
FIG. 1 is a side elevational view of an embodiment of the present invention.

Now, an embodiment of the present invention wherein a wet type secondary battery having the construction described so far is applied to an electric motorcycle is described. FIG. 1 is a side elevational view of the embodiment of the present invention. Referring to FIG. 1, a body frame of the electric motorcycle includes a front frame 1, a central frame 2 and a rear frame 3, and outer sides thereof are covered with a body made of a resin and including a leg shield 4, a step floor 5, a rear cover 6 and an under cover 7.

A head pipe 11 mounted on the front frame 1 has a steering handle 12 provided at an upper end thereof. A front fork 14 on which a front wheel 15 is supported for rotation by way of a front cushion 13 is supported for rotation at a lower end of the head pipe 11. A power unit 17 of the swinging type on which a rear wheel 16 is supported for rotation is supported at a front end thereof for upward and downward rocking motion by means of a pivot 17A at a rear end of a rear portion of the central frame 2. An upper face of a rear portion of the power unit 17 and the rear frame 3 are connected to each other by way of a rear cushion 18.

A receptacle 20 for accommodating a helmet or the like therein is provided between the power unit 17 and a seat 19. The receptacle 20 is formed from a magnetic shielding material such as a conductive resin or the like so that it may not be influenced by magnetism produced from a drive motor of the electric motorcycle.

A battery apparatus 21 disposed in the power unit 17 for supplying power to a motor, not shown, for supplying power to the electric motorcycle is disposed below the step floor 5. The battery apparatus 21 is a wet type secondary battery and is constructed such that it includes a plurality of cells provided in horizontal directions such that electrode plates thereof may extend horizontally, and the battery apparatus 21 is mounted on the central frame 2 by a suitable technique. The battery apparatus 21 has a pair of opening portions at the opposite left and right side faces of the electric motorcycle as hereinafter described with reference to FIG. 6. A duct 24 having a fan motor 25 and a fan 26 is connected to the rear side of the battery apparatus 21. The fan motor 25 is driven, for example, during charging so that air, a cooling medium, is taken into the battery apparatus 21 by way of the opening portions and exhausted from a rear end portion of the duct 24. The battery apparatus 21 is cooled by such passage of air.

A controller 22 for controlling the drive motor and a charger 23 for performing charging of the battery apparatus 21 are mounted at a front portion of the head pipe 11. It is also possible to mount the controller 22 and the charger 23 at positions other than the positions shown, for example, below or behind the seat 19 or the like.

FIG. 6 is a sectional view taken along line 6—6 of FIG. 1. First, welding nuts 2B are welded at predetermined positions of the central frame 2, and the step floor 5 is secured to the central frame 2 by screwing bolts 2A into the nuts 2B. The battery apparatus 21 is constituted from a battery case 31 secured to a lower portion of the step floor 5. Two sets of battery groups 30A and 30B are secured in the battery case 31 such that they may be positioned on the left and right of the electric motorcycle. The step floor 5 functions also as a lid which covers over the battery groups 30A and 30B.

Support bodies 35 and 36 are disposed between the battery groups 30A and 30B and the battery case 31 and step floor 5. A sponge 37 functions as a seal member.

A pair of predetermined opening portions 33 are formed at connecting portions between the battery case 31 and the step floor 5 positioned on the opposite left and right side faces of the electric automobile. When the fan motor 25, FIG. 1, is driven, air is admitted in through the opening portions 33 so that the battery groups 30A and 30B are cooled.

The battery groups 30A and 30B are each constructed from 16 cells 41 connected in series. Subsequently, construction of the battery group 30A disposed on the left side of the electric motorcycle will be described in detail.

Figure 7:
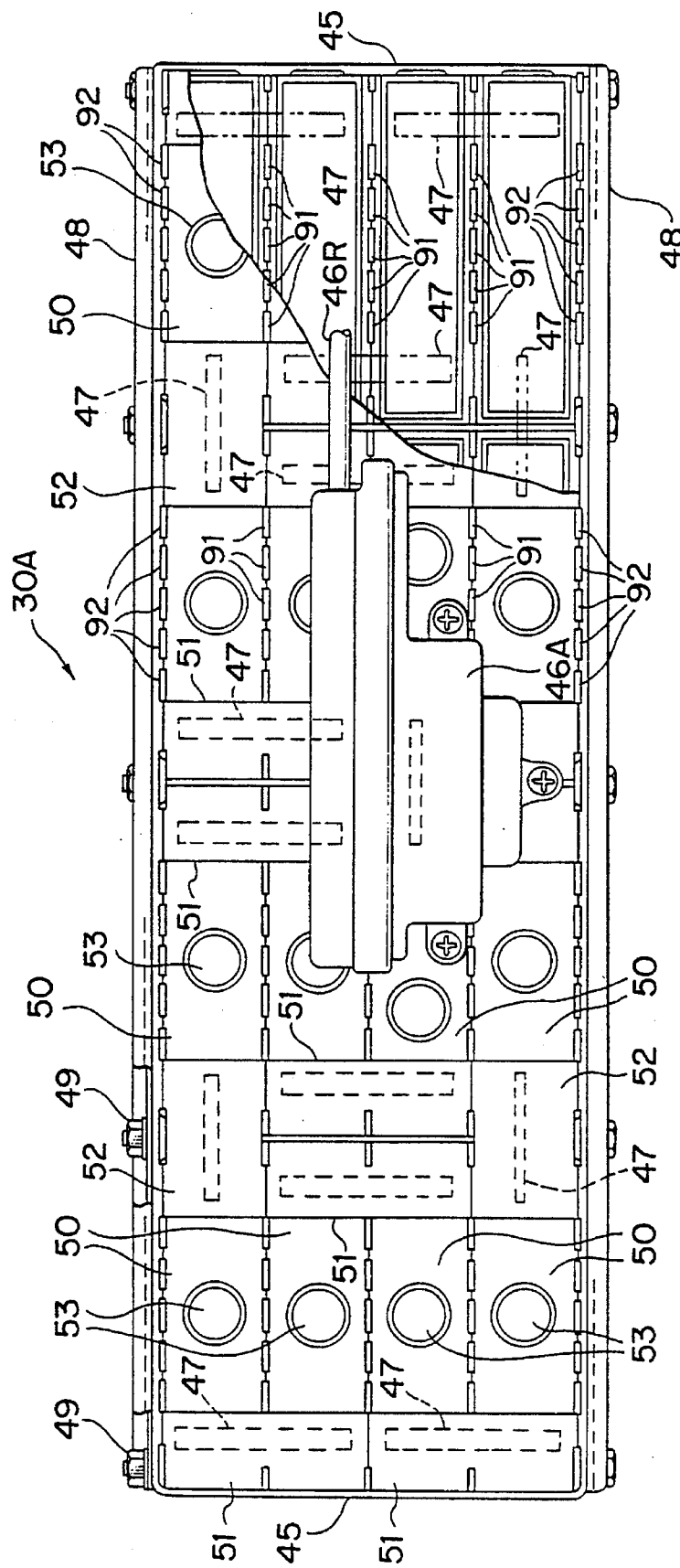
FIG. 7 is a front elevational view, partly broken, of a battery group 30A.
Figure 8:
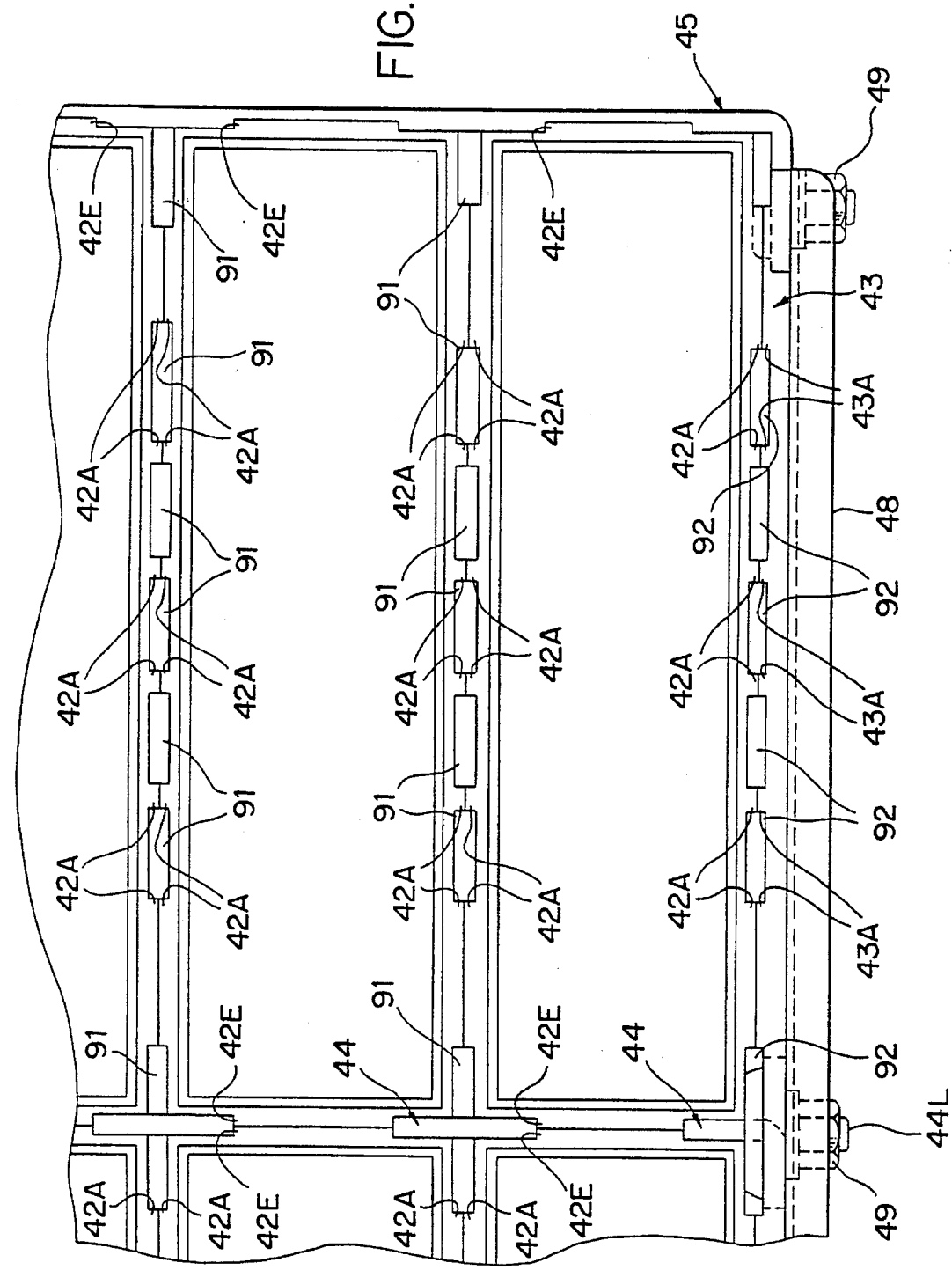
FIG. 8 is an enlarged view of essential part of FIG. 7.
Figure 9:
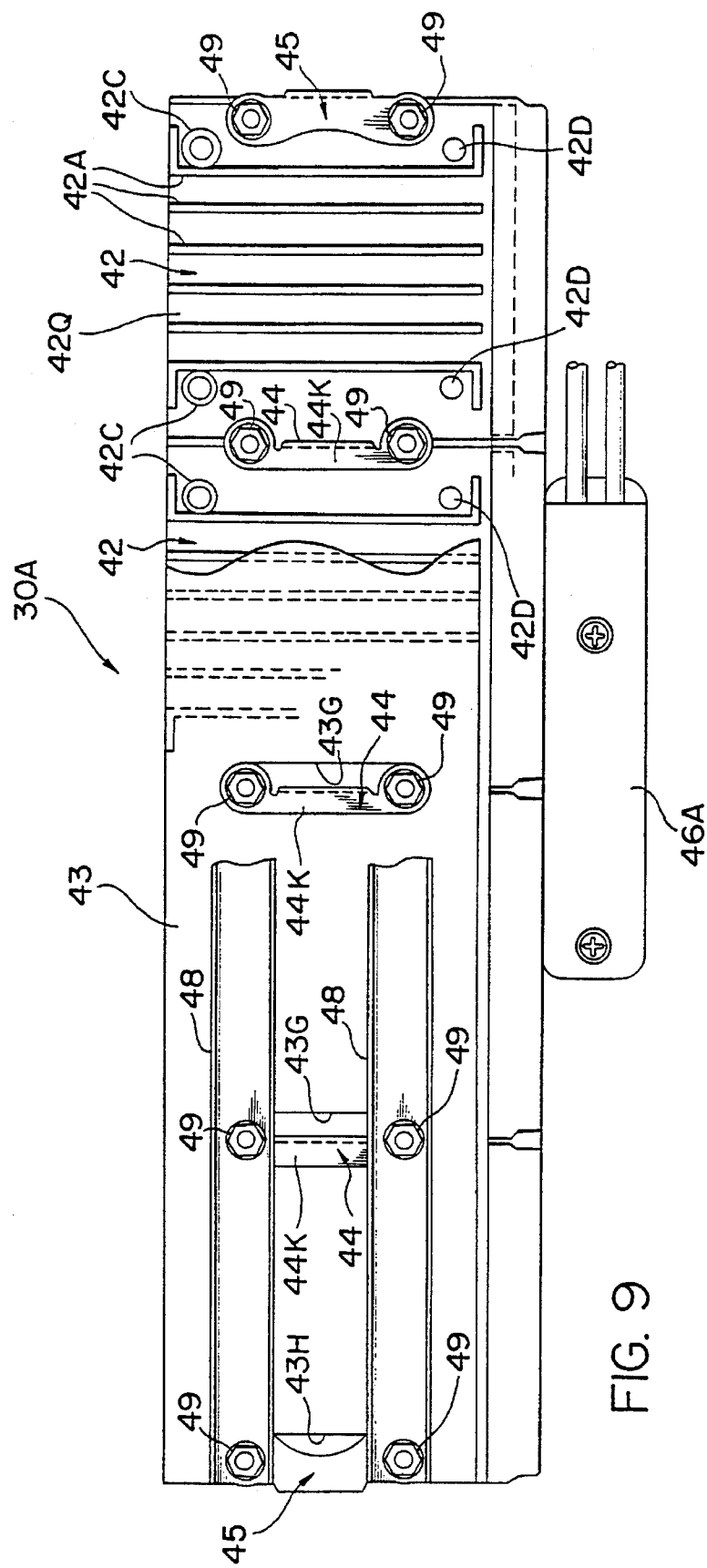
FIG. 9 is a plan view, partly broken, of FIG. 7.
Figure 10:
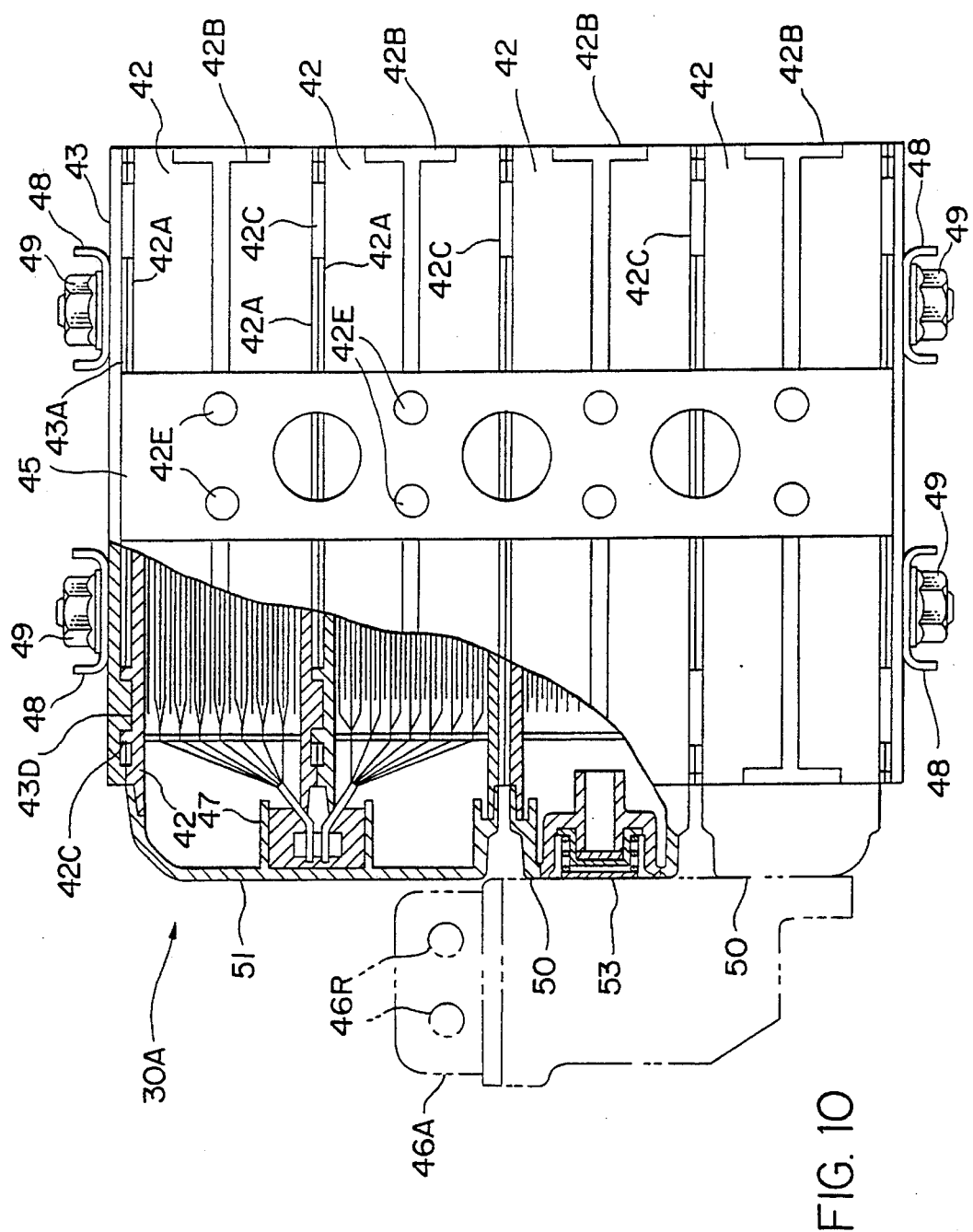
FIG. 10 is a right side elevational view, partly broken, of FIG. 7.
Figure 11:
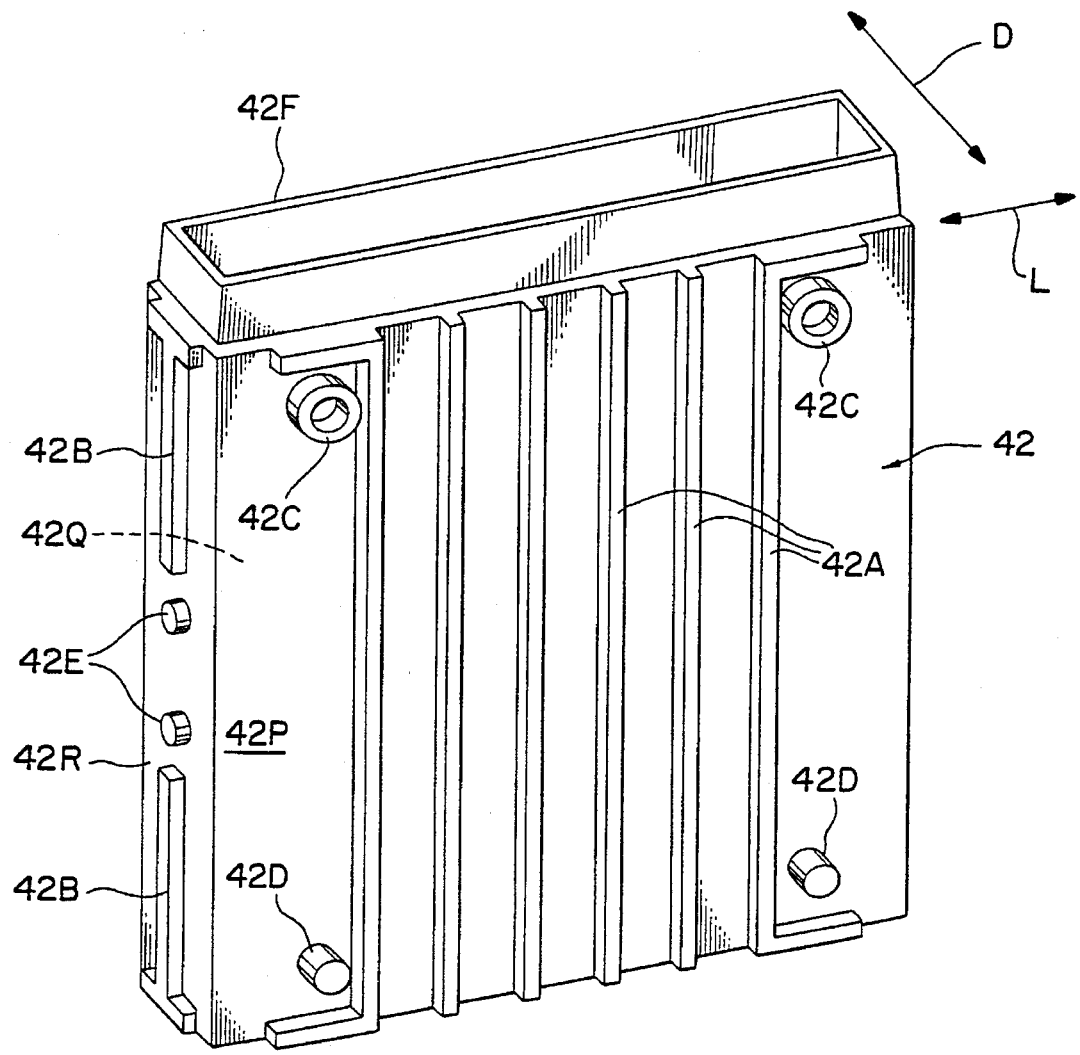
FIG. 11 is a perspective view of a cell case 42.
Figure 12:
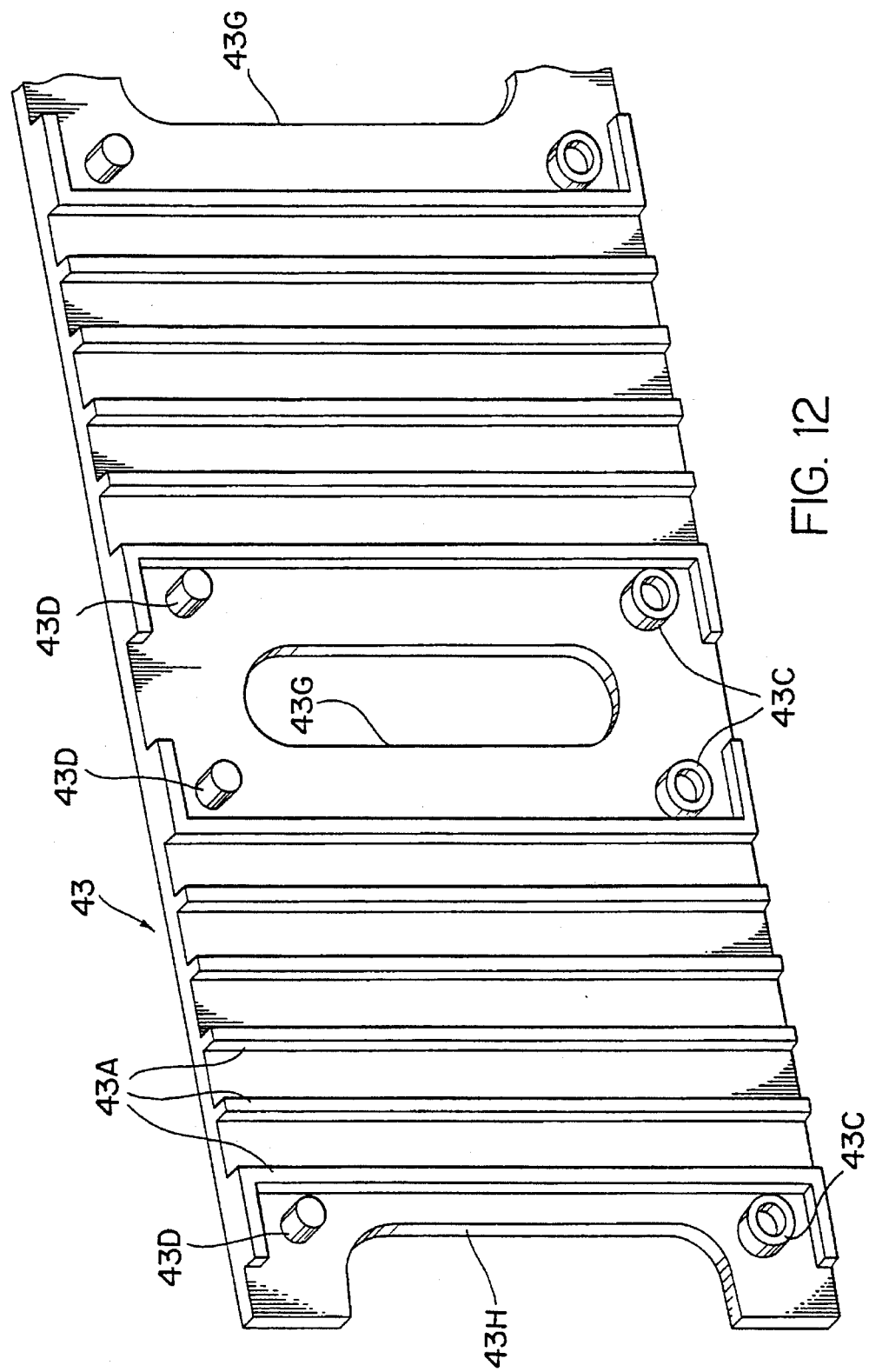
FIG. 12 is a perspective view of a first connecting plate 43.
Figure 13:
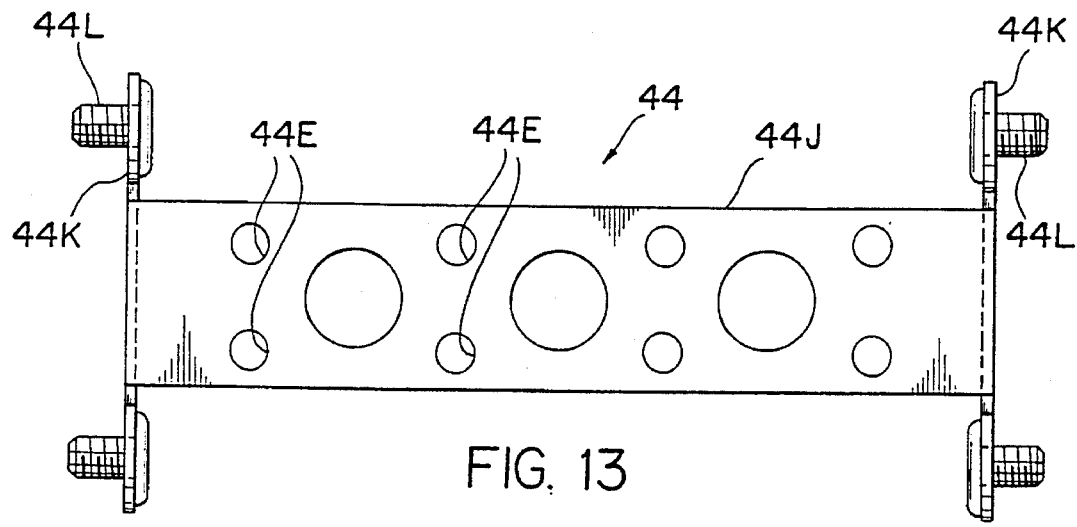
FIG. 13 is a front elevational view of a second connecting plate 44.
Figure 14:
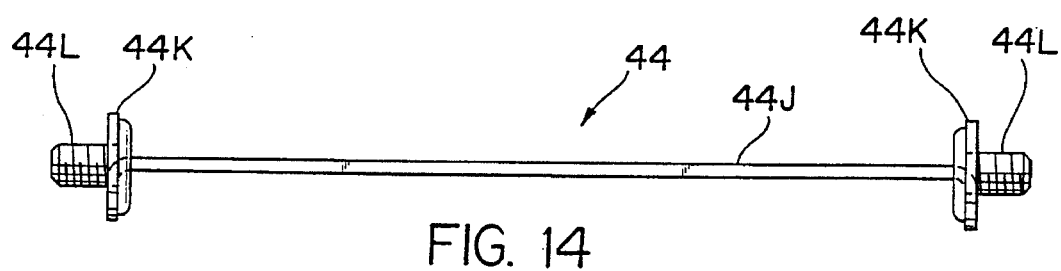
FIG. 14 is a plan view of the second connecting plate 44.
Figure 15:
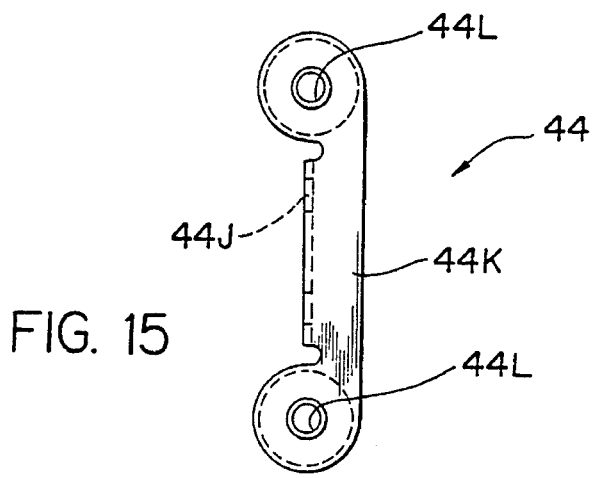
FIG. 15 is a right side elevational view of the second connecting plate 44.

FIG. 7 is a front elevational view, partly in broken section, of the battery group 30A. FIG. 8 is an enlarged view of essential part of FIG. 7. FIG. 9 is a plan view, partly in broken section of FIG. 7. FIG. 10 is a right side elevational view, partly in broken section, of FIG. 7. FIG. 11 is a perspective view of the cell case 42. FIG. 12 is a perspective view of a first connecting plate 43, and FIGS. 13 to 15 are a front elevational view, a plan view and a right side elevational view, respectively, of a second connecting plate 44. It is to be noted that a cover 50 and covers 51 and 52 correspond to the cell cover 112 shown in FIGS. 3 and 4. The battery group 30A is disposed such that front faces thereof are positioned on the left side face side of the electric motorcycle.

As illustrated in FIG. 11, the cell case 42 is a casing having an opening portion 42F, and ribs 42A and ribs 42B are formed on an outer periphery of the cell case 42, bottom face 42P and top face 42Q as well as both side faces 42R, such that they may extend from the opening portion 42F toward the interior. Annular projections, positioning recessed portions, 42C and projections, positioning projecting portions, 42D which have the substantially same diameter as the inner diameter of the annular projections 42C are formed on the bottom face 42P and the top face 42Q of the cell case 42. Projections 42E are formed on the opposite side faces 42R. The annular projections 42C formed on the bottom face 42P of the cell case 42 are formed at positions corresponding to the projections 42D formed on the top face 42Q of the cell case 42. Similarly, the projections 42D formed on the bottom face 42P are formed at positions corresponding to the annular projections 42C formed on the top face 42Q.

The cell case 42 having a construction as described above is placed one on top of another by four in a vertical direction, the direction indicated by an arrow D in FIG. 11, such that the projections 42D may be fitted in the inner diameter portions of the annular projections 42C. By such placement one on top of another, air passageways, medium passageways, 91 are formed between the ribs 42A in a region between each adjacent one of the cell cases 42 as shown in FIG. 8. The four cell cases 42 thus placed one on top of another are prepared in four sets, and side faces of the sets are contacted closely with each other in a horizontal direction, the direction indicated by the arrow mark L in FIG. 11, using three second connecting plates 44.

Each of the second connecting plates 44 is constructed from, as shown in FIGS. 13 to 15, a belt-formed portion 44J having a pair of flanges 44K at the opposite ends thereof, and a bolt 44L provided on each of the flanges 44K. The thickness of the belt-formed portion 44J is substantially equal to twice the projecting height of the projections 42E, see FIG. 11. Hole portions 44E having a diameter substantially equal to the diameter of the projections 42E are perforated in the belt-formed portion 44J. The four cell cases 42 placed one on another are contacted closely by four sets with each other in the horizontal direction by fitting the hole portions 44E with the projections 42E formed on the side faces of each of the cell cases 42.

A third connecting place 45 having flanges constructed of a different profile from that of the flanges 44K of the second connecting plate 44 is closely contacted with each of one of the cell cases 42 which are positioned at the most sideward locations, on the opposite left and right sides.

The first connecting plates 43 of FIG. 12 are mounted on the four cell cases 42 at the lowest locations wherein the bottom faces 42P are exposed and the four cell cases 42 at the highest locations wherein the top faces 42Q are exposed. Ribs 43A similar to the ribs 42A formed on the bottom face 42P or the top face 42Q of each of the cell cases 42 are closely contacted in the horizontal direction with each other that are formed on each of the first connecting plates 43. Projections 43D and annular projections 43C are formed at portions of the first connecting plates 43 corresponding to the annular projections 42C and the projections 42D of the cell cases 42. The mounting is performed by fitting the projections 43D and the annular projections 43C of the first connecting plates 43 with the annular projections 42C and the projections 42D of the cell cases 42. In this instance, the flanges 44K of the second connecting plate 44 and the flanges of the third connecting plates 45 are exposed from the opening portions 43G and recessed portions 43H of the first connecting plates 43. Air passageways, medium passageways, 92 are formed by the mounting between the first connecting plates 43 and the cell cases 42 as shown in FIG. 8.

Angles 48 of an elongated shape are placed horizontally on the pair of first connecting plates 43 disposed at the top and the bottom, and nuts 49 are screwed with the bolts 44L of the second connecting plates 44 and bolts of the third connecting plates 45 with the angles 48 interposed therebetween to hold and secure the two first connecting plates 43 and the 12 cell cases 42 by means of the angles 48.

As described hereinabove with reference to FIG. 3, the plurality of zinc electrodes, negative electrodes, 105 and the plurality of nickel electrodes, positive electrodes, 106 on each of which liquid paper 107 impregnated with electrolyte and a separator 101 are wound are disposed alternately in each of the cell cases 42, thereby forming a cell 41. In the example of FIG. 10, the zinc electrodes 105 and the nickel electrodes 106 are disposed by 15 and 14, respectively, in each of the cell cases 42. And, current collecting electrodes 105A and 105B, as shown in FIG. 3, of each adjacent ones of the cells 41 are connected to each other by a current collecting portion 47 so as to connect the 16 cells 41 in series as shown in FIGS. 7 and 10.

After then, the cover 50 on which the pressure exhaust valve 53 is mounted and the covers 51 and 52 are assembled to the opening portions 42F, as shown in FIG. 11, of each of the cell cases 42, and consequently, the cell case 42 is closed. It is to be noted that liquid keeping layers 109, as shown in FIG. 4, are disposed between the cell cases 42 as well as cover 50 and covers 51 and 52 and the zinc electrodes 105 and nickel electrodes 106.

A connector 46A is provided to connect leads 46R to the positive electrode and the negative electrode at the last ends of the cells 41 connected in series and is mounted at a suitable one of the cells 41.

Figure 16:
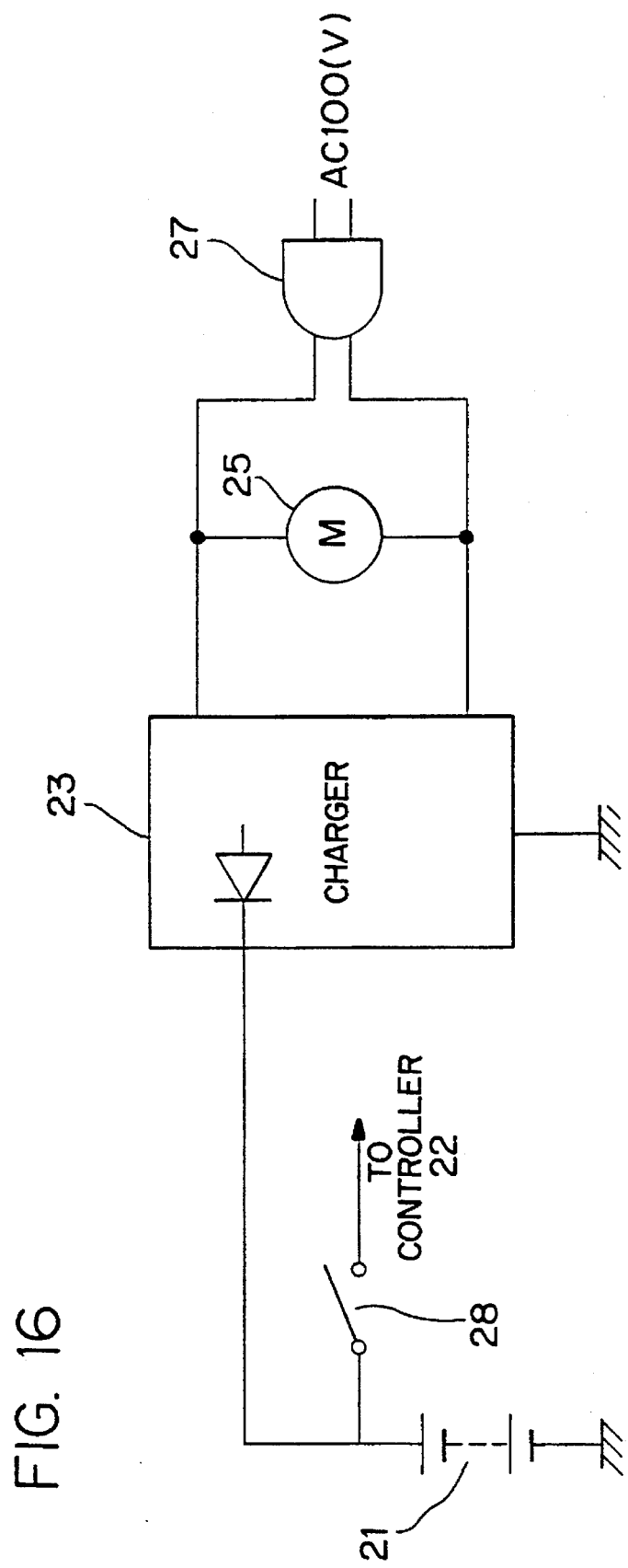
FIG. 16 is a circuit diagram showing an example of connection of a battery apparatus 21, a charger 23 and a fan motor 25.

Also, the battery group 30B shown in FIG. 6 has substantially similar construction to that of the battery group 30A having such construction as described above, and a connector 46B thereof has a symmetrical shape to that of the connector 46A. Output lines of the battery group 30A and the battery group 30B, that is, the leads led out from the connectors 46A and 46B, are further connected in series in the inside or the outside of the battery case 31 and the step floor 5, and the positive electrode side and the negative electrode side are connected to the charger 34 as shown in FIG. 16. It is to be noted that reference numeral 28 denotes a main switch of the electric motorcycle.

As shown in FIG. 16, the charger 23 is further connected to the fan motor 25 and the plug 27, and only when the plug 27 is connected to a plug socket for domestic use or installed at a charging station or the like to perform charging, the fan motor 25 is driven. By driving of the fan motor 25, air is introduced into the battery case 31 and the step floor 5 through the opening portions 33 of FIG. 6. The thus introduced air passes through the air passageways 91 and the air passageways 92 and then is exhausted from the duct 24 (FIG. 1) disposed at a location rearwardly of the battery apparatus 21.

It is to be noted that driving of the fan motor may be performed only when, for example, the temperature of the wet type secondary battery is higher than a predetermined temperature. Or else, the fan motor may be driven only when the temperature of the wet type secondary battery exceeds the predetermined temperature during charging.

FIG. 18 is a side elevational view of another embodiment of the present invention. Referring to FIG. 18, since similar reference characters to those of FIG. 1 denote similar or equivalent portions, description thereof will be omitted herein.

As apparent from comparison with FIG. 1, a rear end portion of a duct 24A provided on the rear side of the battery apparatus 21 is connected to a power unit 17P. And, a sirocco fan 26A is disposed intermediately of the duct 24A. A fan motor, referred to as numeral 25 in FIG. 16, is connected to the sirocco fan 26A. A portion of the duct 24A rearwardly of a location at which the sirocco fan 26A is disposed has such a structure that it absorbs rocking motion of the power unit 17P and is formed, for example, from a material having a flexibility. It is to be noted that the fan 26A may be any fan of construction other than a sirocco fan.

Figure 19:
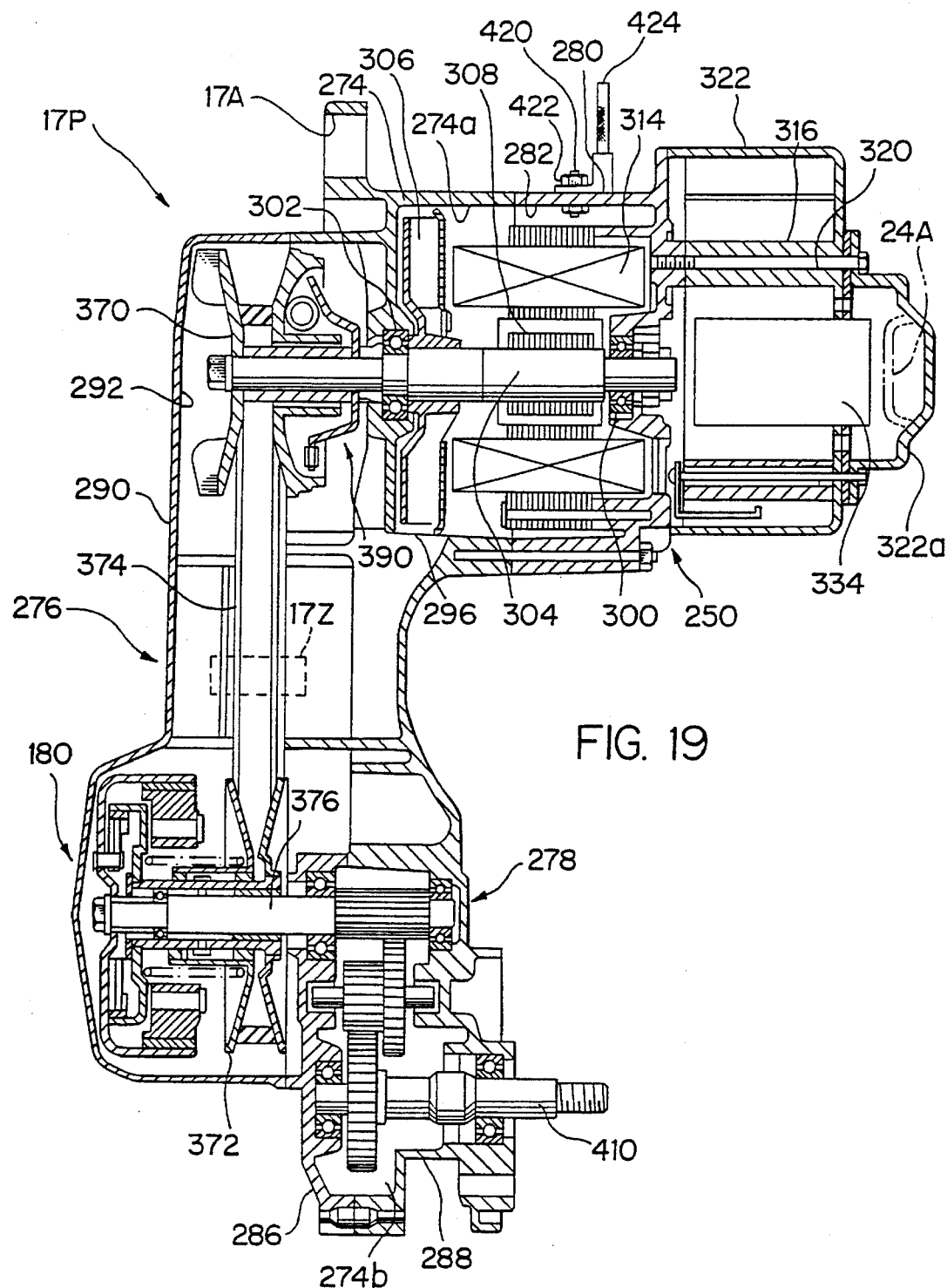
FIG. 19 is a transverse sectional view of a power unit 17P.

FIG. 19 is a horizontal sectional view of the power unit 17P. Referring to FIG. 19, similar reference characters similar to those of FIG. 18 denote similar or equivalent portions. First, an electric motor 250, a non-stage transmission 276 and a reduction gear mechanism 278 are mounted on a case body 274 of the power unit 17P.

The case body 274 is formed by casting of an aluminum alloy or the like, and a recessed portion 274a is defined at a front portion of the case body 274 while another recessed portion 274b is defined at a rear portion of the case body 274. A motor case 280 is secured to the recessed portion 274a such that a motor chamber 282 for accommodating the electric motor 250 therein is defined therein. Meanwhile, a bearing member 286 is secured to the recessed portion 274b such that a gear chamber 288 for accommodating the reduction gear mechanism 278 therein is defined therein while a side cover 290 is securely provided at a left side portion such that a reduction gear chamber 292 for accommodating the non-stage transmission 276 therein is defined therein. The motor chamber 282 and the reduction gear chamber 292 are communicated for ventilation with each other by way of a through-hole 296 formed in a bottom portion of the recessed portion 274a of the case body 274. Further, a wind exhaust port, not shown, is formed at a lower face of a portion of the case body 274 and/or the side cover 290 at which the non-stage transmission 276 is disposed such that the portion is opened to the atmospheric air by way of the wind exhaust port. The wind exhaust port is formed at a position, for example, indicated by reference character 17Z of FIG. 18 or 19.

A bolt 420 is provided projectingly on the motor case 280, and one of conductor portions of an insulated covered conductor 424 is electrically connected to the motor case 280 by means of a nut 422 screwed on the bolt 420. The other of the conductor portions of the insulated covered conductor 424 is electrically connected to the frame of the motorcycle by a similar technique, and the frame and the motor case 280 are connected to each other.

Further, a bearing 300 is provided on the motor case 280, and a rotary shaft 304 is supported for rotation in the motor chamber 282 by means of the bearing 300 and another bearing 302 provided at the bottom portion of the recessed portion 274a of the case body 274. And, a rotor 308 formed from a magnet and a cooling fan 306 are mounted at a portion of the rotary shaft 304 which is positioned in the motor chamber 282, and a drive pulley 370 of the non-stage transmission 276 is mounted at another portion of the rotary shaft 304 which is positioned adjacent the speed reducing chamber 292 in the motor chamber 282.

Three stator coils 314 constituting a stator are securely provided on a left face of the motor case 280 adjacent the motor chamber 282 while a heat sink 316 is secured to a right face of the motor case 280 using bolts 320. The heat sink 316 is an extruded molded article or cast article of aluminum in the form of a hexagonal tube, and 6 driving FETs (not shown) for the electric motor 250 are mounted on outer peripheral portions of the heat sink 316. Further, a capacitor 334 for stabilization of a power source is disposed on an inner circumferential portion of the heat sink 316. The capacitor 334 is connected to a battery in parallel to a driving circuit for the electric motor 250 including the FETs.

A cover 322 is secured to an outer periphery of the heat sink 316. A gate driving circuit (not shown) for controlling driving of the FETs is disposed between the cover 322 and the heat sink 316.

Another cover 322a is securely mounted on the heat sink 316 in such a manner as to enclose the heat sink 316. A rear end portion of the duct 24A shown in FIG. 18 is securely mounted on the cover 322a. It is to be noted that cooling fins are formed on the heat sink 316 as required.

The non-stage transmission 276 is constituted from the drive pulley 370, a driven pulley 372 provided on an input shaft 376 of the reduction gear mechanism 278, and a belt 374 wound between them. A governor mechanism 390 is formed on the drive pulley 370.

With such construction, rotation of the rotary shaft 304 by driving of the electric motor 250 is transmitted to an output shaft 410 connected to the rear wheel 16 (FIG. 18) by way of the non-stage transmission 276 and the reduction gear mechanism 278. It is to be noted that reference character 180 denotes a clutch mechanism.

The cooling fan 306 rotates together with rotation of the rotary shaft 304. As a result, even if there is no rotation of the sirocco fan 26A, air is introduced into the battery apparatus 21 through the opening portions 33 (refer to FIG. 6) of the battery apparatus 21 (FIG. 18), and this is introduced into the inside of the power unit 17P by way of the duct 24A. The air thus introduced passes between the heat sink 316 and the capacitor 334 and by the electric motor 250, the cooling fan 306 and the non-stage transmission 276 and is then exhausted from the wind exhaust hole described hereinabove (in the direction indicated by an arrow mark A in FIG. 18).

Accordingly, by rotation of the cooling fan 306 during traveling and by rotation of the sirocco fan 26A during charging, the battery apparatus 21, the electric motor 250, the non-stage transmission 276 and so forth are cooled.

By the way, the battery groups 30A and 30B may be interconnected by a suitable connecting member.

Figure 17:
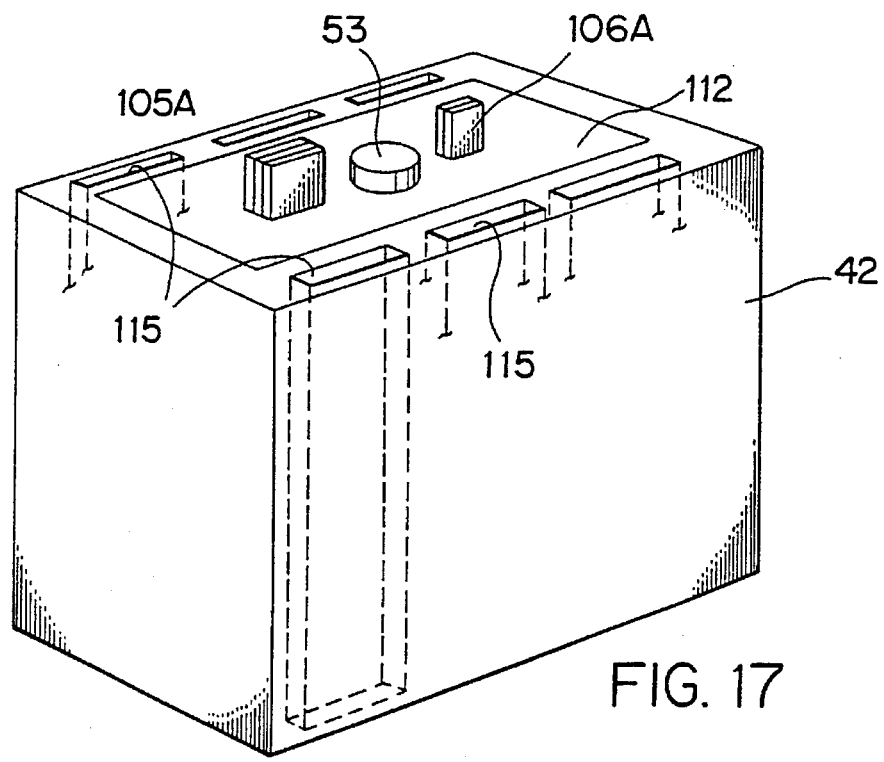
FIG. 17 is a schematic view showing a wet type secondary battery wherein an air passageway is formed directly in a cell case.

Further, in the present embodiment, since the ribs 42A are formed on an outer peripheral portion of each of the cell cases 42 and the ribs 43A similar to the ribs 42A are formed also on each of the first connecting plates 43, the air passageways 91 are formed at a connection portion between each adjacent ones of the cell cases 42 while the air passageways 92 are formed at another connecting portion between each of the first connecting plates 43 and an adjacent cell case 42. In this manner, since the air passageways can be formed around each of the cell cases 42 only by forming ribs, production of metal molds for the cell cases 42 is easy, but air passageways 115 may be formed directly in the cell case 42 as shown in FIG. 17 without particularly forming such ribs.

Further, while it is described that the opening portions 33 formed in the battery apparatus 21 are formed at joining portions between the battery case 31 and the step floor 5, that is, on the side faces of the battery apparatus 21 while the duct 24 or 24A is mounted at a rear portion of the battery apparatus 21, the formation positions of the opening portions and the mounting position of the duct may naturally be any other positions other than the positions described above only if the structure is such that the individual cells in the battery apparatus 21 can be cooled efficiently.

Further, the internal structure of the wet type secondary battery is not limited to that described hereinabove but may be of any structure.

Furthermore, while the present invention is described applied to an electric motorcycle, it may be applied to various electric vehicles such as electric four-wheel vehicles.

According to the present invention, such effects as described below are achieved.

According to the electric vehicle, since the distribution of electrolyte is leveled at different portions of the electrodes, uniformity in reaction on the electrode plates can be achieved. Accordingly, reduction of the reaction area can be prevented, and consequently, deterioration of the capacity of the wet type secondary battery is prevented and a longer life can be achieved.

According to the electric vehicle, since the vehicle height and the center of gravity of the electric vehicle can be made low, enhancement of the traveling performance of the electric vehicle can be achieved.

A wet type secondary battery is generally constructed with a tensile force applied to the inside thereof such that the distance between electrodes is made short so that dropping of an active material may be prevented and reduction of the internal resistance may be achieved. And, it is constructed such that heat by an electrochemical reaction is transmitted to a cell case facing to the electrodes.

However, when a battery is constructed using a plurality of cells such as a wet type secondary battery particularly for a vehicle, since a group of electrode plates in each cell is isolated only by a single wall of the case, heat is liable to be accumulated at the wall portion, that is, between the cells, and leveling in chemical reaction among the electrode plates is difficult.

Further, for example, in a nickel-zinc cell, if the temperature is not sufficiently low, acceptance of charge at the positive electrodes is extremely low, and the amount of charging electricity is consumed for production of gas.

On the other hand, with the electric vehicle, since the medium passageways for passing a cooling medium, for example, air, therethrough are formed between each adjacent ones of the cells which constitute a wet type secondary battery, cooling of the wet type secondary battery is performed, and leveling in chemical reaction at the electrode plates can be maintained and the life of the wet type secondary battery can be assured. Further, efficient charging can be performed.

In a case wherein a wet type secondary battery is constructed using a plurality of cells if a case of the wet type secondary battery is made in integrated structure which is divided into a plurality of cell accommodating sections, a metal mold for the case is increased in size. Further, with such an integrated structure, in order to form such medium passageways for passing a cooling medium therethrough between the individual cells, a male mold in the form of an elongated pin is necessary, and the metal mold is complicated.

On the other hand, with the electric vehicle, since only a case is made with a size for each cell and the ribs in the form of projections are formed on the outer periphery of the case, then the cases are assembled to each other. Thus, the medium passageways described above are formed between the ribs and the production of a metal mold for the case (cell case) is easy. Further, since the medium passageways of a comparatively small sectional area are formed around each of the cell cases, cooling of the individual cells can be performed uniformly.

According to the electric vehicle, since positioning of the cell cases can be performed fitting of the projected portions and the recessed portions formed on the outer peripheries of the individual cell cases, the positioning can be performed accurately and readily. Further, also the strength of the individual cell case connecting portions is sufficient.

Although, in order to perform charging of a wet type secondary battery, the temperature of the battery must be in a sufficiently low condition as described above, a cooling method of the natural convection type will take time for cooling, and in the hot summertime, the temperature may not drop to a charging allowing temperature even after waiting for a long time.

On the other hand, according to the electric vehicle, since the cooling medium compulsively passes in the medium passageways, the wet type secondary battery can be cooled efficiently, and as a result, only a short period of time is required by the time of the starting of an efficient charging.

Further, also a rise of the temperature of the wet type secondary battery during charging can be prevented, and the charging can be performed efficiently.

According to the electric vehicle, the fan is compulsively energized during charging of the wet type secondary battery, and since the energization is topped, for example, during traveling, wasteful consumption of power is prevented.

According to the -electric vehicle, since the fan is energized when the temperature of the wet type secondary battery exceeds the predetermined temperature and the energization is stopped when the temperature of the wet type secondary battery becomes lower than the predetermined temperature, wasteful consumption of power is prevented.

Further, if the energization is stopped when the temperature of the battery drops during charging, then also wasteful consumption of original charging power can be prevented.

In the electric vehicle, cooling of the wet type secondary battery is performed efficiently during driving of the vehicle even if the fan is not energized. In other words, cooling of the wet type secondary battery during traveling of the vehicle can be performed efficiently without increasing the accumulated power of the battery.

In the wet type secondary battery, since oxygen gas produced at the positive electrodes passes substantially uniformly through the separator and moves to the negative electrode, the oxygen gas attracting reaction at the negative electrode is leveled. As a result, the discharging area of the negative electrode opposing the positive electrode is not decreased very much. Consequently, reduction of the discharging capacity is prevented and the life expectancy is extended.

In addition, in the wet type secondary battery, since electrolyte maintained between the electrode plates is performed by the liquid impenetrable paper wound around the electrode plates, the wet type secondary battery can be used even if it is directed horizontally. In other words, the range of application of the wet type secondary battery is expanded.

Further, in the wet type secondary battery, since there is no possibility that a partial withering area of electrolyte may appear at a surface of each of the electrode plates even if charging and discharging are repeated, the life expectancy is extended comparing with conventional wet type secondary batteries.

Further, since the cooling apparatus for the battery and the cooling apparatus for the electric motor, the non-stage transmission ratio and so forth are not provided separately but are integrated with each other, construction of the cooling apparatus is simplified.

In a further embodiment of the following, the present invention will be described in detail with reference to the drawings.

Figure 20:
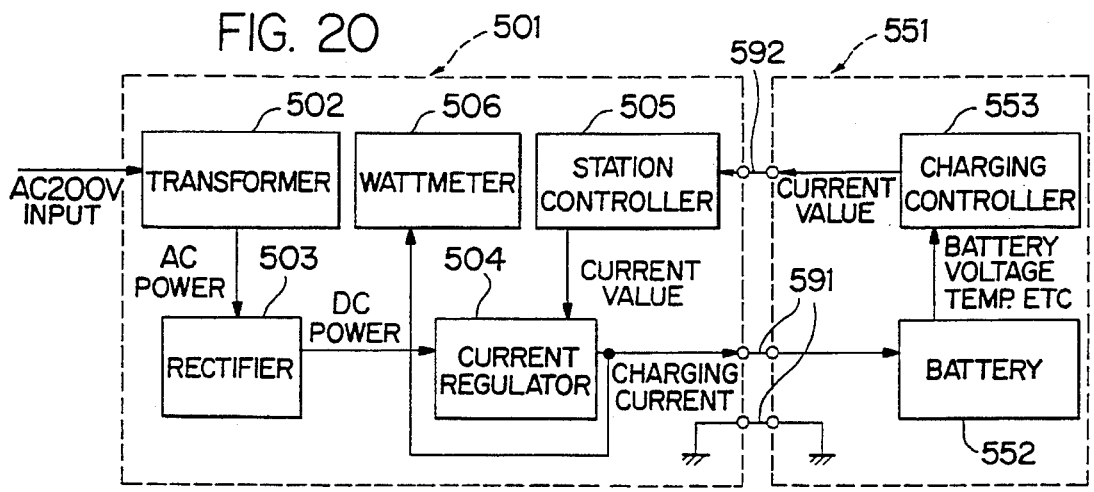
FIG. 20 is a block diagram of a first embodiment of the present invention.

FIG. 20 is a block diagram of a further embodiment of the present invention. Referring to FIG. 20, a charging station 501 includes a transformer 502 connected to a predetermined ac power source, a rectifier 503 for rectifying an output of the transformer 502 and a current regulator 504 for controlling rectified dC power, i.e., controlling a charging current, in response to a controlling signal outputted from a station controller 505 which will be hereinafter described. The station controller 505 is provided for receiving information of a charging current value outputted from an electric vehicle 551 and controlling the current regulator 504 using the information, and a wattmeter 506 is provided for displaying charging power outputted from the current regulator 504.

Meanwhile, the electric vehicle 551 includes, in addition to a battery 552, a charging controller 553 for determiner, using a known technique, a charging current to be inputted to the battery 552 using a temperature, a battery voltage and so forth of the battery 552.

The charging controller 553 transfers a signal representative of a charging current to the station controller 505 of the charging station 501 by way of a connecting cable 592. Meanwhile, the current regulator 504 supplies charging power to the battery 552 by way of a pair of power source cables 591.

Figure 21:
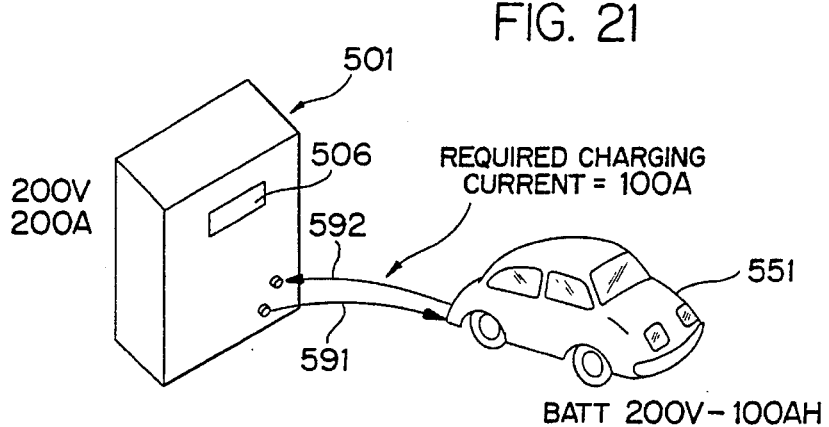
FIG. 21 is a schematic perspective view of the first embodiment of the present invention.
Figure 22:
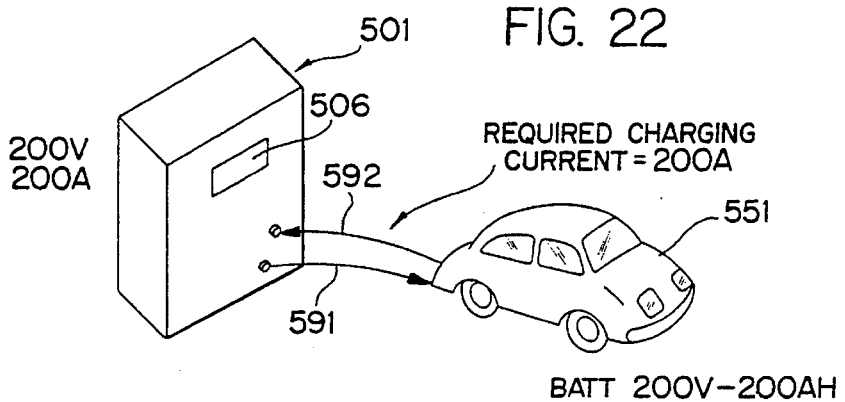
FIG. 22 is a schematic perspective view of the first embodiment of the present invention.

FIGS. 21 and 22 are schematic perspective views of the further embodiment of the present invention. Referring to FIGS. 21 and 22, similar reference numerals to those of FIG. 20 denote similar or equivalent portions. As shown in FIGS. 21 and 22, when the required charging current required by the battery carried on the electric vehicle 551 is 100 [A] and 200 [A], respectively, charging is performed with the respective current values.

In this manner, in this embodiment of the present invention, since various power devices are on the charging station 501 side, the weight of the electric vehicle 551 is small, and further, since charging can be performed using a high current, reduction in charging time can be achieved.

Further, since the charging controller 553 for determiner a charging current is carried on each electric vehicle 551, an optimum charging current is determined for each vehicle 551 and this is outputted to the charging station 501. Accordingly, charging can be performed always in an optimum condition without being influenced by a difference in a battery.

Further, also the charging voltage can be adjusted automatically if the charging controller 553 outputs a charging voltage or the like to the station controller 505 in accordance with the necessity.

Figure 23:
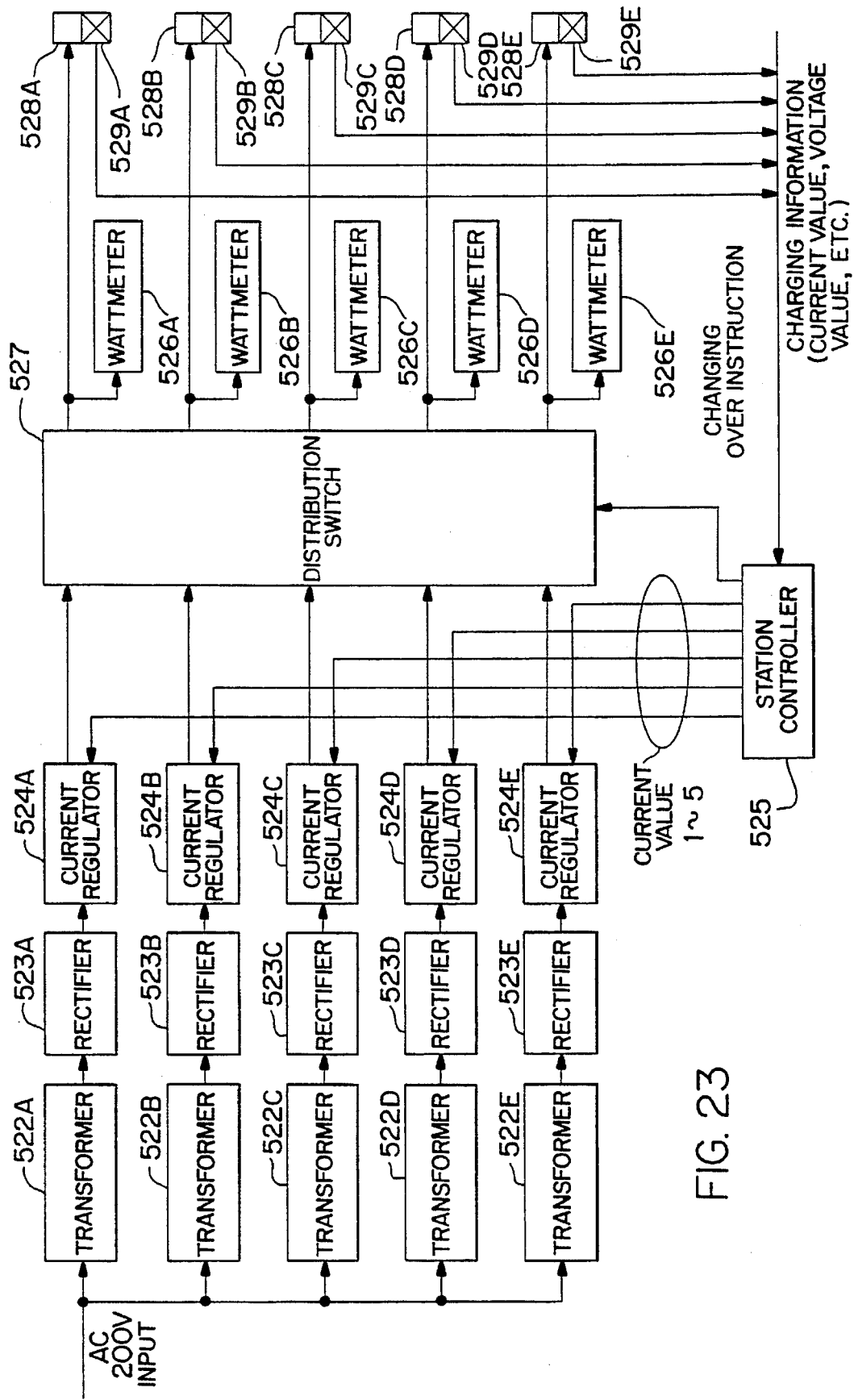
FIG. 23 is a block diagram of a second embodiment of the present invention.

FIG. 23 is a block diagram of another embodiment of the present invention. This embodiment is constructed such that it includes a plurality of, five in the present example, sets of charging apparatus shown in FIG. 20 and each includes a transformer, a rectifier and a current regulator. Outputs of the current regulators of the individual charging apparatus are connected to power source terminals 528A to 529E by way of a distribution switch 527.

In particular, first, each of the charging apparatus is constituted from components denoted by like alphabetical symbols of transformers 522A to 522E, rectifiers 523A to 523E, current regulators 524A to 524E, wattmeters 526A to 526E, power source terminals 528A to 528E and information terminals 529A to 529E. The transformers 522A to 522E are connected to the current regulators 524A to 524E by way of the rectifiers 523A to 523E, and the current regulators 524A to 524E are connected to the distribution switch 527. Meanwhile, the power source terminals 528A to 528E are connected to the wattmeters 526A to 526E and the distribution switch 527.

Figure 24:
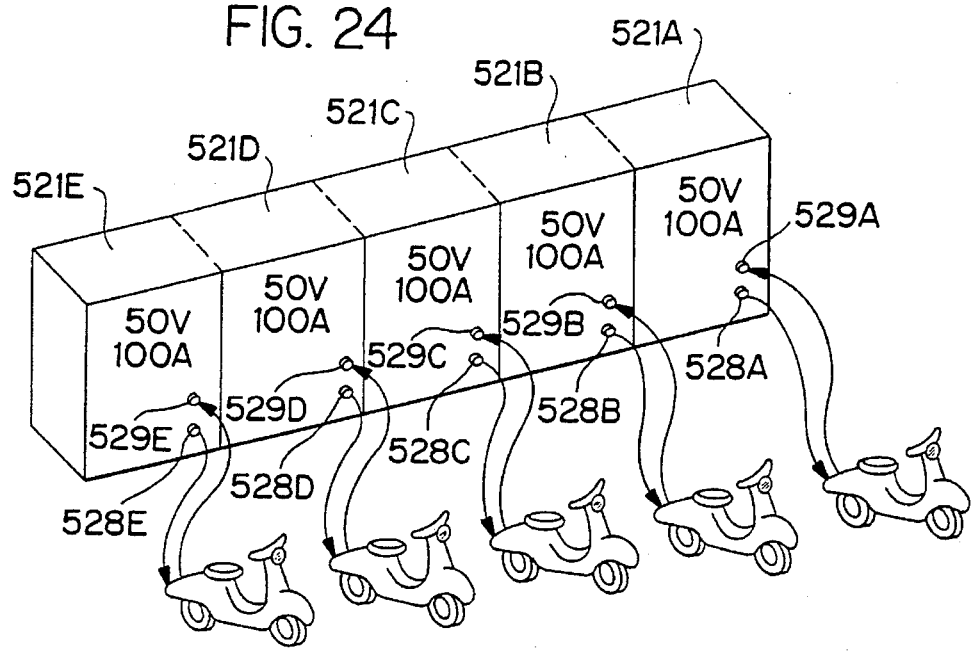
FIG. 24 is a schematic perspective view of the second embodiment of the present invention.

The station controller 525 is connected to the information terminals 529A to 529E, the current regulators 524A to 524E and the distribution switch 527. The power source terminals 528A to 528E are connected to batteries (not shown) of electric vehicles 561 as shown in FIG. 24, and the information terminals 529A to 529E are connected to charging controllers, refer to reference numerals 553 of FIG. 20, carried on the individual electric vehicles 561. The individual power source terminals and information terminals are paired with each other and connected to the electric vehicles.

It is to be noted that the charging controller carried on each of the electric vehicles outputs charging current information and charging voltage information. Meanwhile, the wattmeters 526A to 526E are omitted in FIGS. 24 and 25 which will be hereinafter described.

In this embodiment of the present invention having the construction described so far, charging information, a charging current and a charging voltage, is inputted by way of any of the information terminals 529A to 529E from a charging controller of an electric vehicle to the station controller 525, and when the station controller 525 detects that the charging voltage is lower than one of output voltages of the current regulators 524A to 524E, it energizes the distribution switch 527 so as to connect any one of the current regulators 524A to 524E to a power source terminal corresponding to the information terminal connected thereto, any one of the power source terminals 528A to 528E.

On the other hand, when the station controller 525 detects that the charging voltage is lower than an output voltage of one of the current regulators 524A to 524E, it connects a plurality of current regulators 524A to 524E so that an output voltage corresponding to the charging voltage may be obtained and then energizes the distribution switch 527 so as to connect the plurality of current regulators to a power source terminal corresponding to the information terminal connected thereto, any one of the power source terminals 528A to 528E. The current regulators not connected can be connected to other electric vehicles.

Accordingly, when the charging voltage of the electric vehicles 561 is lower than output voltages of the current regulators 524A to 524E of the individual current regulators 521A to 521E, different electric vehicles 561 can be connected to the individual charging apparatus 521A to 521E as shown in FIG. 24.

Figure 25:
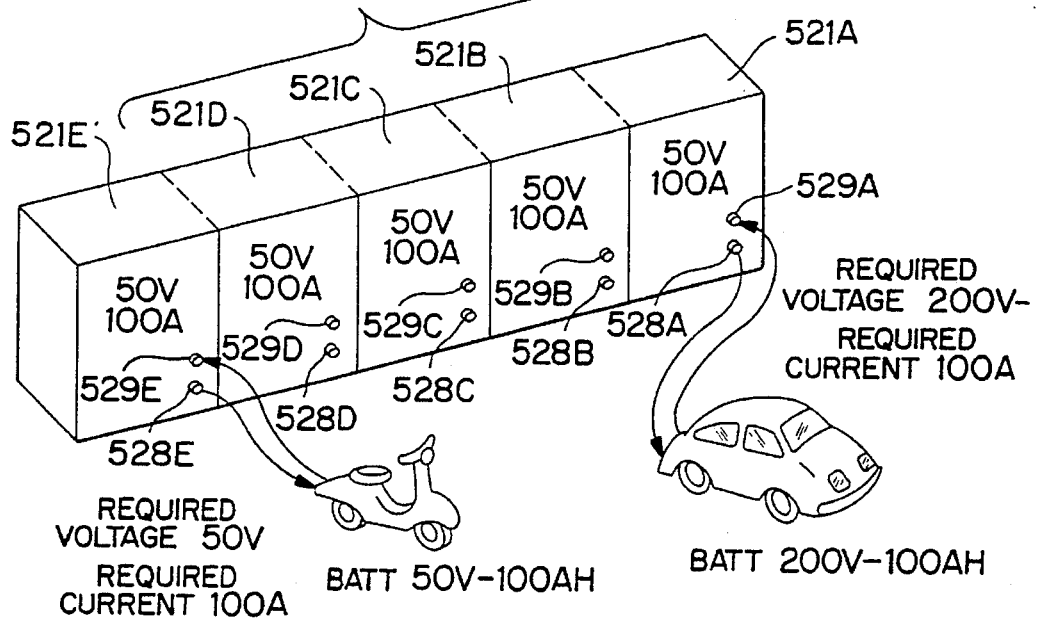
FIG. 25 is a schematic perspective view of the second embodiment.

Meanwhile, when the charging voltage of the electric vehicles 551 is equal to, for example, four times the output voltages of the current regulators 524A to 524E of the individual charging apparatus 521A to 521E, for example, the charging apparatus 521A to 521D are connected directly as shown in FIG. 25. A charging voltage is outputted from one of the charging apparatus 521A. An electric vehicle 561 which requires a charging voltage which is lower than the voltage outputted from the station can be connected to a remaining charging apparatus 521E.

In this manner, in this embodiment, a plurality of electric vehicles having different battery voltages can be charged at a single time by the charging station equipment. The current regulators are connected in series by a number corresponding to a necessary voltage while the remaining regulators can be used similarly for charging of other electric vehicles.

In the present example, while transformers, rectifiers and current regulators are increased, since the power capacity required for each is small, the station equipment will not become large in scale. Further, since changing over of the distribution switch 527 is performed automatically by the station controller 525 in accordance with charging information outputted from each electric vehicle, the station is convenient to use.

It is to be noted that, in the case where a plurality of current regulators are connected in series in use as in FIG. 25, the station controller 525 controls the current regulators so that the current regulating values may all coincide with each other. In this instance, power information to be outputted to the individual wattmeters may be added such that a result of an addition, total power value, may be outputted to a single wattmeter, for example, a wattmeter of a charging station provided with a power source terminal to which charging power is outputted.

Figure 26:
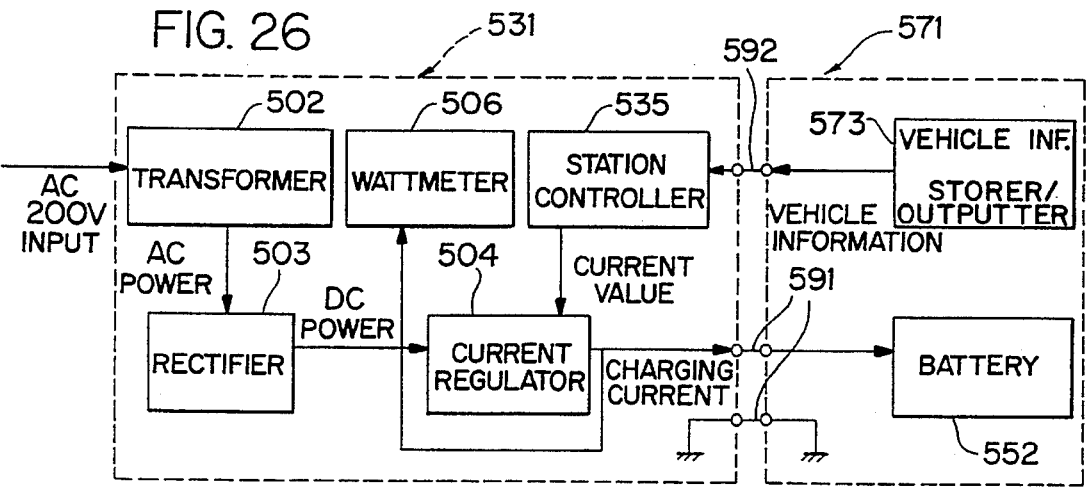
FIG. 26 is a block diagram of a third embodiment of the present invention.

FIG. 26 is a block diagram of another embodiment of the present invention. Referring to FIG. 26, similar reference characters to those of FIG. 20 denote similar or equivalent portions. In FIG. 26, an electric vehicle 571 includes a vehicle information storer/outputter 573. The vehicle information storer/outputter 573 has stored therein information representative of a type of the electric power 571 or the battery 552, hereinafter referred to as "vehicle information," and outputs this to the station controller 535 of the charging station 531. The station controller 535 has stored in advance therein charging current values and charging voltage values in accordance with vehicle information or a charging algorithm or the like, determines a charging current in accordance with inputted information and controls the current regulator 504.

Figure 27:
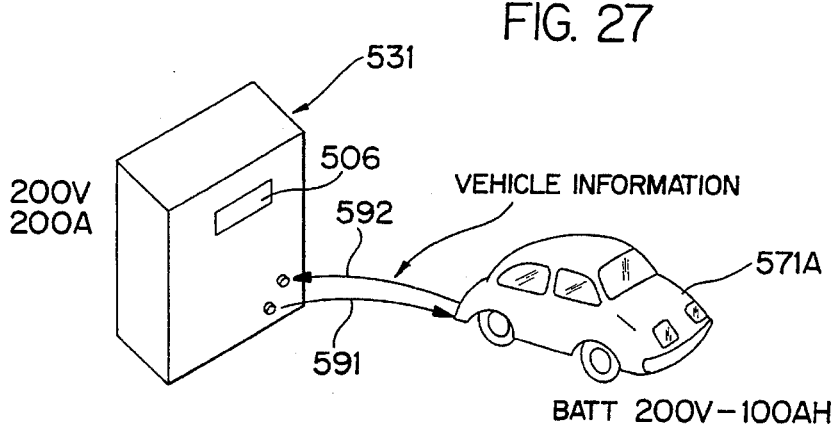
FIG. 27 is a schematic perspective view of the third embodiment of the present invention.
Figure 28:
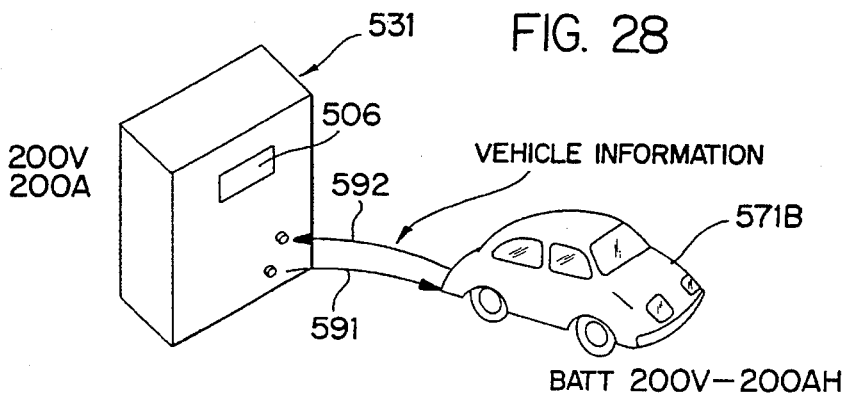
FIG. 28 is another schematic perspective view of the third embodiment of the present invention.

FIGS. 27 and 28 are schematic perspective views of an additional embodiment of the present invention. Referring to FIGS. 27 and 28, similar reference characters to those of FIG. 20 denote similar or equivalent portions. Charging is performed with different charging currents, in the present example, 100 [A] and 200 [A], in accordance with vehicle information of electric vehicles 571A and 571B, respectively.

According to this embodiment of the present invention, a charging may be achieved in the case where the type of a battery or a charging method is different or a charging difference is different due to a difference in the cell, which may be a defect for example, of the separately installed charger shown in FIG. 33.

Figure 29:
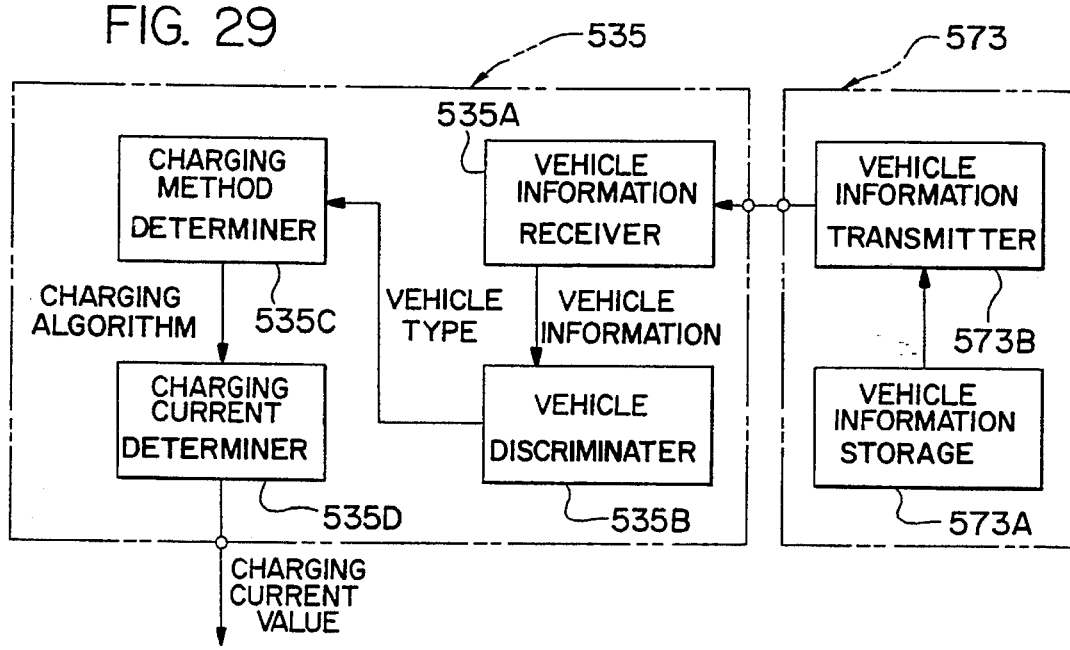
FIG. 29 is a block diagram showing detailed construction of a station controller and vehicle information storing/outputting means.

A preferred construction of the station controller 535 and the vehicle information storer/outputter 573 shown in FIG. 26 is shown in FIG. 29.

Referring to FIG. 29, the vehicle information storer/outputter 573 includes vehicle information storage 573A and vehicle information transmitter 573B.

Vehicle information outputted from the vehicle information transmitter means 573B is inputted to and detected by vehicle information receiver 535A of the station controller 535 and then transferred to vehicle discriminator 535B, in which a type of the vehicle or the battery is subsequently discriminated. A charging method is determined in accordance with the information by the charging method determiner 535C, and then a charging current value is determined by charging current determiner 535D. The charging current value is outputted to the current regulator 504 as illustrated in FIG. 26.

Figure 30:
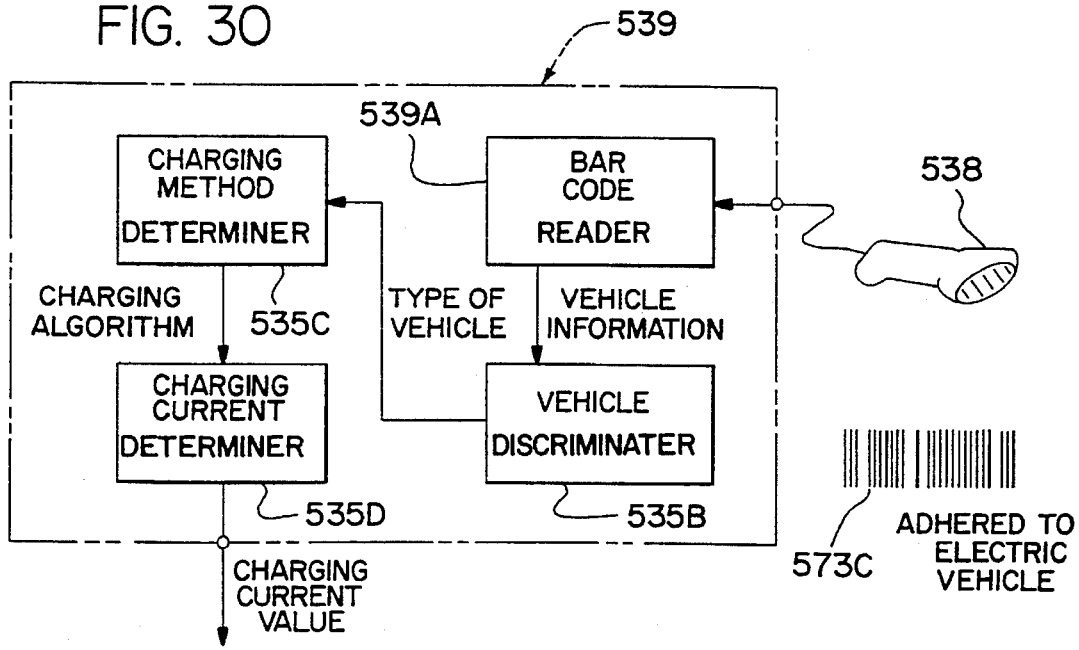
FIG. 30 is a block diagram showing another example of FIG. 29.

FIG. 30 is a block diagram showing the construction of another example of FIG. 29. Referring to FIG. 30, similar reference characters to those of FIG. 29 denote similar of equivalent portions.

Referring to FIG. 30, an electric vehicle has only a bar code 573C applied at a predetermined position thereof. Vehicle information is recorded on the bar code 573C and is read by bar code scanner 538. Bar code reader means 539A judges vehicle information read by the bar code reader 538 and outputs the information to the vehicle discriminator 535B. In this manner, even if the specific vehicle information storer/outputter 573 is not provided, the charging station can detect the vehicle information.

In such a method as described above, the station controller 535 of a charging station may not include specific charging algorithms for individual vehicles. A charging algorithm may-be transmitted from a vehicle side by digital communication. With this method, even when a vehicle is different, optimum charging can be performed. In addition, on a charging station side, if the current regulator assures such a function as operation in accordance with the charging algorithm, even when the charging voltage or the charging current are different, components can be replaced freely and variation of the station equipment can be made without changing the vehicle parts or without special operation during charging.

Figure 31:
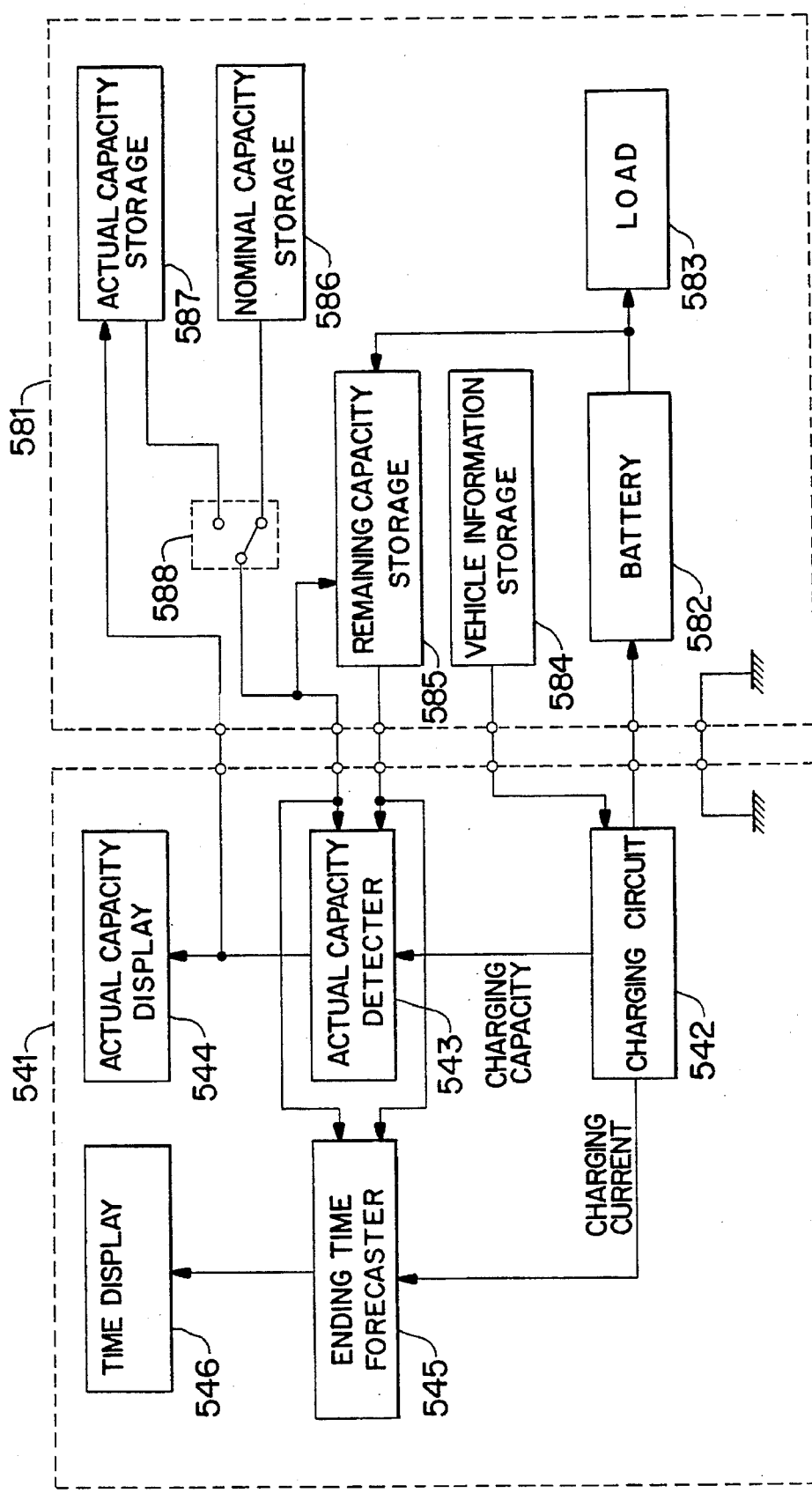
FIG. 31 is a functional block diagram of a fourth embodiment of the present invention.
Figure 34:
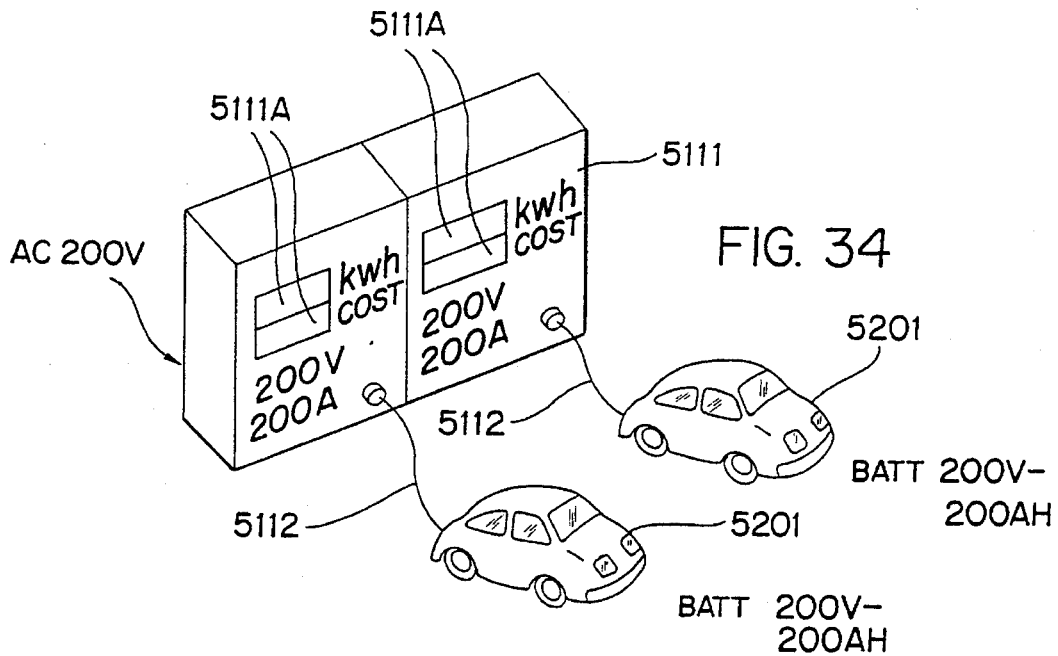
FIG. 34 is a schematic perspective view of a conventional charging station.
Figure 35:
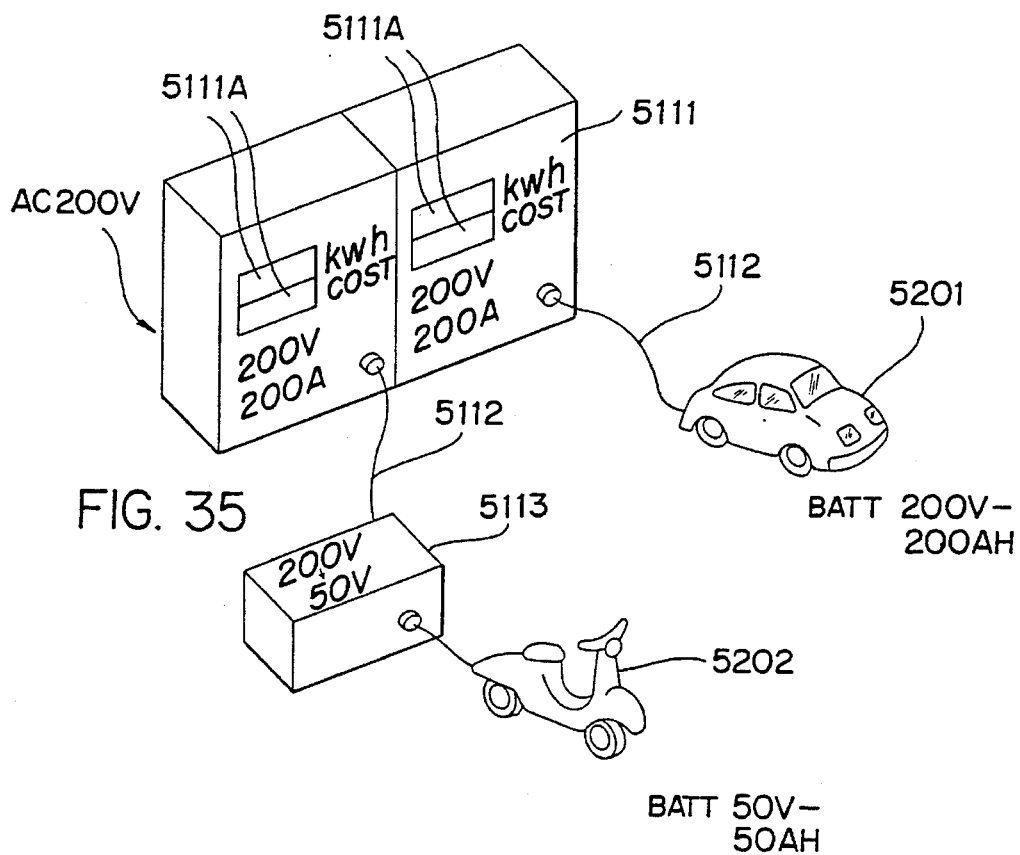
FIG. 35 is a schematic perspective view of a conventional charging station employing a converting adapter.

FIG. 31 is a functional block diagram of another embodiment of the present invention.

An electric vehicle side 581 includes nominal capacity storage 586 for storing a nominal capacity of a battery 582 therein and actual capacity storage 587 for storing therein an actual capacity of a battery output from a charging station 541 in accordance with a technique which will be hereinafter described. The nominal capacity storage 586 and the actual capacity storage 587 are connected to changing over means 588. The changing over switch 588 selects nominal capacity storage 586, when, for example, the electric vehicle 581 performs charging for the first time. The changing over switch 588 selects actual capacity storing circuit 587, upon charging for the second or following time, when an actual capacity of a battery is stored in the actual capacity storage 587, the actual capacity storage 587.

Remaining capacity storage 585 detects a remaining capacity of a battery using an accumulated value of power supplied from the battery 582 to a load 583, motor or the like, and a nominal capacity or any actual capacity which is an output signal of the changing over switch 588, and stores it therein. Meanwhile, vehicle information storage 584 stores therein such vehicle information as described hereinabove with reference to FIG. 26°

A charging circuit 542 of a charging station 541 determines a charging voltage, a charging current or a charging algorithm using vehicle information outputted from the vehicle information storage 584 and performs charging of the battery 582. Meanwhile, a charging current value supplied from the charging circuit 542 to the battery 582 is outputted to ending time forecaster 545. Further, when charging by the charging circuit 542 comes to an end, a charging capacity is outputted to actual capacity detector 543. The detecter for a charging capacity is built in the charging circuit 542.

The ending time forecaster 545 calculates and forecasts a time until charging is completed using a signal and a charging current outputted from the changing over switch 588 and the remaining capacity storage 585, and outputs it to time display 546.

The actual capacity detector 543 calculates an actual capacity of the battery 582 using a signal outputted from the remaining capacity storage 585 and a charging capacity. The calculated remaining capacity is outputted to and displayed on actual capacity display 544. Further, the actual capacity detecter 543 outputs, in accordance with the necessity, a ratio of an actual capacity calculated in the present cycle to a nominal capacity or an actual capacity stored in the actual capacity storage 587 using an output signal of the changing over switch 588 to the actual capacity display 544, on which it is displayed. Further, an actual capacity of a battery calculated by the actual capacity detecter 543 is outputted to and stored into the actual capacity storage 587.

It is to be noted that an output of the remaining capacity storage 585 and/or an output of the actual capacity storage 587 are outputted to a display unit, not shown, of the electric vehicle 581 as necessary.

Meanwhile, naturally such a charging controller 553 as shown in FIG. 20 may be provided in place of the provision of the vehicle information storage 584.

In this manner, with this embodiment, since the time required for charging, charging waiting time, is displayed, it is convenient for a utilizer of the charging station 541. Further, since an actual capacity of a battery or a ratio of such an actual capacity to a nominal capacity or the like can be displayed, the life and so forth of the battery can be controlled.

The components described in connection with the individual embodiments which are to be disposed on a vehicle side may be mounted on a vehicle-mounted charger as shown in FIG. 32. In this instance, while structure is necessary for controlling and changing over the components described in connection with the individual embodiments and a rectifier of the vehicle-carried charger should take precedence and operate, since this can be constructed readily by a skilled person in the art, description thereof is omitted herein.

Further, such construction may be employed wherein a power source cable and another cable for transmission of information are gathered together such that, when one of the cables is connected, also the other cable is connected. With this construction, charging operation at the charging station is facilitated. Further, the components shown in the various figures given hereinabove can be caused to function by means of a microcomputer in accordance with necessary operation.

According to an electric vehicle and a charging station therefor, the charging station can determine an optimum charging voltage and the optimum charging current using data supplied thereto from an electric vehicle. In particular, since the electric vehicle side does not include any power device such as a transformer, a rectifier, a current regulator and so forth, the weight thereof is not increased. On the charging station side, charging can be performed rapidly in an optimum condition for various electric vehicles without using a converting adapter.

According to an electric vehicle and charging stations therefor, since an actual capacity of a battery of an electric vehicle and/or a charging ending time can be detected on the charging station side, it is convenient for a utilizer of the charging station. Further, the life expectancy and so forth of the battery can be controlled.

According to a charging station, since outputs of the current regulators can be connected in series in accordance with a charging voltage required, charging can be performed for vehicles of different charging voltages by the same charging station. Further, charging can be performed simultaneously for a plurality of vehicles.

Further, when outputs of the current regulators are connected in series, since the remaining regulators can be used in a similar manner for charging of other electric vehicles, the station equipment can be utilized effectively.

As a further embodiment of the present invention shown in FIG. 36, each of one pair of mutually parallel side faces 642P and 642Q, hereinafter referred to as front face 642P and rear face 642Q, of each of the battery cells 642, includes line-shaped ribs 642A extending from an upper face 642U to a lower face 642T, annular projections 642D and projections 642C having a diameter substantially equal to the inner diameter of the annular projections 642D.

Further, three ribs 642B extending from the front face 642P to the rear face 642Q are formed on each of the other pair of mutually parallel side faces, hereinafter referred to merely as side faces 642R and 642S, of each of the battery cells 642. Two projections 642E are formed between each adjacent ones of the ribs 642B.

Threaded positive and negative terminal electrodes 6105A and 6106A and 6 hubs 6300 for tapping screws, hereinafter referred to merely as tapping hubs, are formed on the upper face 642U of the battery cell 642. The 6 tapping hubs 6300 are disposed on the upper face of the battery cell 642 in symmetry with respect to the axis of the ordinate and the axis of the abscissa of the upper face of the battery cell 642.

The annular projections 642D formed on the front face 642P of each of the battery cells 642 are formed at positions corresponding to the projections 642C formed on the rear face 642Q of the battery cell 642. Similarly, the projections 642C formed on the front face 642P are formed at positions corresponding to the annular projections 642D formed on the rear face 642Q.

Figure 36:
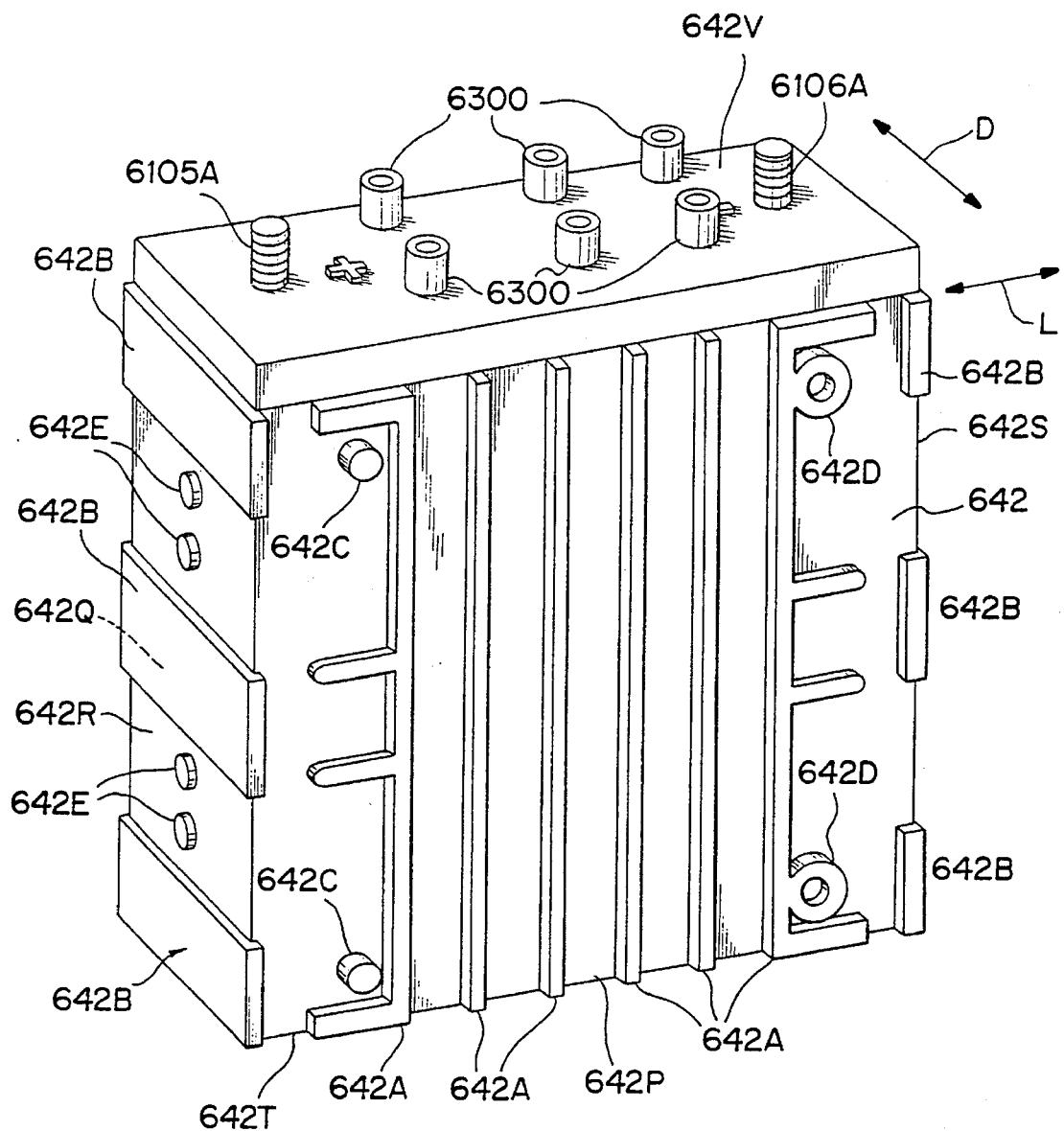
FIG. 36 is a perspective view of a battery cell which is an embodiment of the present invention.
Figure 43:
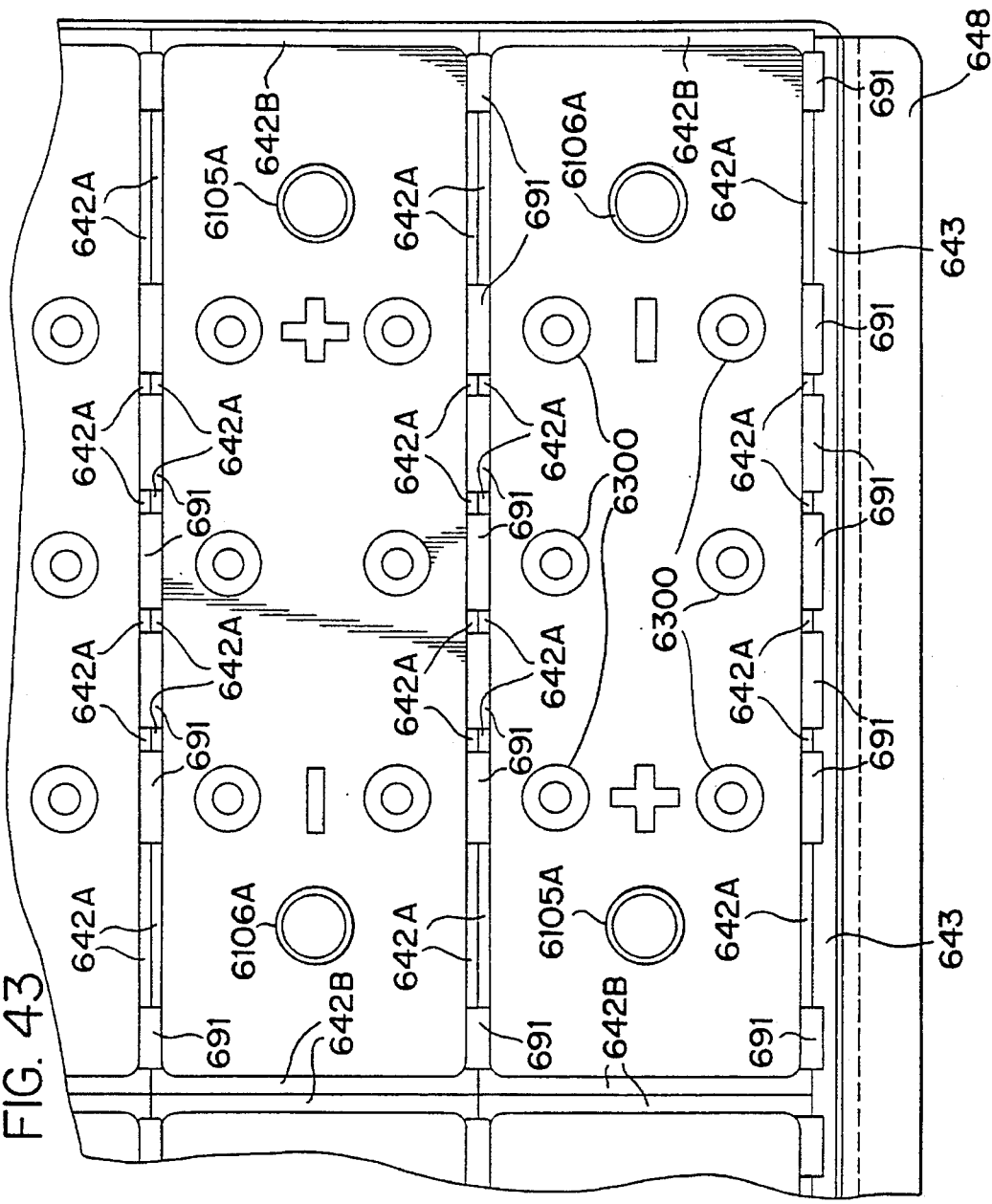
FIG. 43 is an enlarged view of essential part of FIG. 42.

The battery cell 642 having such a construction as described above is placed one on another to stack four high in a vertical direction, as indicated by an arrow mark D in FIG. 36, such that the projections 642C on the front face of each cell are fitted in the inner diametrical portions of the annular projections 642D on the rear face of an adjacent cell. By such placement one on top of another, since the ribs 642A formed on the front face 642P and the rear face 642Q of the adjacent battery cells 642 are opposed to each other, air passageways 691 are formed between the adjacent cells 642 as shown in FIG. 43. In this instance, positioning of the four battery cells 642 in the vertical direction is performed by first connecting plates 644.

Figure 48:
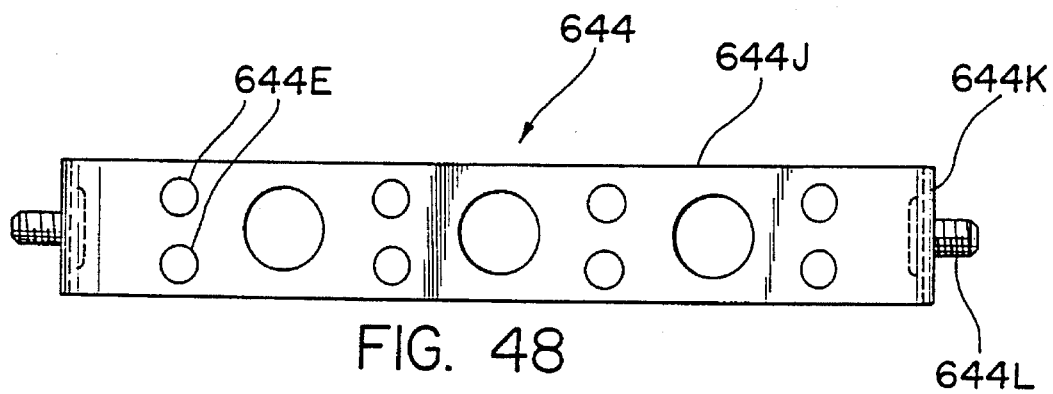
FIG. 48 is a plan view of a first connecting plate 644.
Figure 49:
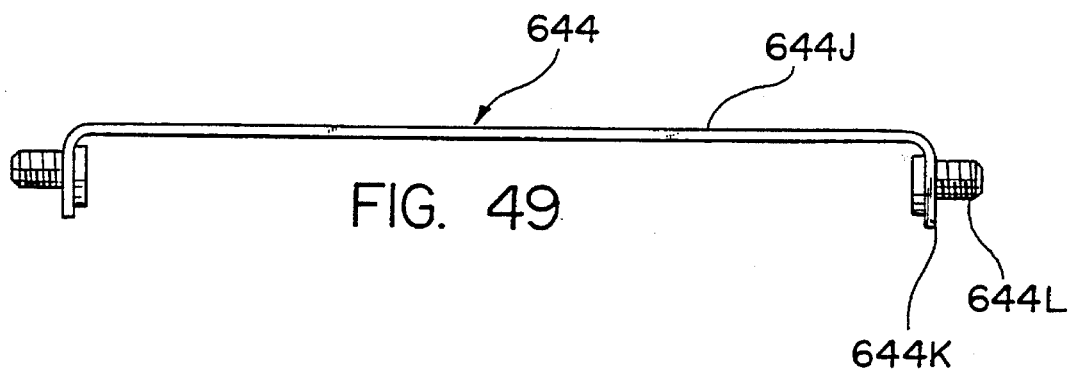
FIG. 49 is a side elevational view of the first connecting plate 644.
Figure 50:
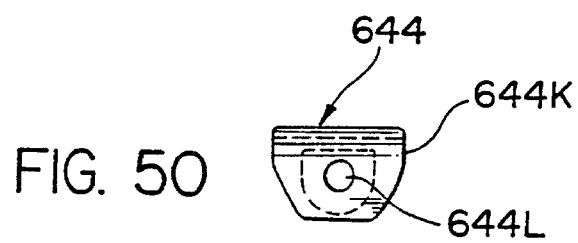
FIG. 50 is a side elevational view of the first connecting plate 644.

Each of the first connecting plates 644 is constituted from, as shown in FIGS. 48 to 50, a belt-formed portion 644J having a pair of flanges 644K at the opposite ends thereof, and a bolt 644L provided on each of the flanges 644K.

The thickness of the belt-formed portion 644J is substantially equal to twice the projecting height of the projections 642E, FIG. 36, and hole portions 644E are perforated in the belt-formed portion 644J for accommodating the projections 642E. The battery cells 642 are placed one on top of another to stack four high in the vertical direction, of the arrow mark D in FIG. 36, by fitting the hole portions 644E with the projections 642E formed on the side faces of each of the cells 642.

Figure 47:
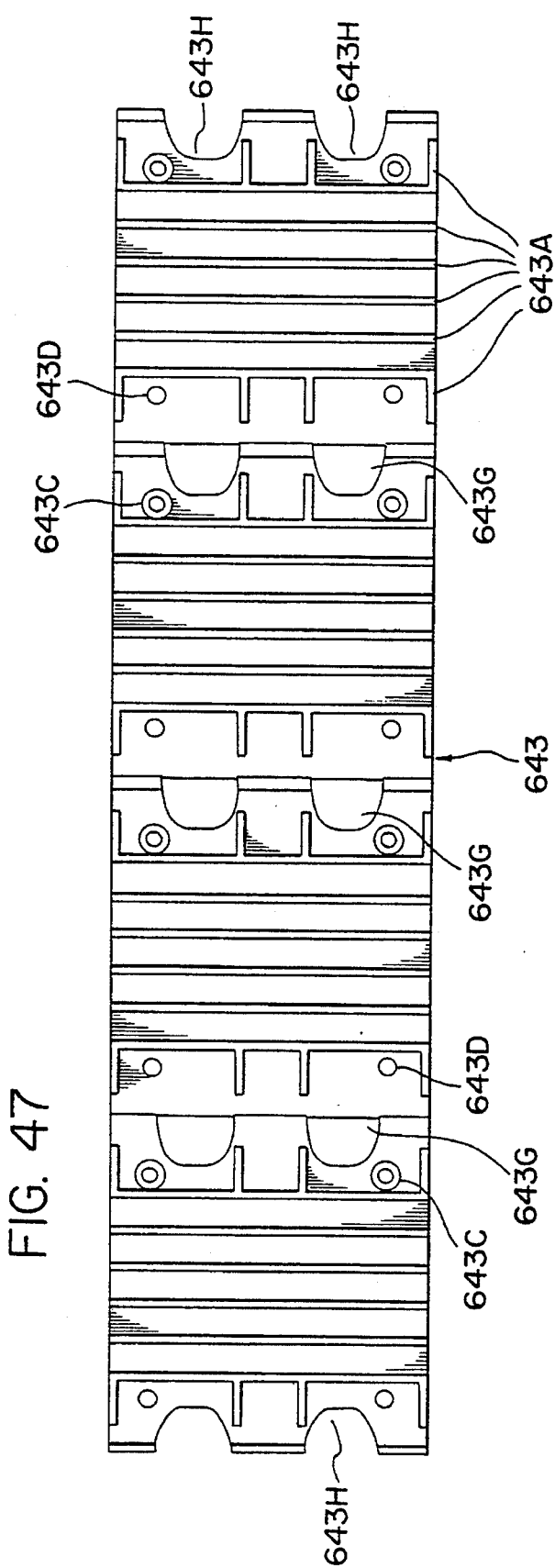
FIG. 47 is a plan view of a second connecting plate 643.

The battery cells 642 are placed one on top of another in such a manner as described above and are prepared in four sets. The cells are arranged closely with each other in a horizontal direction, the direction indicated by an arrow mark L in FIG. 36. A second connecting plate 643 shown in FIG. 47 is mounted on the four battery cells 642 at the lowermost bottom portion where the front faces 642P thereof are exposed and also on the four cells 642 at the uppermost top portion where the rear faces 642Q thereof are exposed.

Ribs 643A similar to the ribs 642A formed on the front face 642P or the rear face 642Q of each of the cells 642 are closely contacted in the horizontal direction with each other and are formed on each of the second connecting plates 643. Projections 643D and annular projections 643C are formed at positions on each of the second connecting plates 643 corresponding to the annular projections 642D and the projections 642C of each of the cells 642. The mounting is performed by fitting the projections 643D and the annular projections 643C of the second connecting plates 643 with the annular projections 642D and the projections 642C of the cells 642. Further, in this instance, the flanges 644K of the first connecting plates 644 are exposed from the opened portions 643G and recessed portions 643H of the second connecting plates 643.

Figure 46:
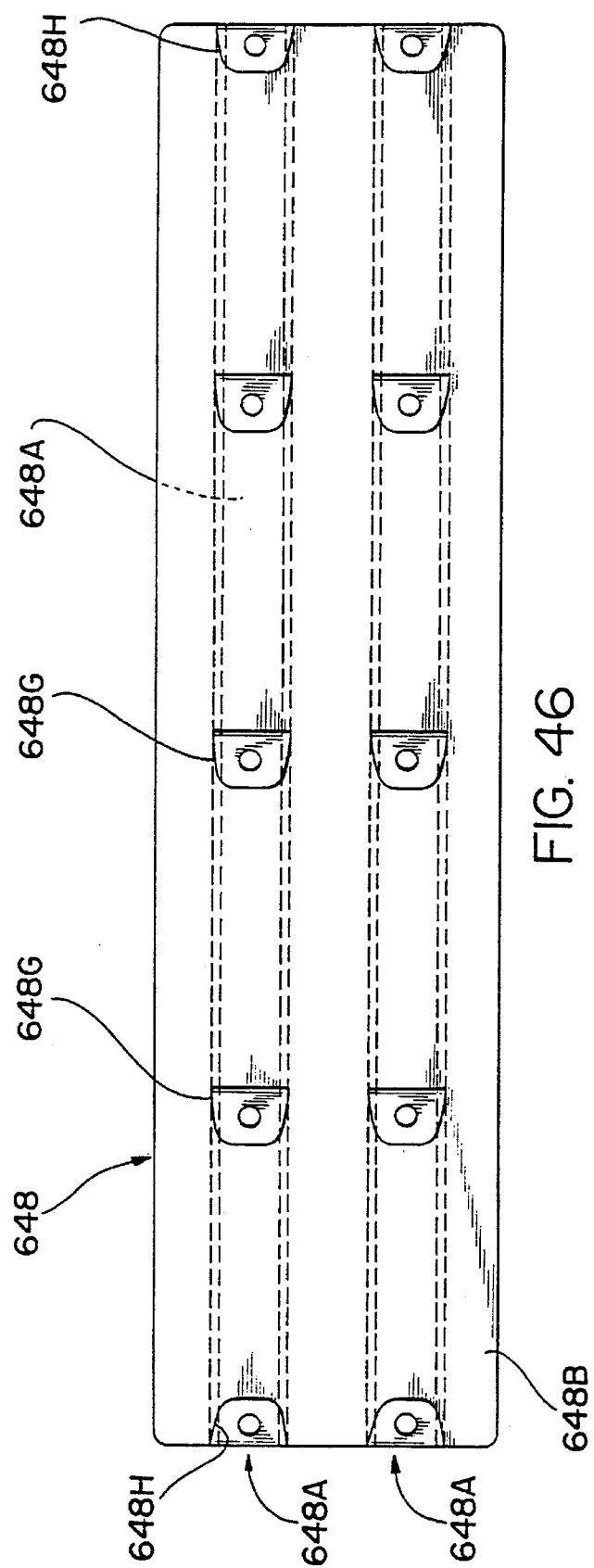
FIG. 46 is a plan view of a third connecting plate 648.

Third connecting plates 648 of FIG. 46 are mounted on the pair of second connecting plates 643 disposed at the top and the bottom. Each of the third connecting plates 648 is constructed from a base frame 648B and angles 648A of an elongated shape. Opened portions 648G and recessed portions 648H conforming to the shape of the flanges 644K are formed at portions of the base frame 648B to which the flanges 644K of the first connecting plates 644 are opened.

Each of the third connecting plates 648 is placed horizontally on the second connecting plates 643 and nuts 649 are screwed with the bolts 644L of the first connecting plates 644 with the angles 648A of the third connecting plate 648 interposed therebetween to hold down and secure the two second connecting plates 643 and the 16 cells 642 by means of the third connecting plate 48.

Figure 45:
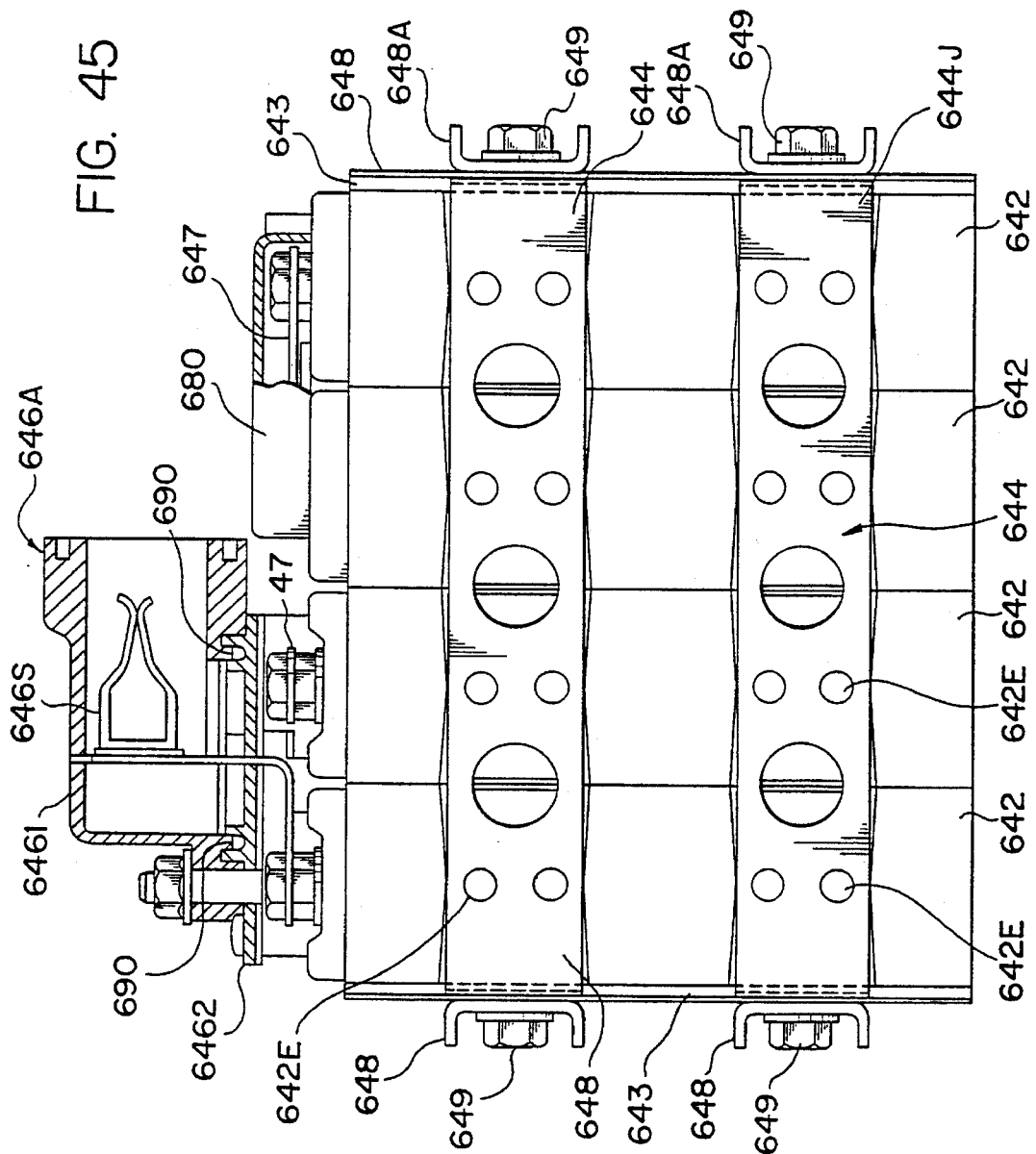
FIG. 45 is an enlarged side elevational view of the battery group.

In order to electrically connect the 16 battery cells 642 in series, the terminal electrodes 6105A and 106A of each adjacent cells 642 are connected to each other by way of an electrode plate 647, refer to FIG. 45. The terminal electrodes 6105A and 6106A and the electrode plate 647 are covered with a cocoon-shaped cover 680 having a shape obtained by cutting a cocoon into two. The cocoon-shaped cover 680 is made of a soft insulating resin, for example, ABS or PVC, and secured to each of the battery cells 642 by suitable means in a condition in which it can be removed and remounted readily.

Figure 44:
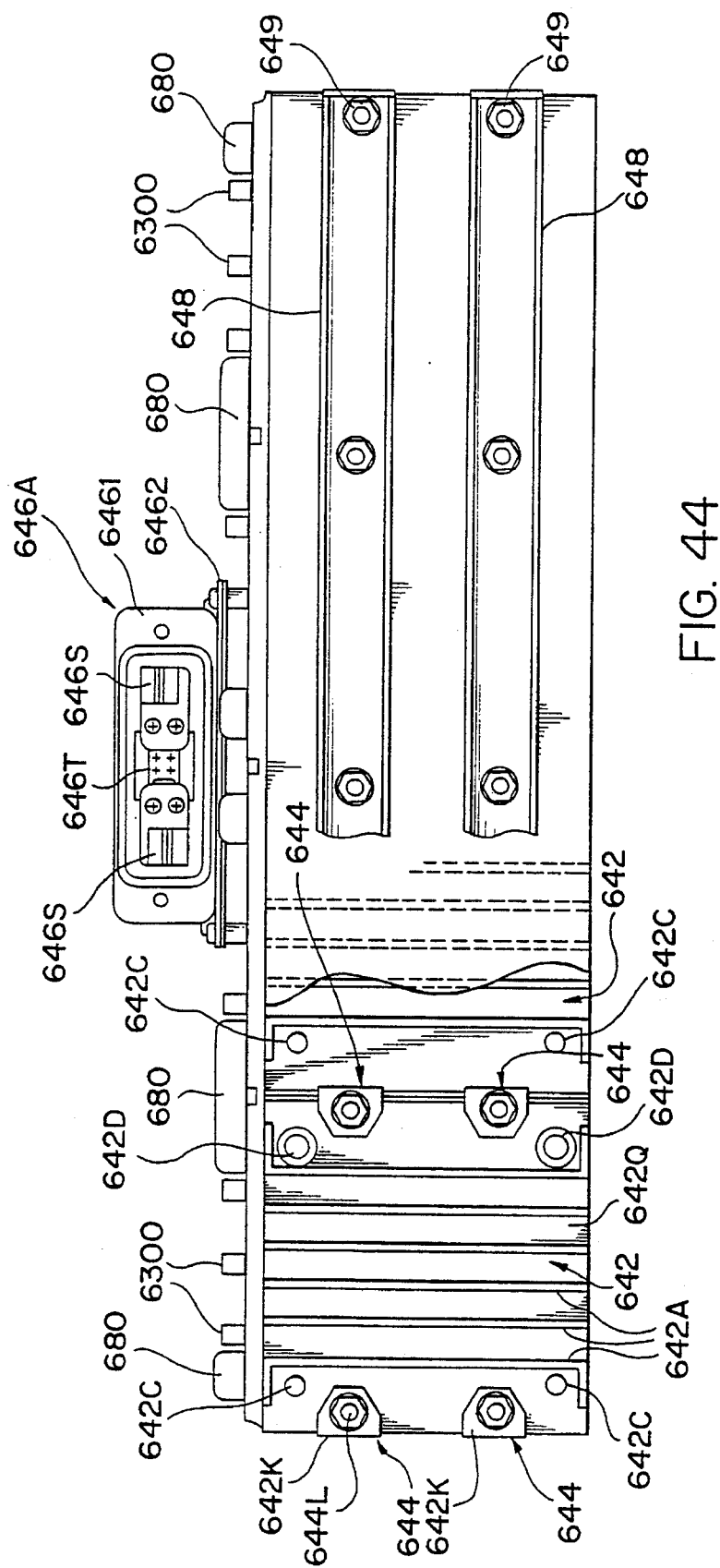
FIG. 44 is a front elevational view, partly broken, of the battery group.

A connector 646A is constituted from a base plate 6462, and a body portion 6461 including feeding clips 646S connected to the positive electrode and the negative electrode at the last ends of the battery cells 642 connected in series and a socket 646T, refer to FIG. 44, connected to temperature sensors (not shown) secured to a plurality of arbitrarily selected electrode plates 647. It is to be noted that the socket 646T is preferably formed integrally with the connector 646A.

The body portion 6461 and the base plate 6462 are secured in a liquid-tight condition to each other with a seal member 690 such as an 0-snap ring interposed therebetween. The connector 646A is fitted in a liquid-tight condition with a coupler 650A at the body portion 6461. Transmission of the feeding of electricity from the battery to a vehicle body and temperature information is performed by way of the connector 646A and the coupler 650A at the body portion 6461.

A silicon resin is filled, as necessary, into a gap between the base plate 6462 and upper faces of the battery cells 642 to prevent admission of water to the terminal electrodes.

A plurality of threaded holes are opened in the base plate 6462. The threaded holes are provided at positions opposing to the tapping hubs 6300 of the plurality of battery cells 642. Securing of the connector 646A is performed by screwing the base plate 6462 to the tapping hubs 6300 of the battery cells 642.

Figure 41:
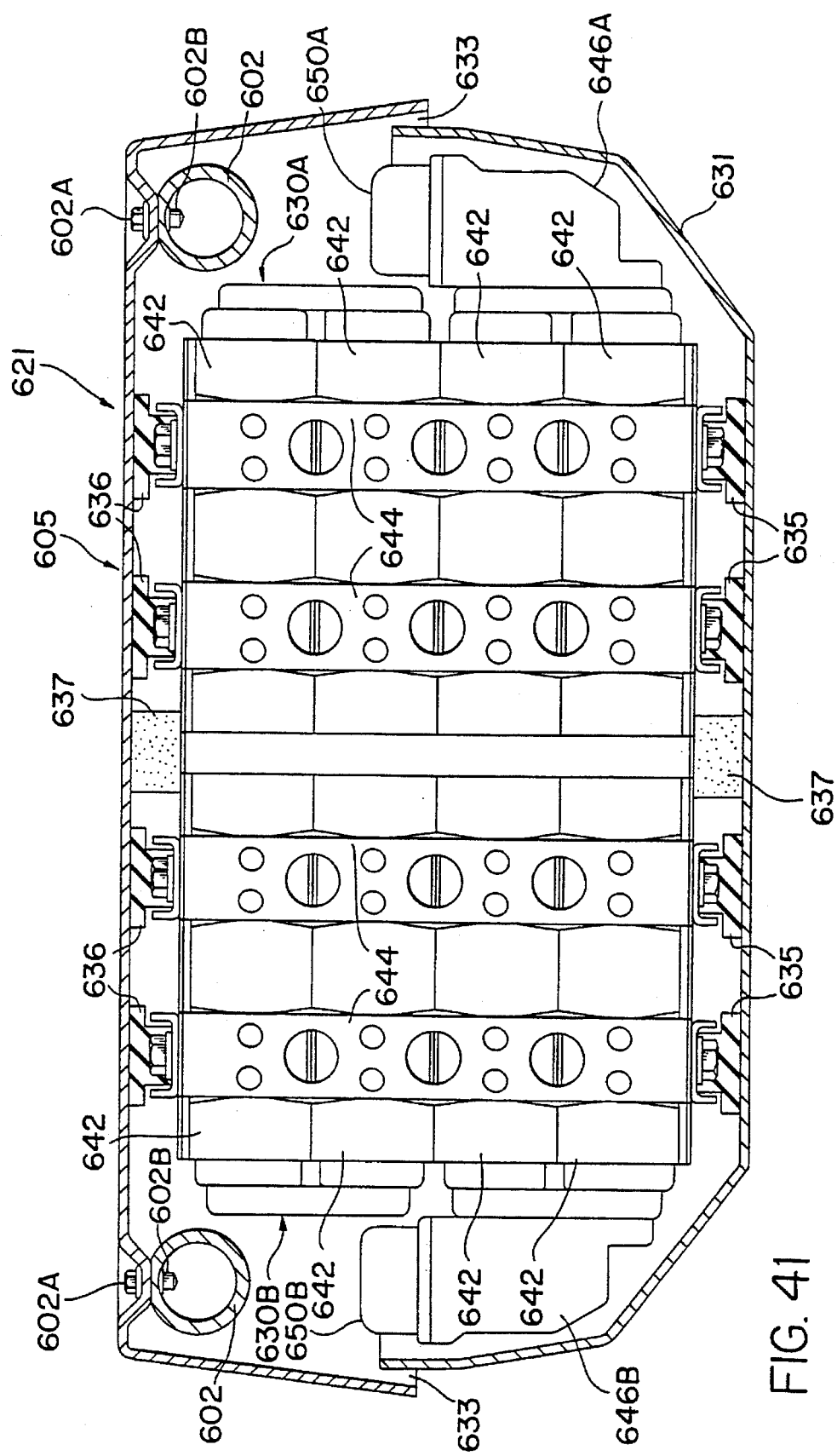
FIG. 41 is a sectional view taken of the battery cell.
Figure 51:
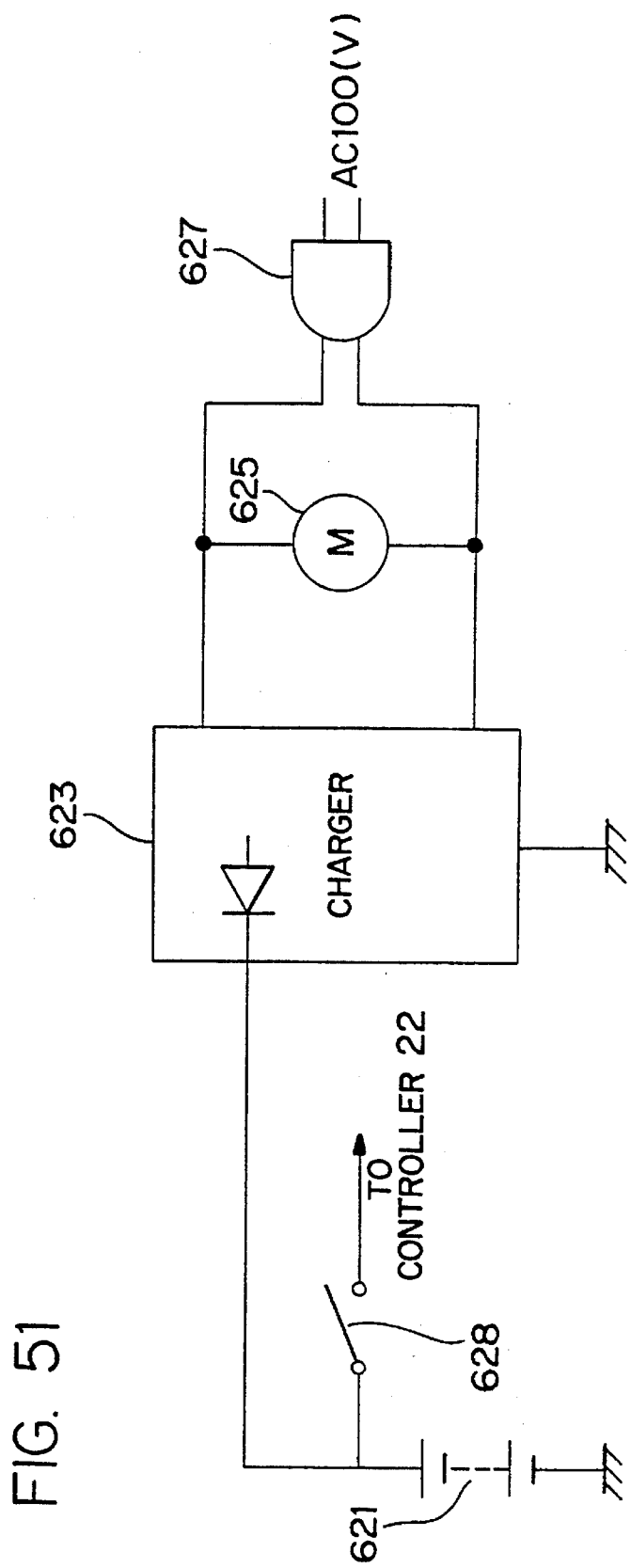
FIG. 51 is a circuit diagram showing an example of connection of a battery apparatus 621, a charger 623 and a fan motor 625.

Also the assembly battery 630B shown in FIG. 41 has a substantially similar construction to that of the assembly battery 630A having such construction as described above. A connector 646B thereof has a symmetrical shape to that of the connector 646A. Output lines of the assembly battery 630A and the assembly battery 630B, that is, the leads led out from the couplers 650A and 650B, are further connected in series to the inside or the outside of the battery case 631 and the step floor 5. The positive electrode side and the negative electrode side are connected to the charger 623 as shown in FIG. 51. It is to be noted that reference numeral 628 denotes a main switch of the electric motorcycle.

As shown in FIG. 51, the charger 623 is connected to the fan motor 625 and the plug 627. The fan motor 625 is driven only when the plug 627 is connected to a plug socket for domestic use or installed at a charging station or the like to perform charging. By driving of the fan motor 625, air is introduced into the battery case 631 and the step floor 5 through the opening portions 633 of FIG. 41. The thus introduced air passes through the air passageways 691 and the air passageways 692 and then is exhausted from the duct 624 disposed at a location rearwardly of the battery apparatus 621.

According to this embodiment, since the electrode plates 647 which connect the individual battery cells 642 to each other are covered with the cocoon-shaped covers 680 which can be removed and remounted readily independently of each other, removal of an electrode plate 647 upon exchanging of a battery cell is easily facilitated. Maintenance and repair of the battery are remarkably improved.

Further, according to the present embodiment, since the projections 642E are provided on the front face of each battery cell and the first connecting plates 644 are engaged with the projections 642E to secure the cells, the positioning and assembly of the cells are facilitated.

Further, according to the present embodiment, since the tapping hubs 6300 are formed on the upper face of each of the battery cells 642 in symmetry with respect to the axis of ordinate and the axis of abscissa of the upper face of the battery cell 642, fixation of the connector 646A can be performed readily.

Further according to the present embodiment, since the body portion 6461 and the base plate 6462 which form the connector 646A are combined with each other with the seal member 690 interposed therebetween, admission of rainwater or the like into the inside of the connector 646A is thus prevented.

In the following, shapes of a battery cell which are other embodiments of the present invention will be described. It is to be noted that, in the embodiments described hereinbelow, illustration of tapping hubs 6300 formed on an upper face and projections 642E formed on side faces is omitted in order to make the drawings more easily observable.

Figure 37:
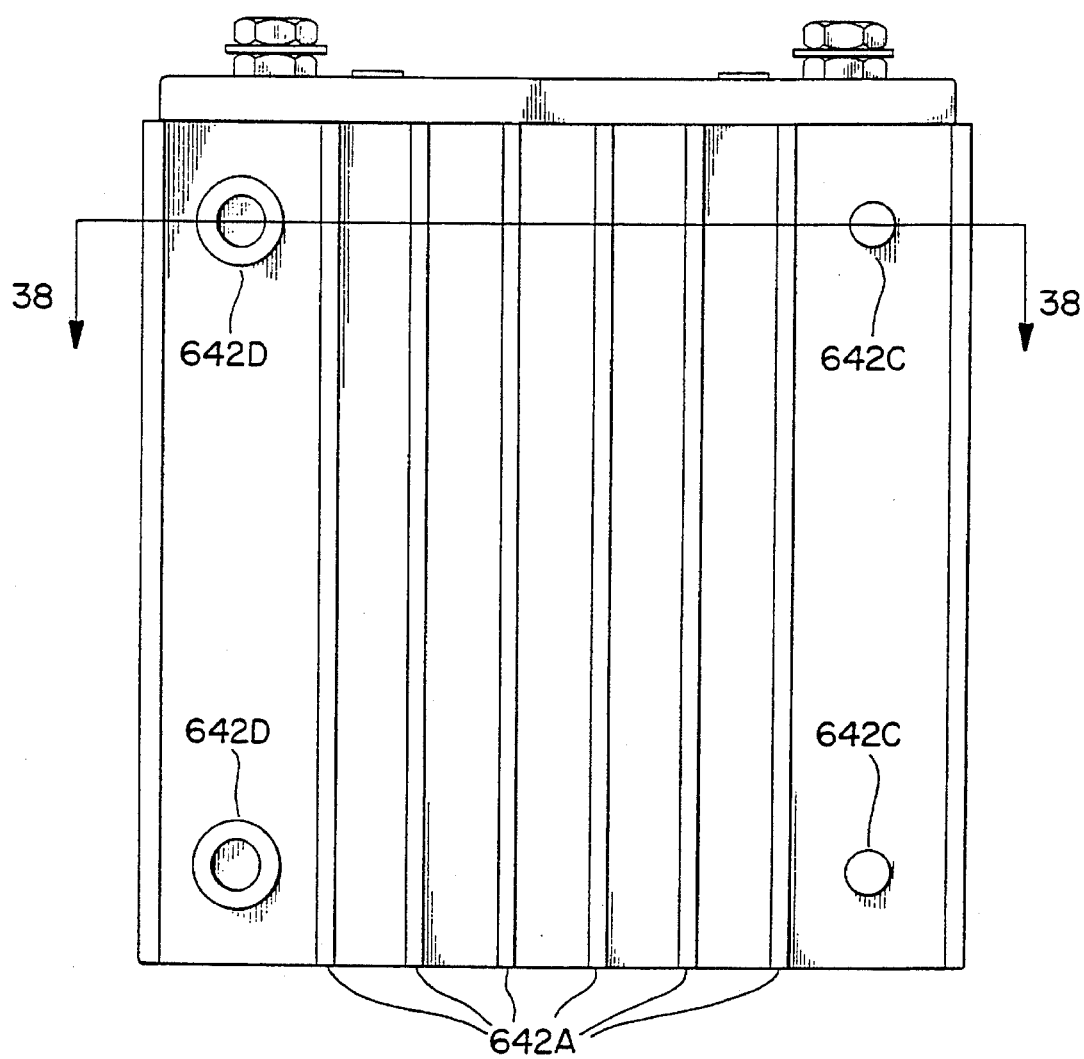
FIG. 37 is a front elevational view of a battery cell which is another embodiment of the present invention.
Figure 38:
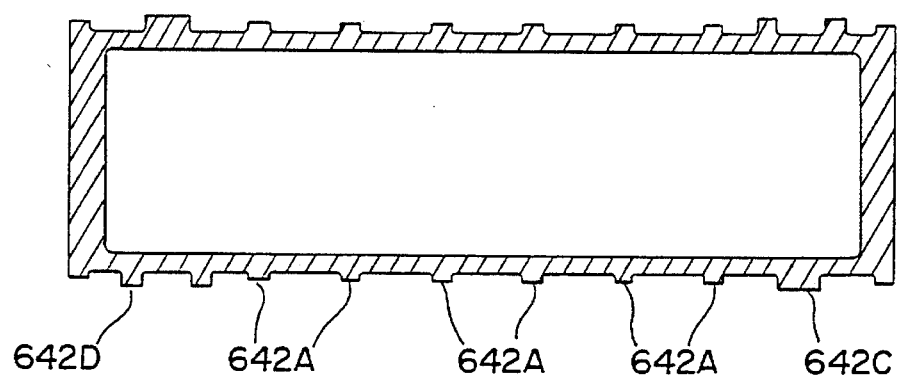
FIG. 38 is a sectional view taken along line 38—38 of FIG. 37.

FIG. 37 is a front elevational view of a battery cell which is another embodiment of the present invention, and FIG. 38 is a sectional view taken along line 38—38 of FIG. 37.

The present embodiment is characterized in that all of the line-shaped ribs 642A extend from the upper face to the lower face.

According to the present embodiment, if the battery cells 642 are placed one on top of another in the vertical direction such that the projections 642C may be fitted with the inner diameter portions of the annular projections 642D, then the ribs 642A of the cells are opposed to each other so that air passageways are formed between each adjacent one of the battery cells 642.

Figure 42:
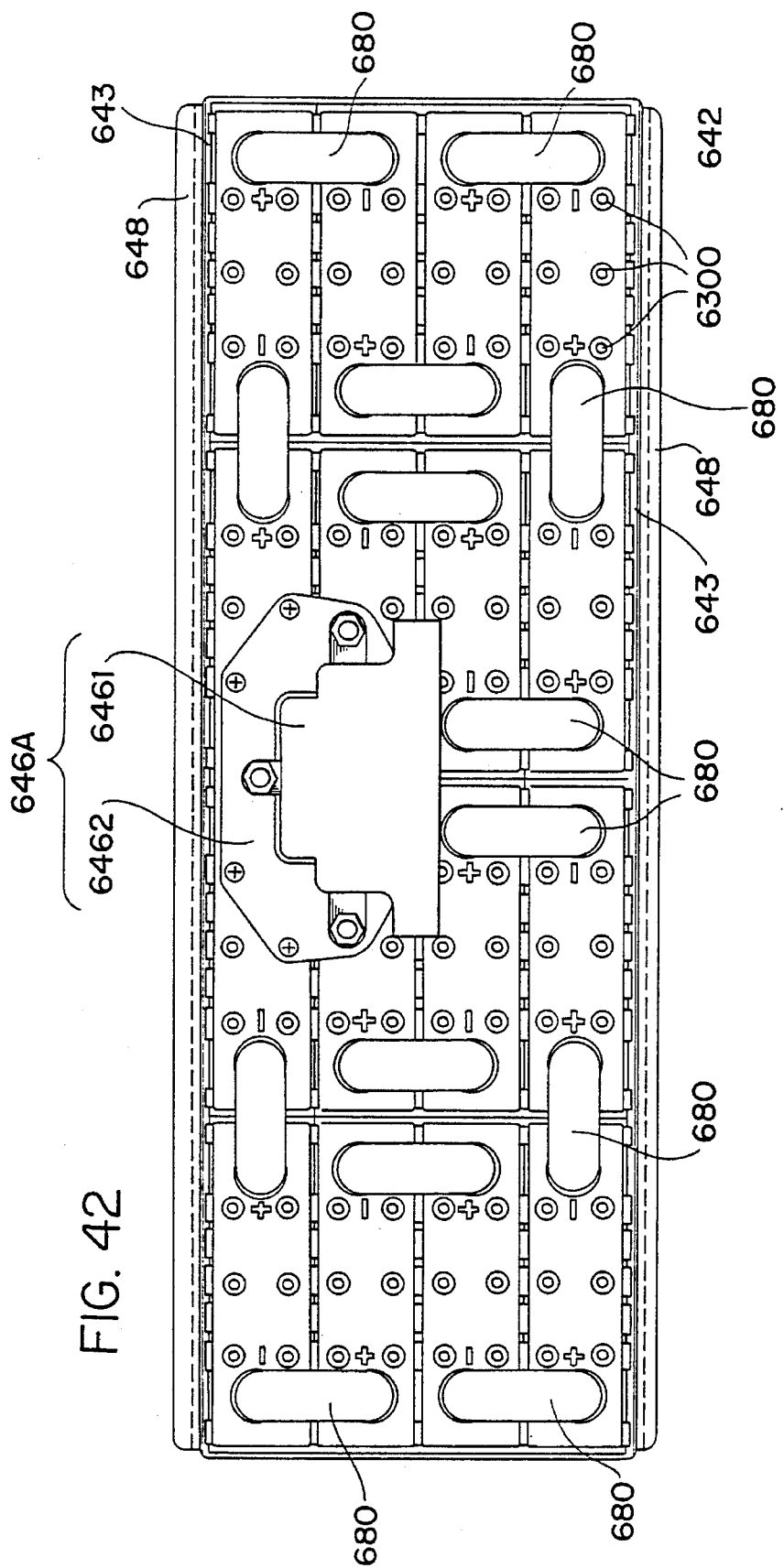
FIG. 42 is a top plan view of a battery group of FIG. 41.

FIG. 39 is a front elevational view of a battery cell which is another embodiment of the present invention. FIG. 40 is a sectional view taken along line 40—40 of FIG. 39. See FIGS. 42 and 43 for the stacking of the cells.

The present embodiment is characterized in that dovetail grooves 670D and tenons 670C for coupling to the dovetail grooves 670D are provided in place of the projections 642C and the annular projections 642D such that they are dovetailed, dovetail joined, to each other.

According to the present embodiment, if the battery cells 642 are placed one on top of another in the vertical direction such that the dovetail grooves 670D and the tenons 670C are fitted within each other, then the ribs 642A are opposed to each other so that air passageways are formed between each adjacent one of the battery cells 642.

Figure 52:
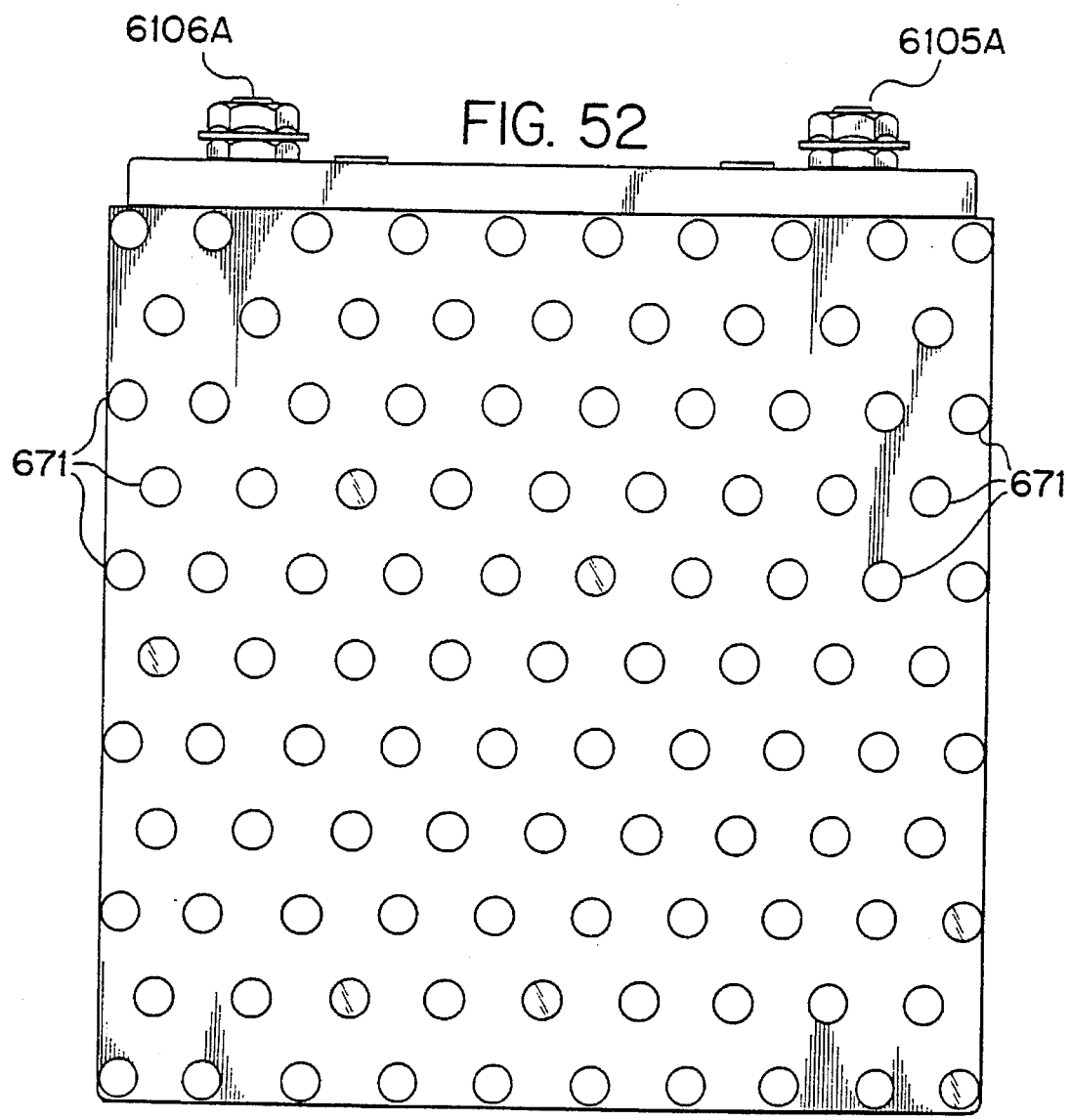
FIG. 52 is a front elevational view of a battery cell which is another embodiment of the present invention.
Figure 53:
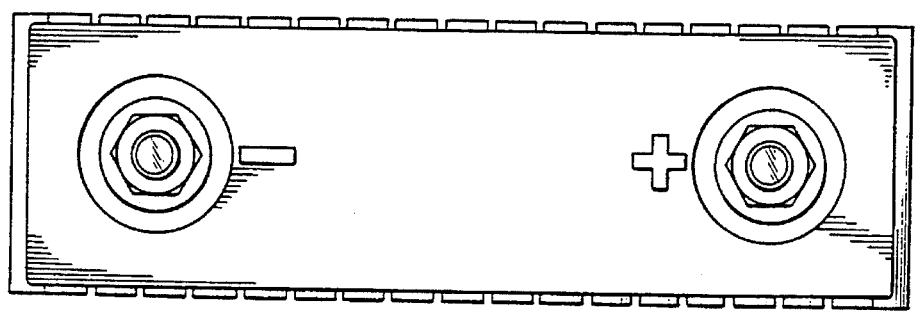
FIG. 53 is a top plan view of a battery cell of FIG. 52.

FIG. 52 is a front elevational view of a battery cell which is another embodiment of the present invention. FIG. 53 is a top plan view of the same.

The present embodiment is characterized in that a large number of tubular projections 671 are disposed in accordance with a fixed rule on the front face of each of the battery cells such that, when the battery cells are placed one on top of another, the tubular projections 671 are opposed to each other so that air passageways are formed between them.

Figure 54:
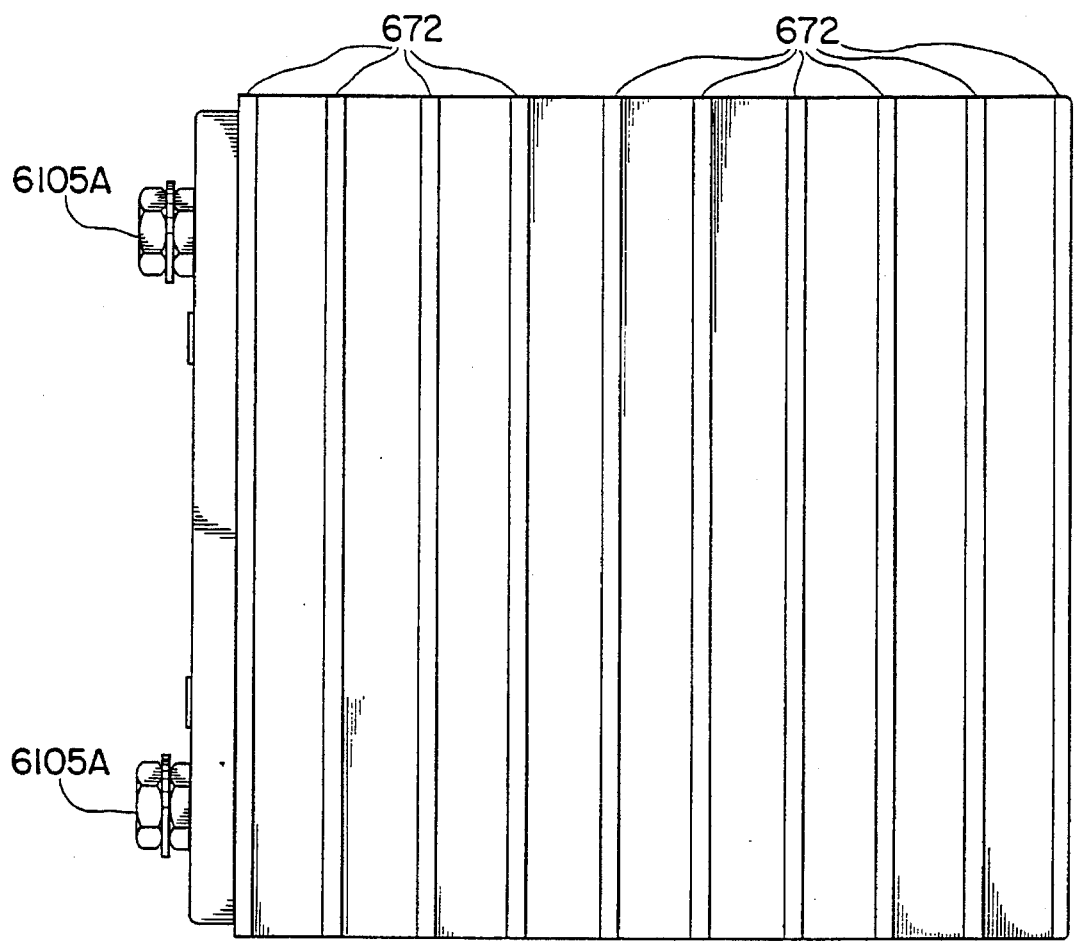
FIG. 54 is a front elevational view of a battery cell which is another embodiment of the present invention.
Figure 55:
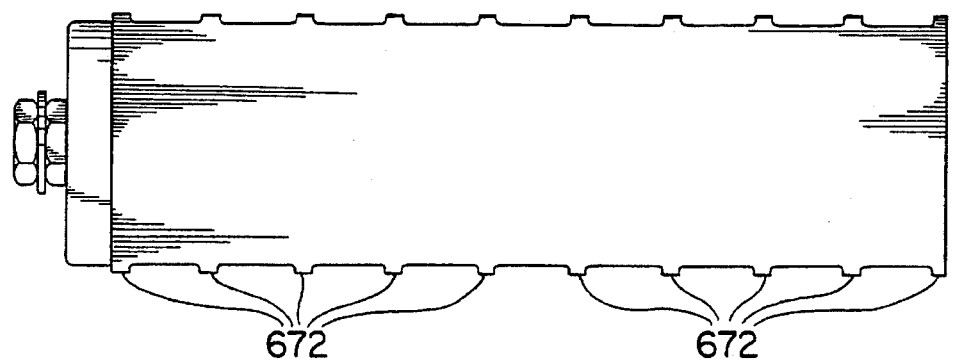
FIG. 55 is a side elevational view of the battery cell of FIG. 54.

FIG. 54 is a front elevational view of a battery cell which is another embodiment of the present invention. FIG. 55 is a side elevational view of the same.

The present embodiment is characterized in that a plurality of line-shaped ribs 672 are formed on the front face of each of the battery cells such that they extend from a side face to the other side face of the battery cell.

Also with the present embodiment, when the battery cells are placed on top of another, the ribs 672 are opposed to each other so that air passageways are formed between them.

Figure 56:
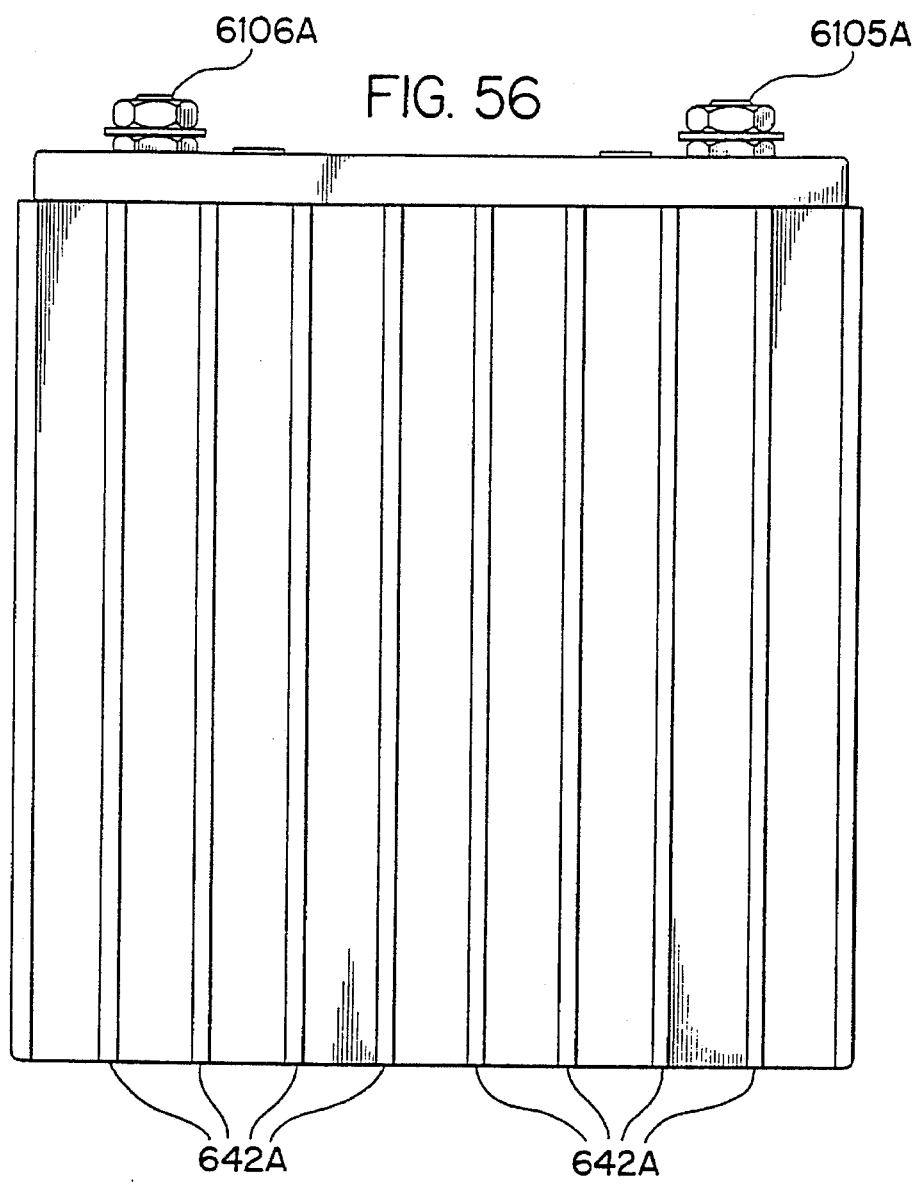
FIG. 56 is a front elevational view of a battery cell which is another embodiment of the present invention.
Figure 57:
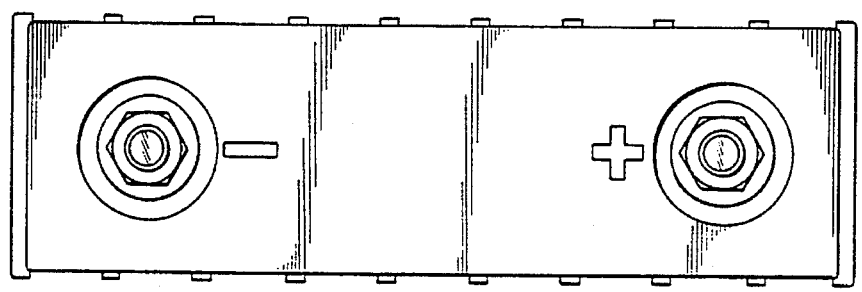
FIG. 57 is a top plan view of the battery cell of FIG. 56.

FIG. 56 is a front elevational view of a battery cell which is another embodiment of the present invention. FIG. 57 is a top plan view of the same.

The present embodiment is a modification to another embodiment described above and is characterized in that the ribs 642A are provided on all of the faces without provision of the positioning projections 642C and annular projections 642D. Also with the present embodiment, when the battery cells are placed one on top of another, the ribs 642A are opposed to each other so that air passageways are formed between them.

Figure 59:
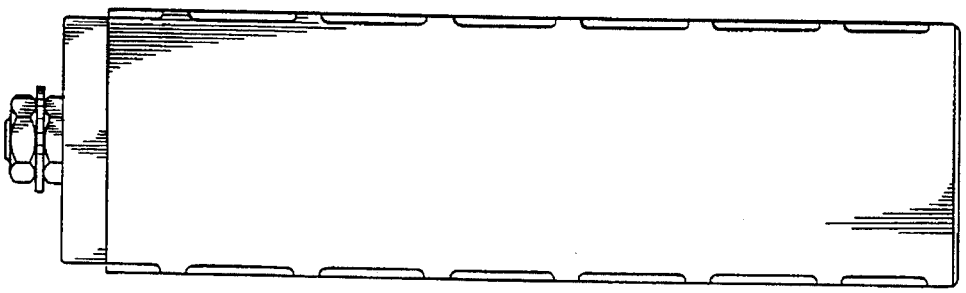
FIG. 59 is a top plan view of the battery cell of FIG. 58.
Figure 58:
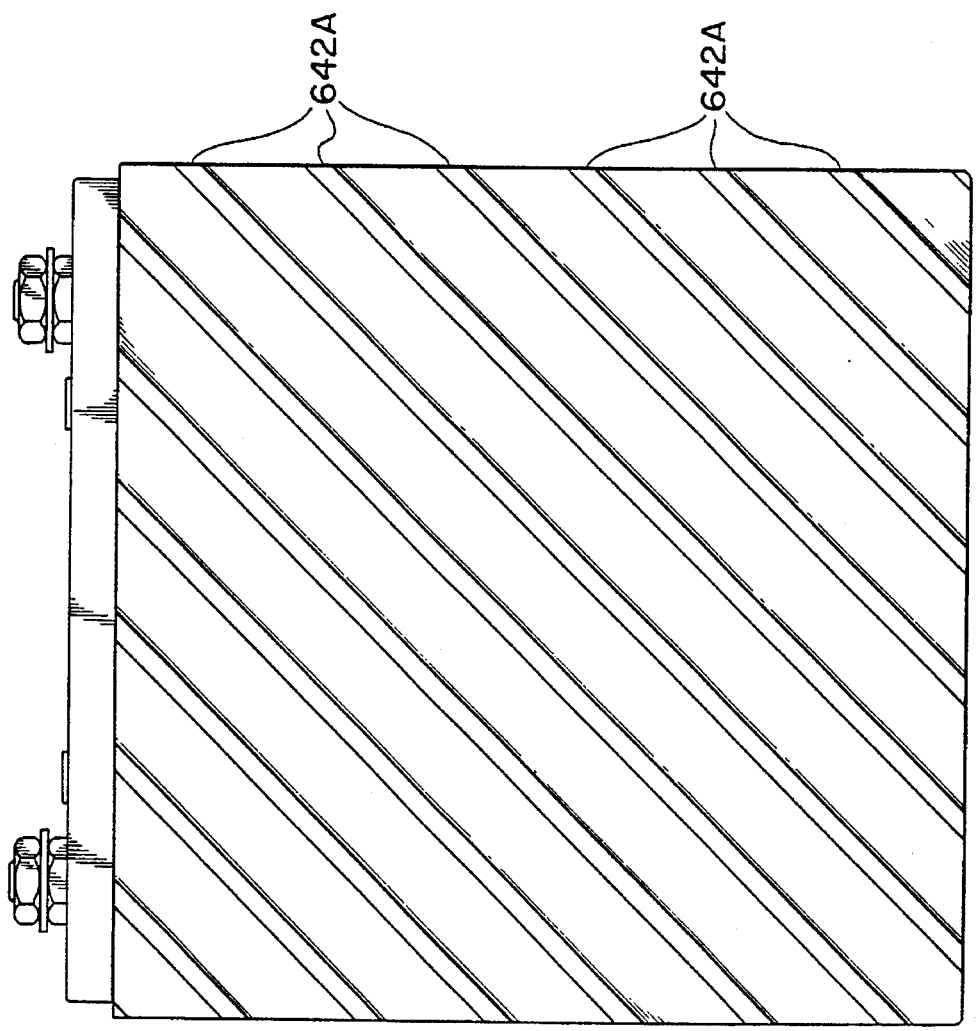
FIG. 58 is a front elevational view of a battery cell which is another embodiment of the present invention.

FIG. 58 is a front elevational view of a battery cell which is another embodiment of the present invention. FIG. 59 is a side elevational view of the same.

The present embodiment is characterized in that the ribs 642A are disposed obliquely. Also with the present embodiment, when battery cells are placed one on top of another, the ribs 642A are opposed to each other so that air passageways are formed between them.

Figure 60:
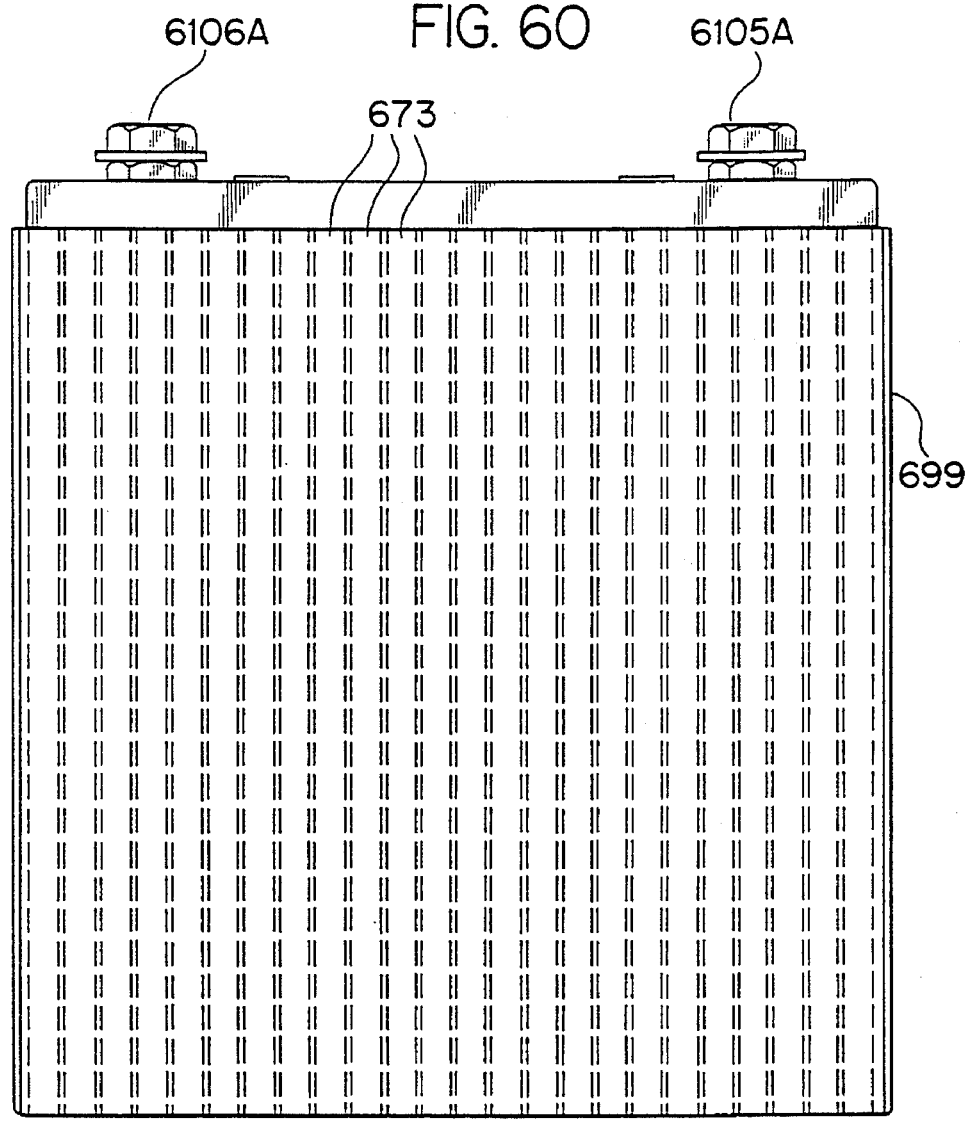
FIG. 60 is a front elevational view of a battery cell which is another embodiment of the present invention.
Figure 61:
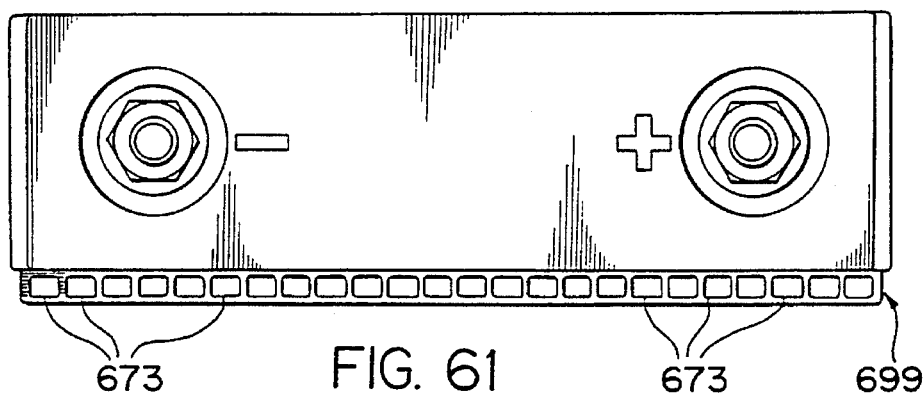
FIG. 61 is a side elevational view of the battery cell of FIG. 60.

It is to be noted that, while the individual embodiments described above are described such that ribs are provided on a battery cell body and such battery cell bodies are placed one on top of another such that the ribs may be opposed to each other to form air passageways, the individual battery cells may be placed one on top of another. For example, the plate-formed members 699 each have a large number of air duct passageways 673 as in another embodiment of the present invention shown in FIGS. 60 and 61. The plate-formed members 699 are preferably formed from a metal which is superior in heat radiating efficiency and has a sufficient strength such as aluminum.

If the structure is employed, then not only cooling air flows in the air ducts 673 to allow cooling of the batteries, but also it is possible to suppress such deformation caused by a rise in internal pressure of a battery cell as hereinafter described.

By the way, with such a secondary battery of the enclosed type as described above, it sometimes occurs that the internal pressure is varied by production of gas upon charging and/or discharging and consequently a cell case is deformed so that deterioration in performance of the battery occurs. Thus, in the embodiments of the present invention described below, a device for preventing deformation of a cell case is provided.

FIGS. 62(a) and 62(b) are sectional views showing the construction of another embodiment of the present invention. FIG. 62(a) is a transverse sectional view and FIG. 62(b) is a vertical sectional view.

The present embodiment is characterized in that an opening portion 6210 is formed at central portions of layered electrode plates 6201 such that the front face 642P and the rear face 642Q of the cell case are fastened commonly by a screw by way of the opening portion 6210.

Referring to FIG. 62(b), a tapping hub 6203 is formed on an inner side of the rear face 642Q of the cell case, and the electrode plates 6201 are accommodated in the cell case such that they are layered in such a manner that the tapping hub 6203 may be fitted in the opening portion 6210.

It is to be noted that, in order to allow the tapping hub 6203 to be inserted into the opening portion 6210 of the electrode plates 6201, the electrode plates 6201 are preferably inserted into the cell case in a vertical direction, the direction indicated by an arrow mark F in FIG. 62(b), with respect to the planes of the electrode plates 6201.

The front faces 642P and the rear faces 642Q of the cell case are contacted closely in a liquid-tight condition with each other at dowel grooves 6205 formed at end portions and portions thereof around the openings. An opening is formed at a portion of the front face 642P of the cell case opposing to the tapping hub 6203 of the rear face 642Q such that, by inserting a screw 6202 from the opening portion of the front face 642P and screwing the screw 6202 into the tapping hub 6203 of the rear face 642Q, the front face 642P and the rear face 642Q of the cell case are fastened together in a spaced condition from each other with a predetermined gap left therebetween.

According to the present embodiment, since the distance between the front face 642P and the rear face 642Q of the cell case are defined to a predetermined thickness, deformation of the cell case arising from a change in internal pressure of the cell case can be prevented.

FIGS. 63(a) and 63(b) are sectional views showing construction of another embodiment of the present invention, and similar reference characters to those described above denote similar or equivalent portions.

The present embodiment is characterized in that an opening is formed at two locations at central portions of electrode plates and the front face 642P and the rear face 642Q of the cell case are fastened together at the two locations. Similar effects to those described above can be achieved also with the present embodiment.

As describe, d above, according to the present invention, such effects as described below are achieved.

(1) Since the electrode plates 647 for connecting the battery cells 642 to each other are covered with the cocoon-shaped covers which can be removed and remounted independently of each other, removal of an electrode plate 647 upon exchanging of a battery cell is facilitated, and maintenance and repair of the battery are facilitated remarkably.

(2) Since the projections 642E are provided on the side faces of each of the battery cells and the first connecting plates 644 are engaged with the projections 642E to secure the cells, positioning and assembly of the cells are facilitated.

(3) Since the tapping hubs 6300 are formed on the upper face of each of the battery cells in symmetry with respect to the axis of the ordinate and the axis of the abscissa of the upper face of the battery cell, fixation of the connector 646A can be performed readily upon exchanging of a battery cell.

(4) Since the body portion 6461 and the base plate 6462 which constitute the connector 646A are combined with each other with the seal member 690 interposed therebetween, admission of rainwater or the like into the inside of the connector 646A is prevented.

(5) Since the front face 642P and the rear face 642Q of a cell case are screwed to each other in a spaced condition from each other with a predetermined gap left therebetween, deformation of the cell case arising from a change in internal pressure of the cell case can be prevented.

In such a wet type secondary battery of the type which has a separator and wherein liquid keeping paper is wound around each electrode to supply electrolyte to the group of electrodes as shown in FIG. 3, since the separator is a micro-cellular film and permeation of $H_2O$ therethrough is difficult, production or consumption of $H_2O$ upon charging or discharging is performed for each electrode. Accordingly, particularly at a last stage of charging, the nickel electrode side is put into a wet condition with $H_2O$ so that the hydrogen ion concentration of the electrolyte is decreased. Meanwhile, on the zinc electrode side, $H_2O$ is consumed, and mainly an outer peripheral portion of the electrode plate is put into a dry condition so that the hydrogen ion concentration is increased.

If such a phenomenon occurs, than at the nickel electrode, either dissolved zinc ions around the electrode plate become liable to be precipitated or $O_2$ gas or $H_2$ gas is produced by a large amount. On the other hand, on the zinc electrode side, a direct absorbing reaction of $H_2$ gas generated at the nickel electrode occurs on the outer peripheral portion of the electrode in a dry condition so that one-sided presence of an active material is caused, or a three-phase interface into which electrolyte, an active substance and $O_2$ gas come is put into an active condition so that an electrochemical imbalance comparing with any other portion occurs. Further, since the hydrogen ion concentration of electrolyte rises, dissolution of zinc is accelerated so that an active material is eluted from the electrode, the electrode is physically reduced in thickness so that the constructive pressure between the electrodes is decreased, and such phenomena which promote deterioration in capacity of the battery as deterioration in current collecting capacity of the nickel electrode and the zinc electrode, falling off of an active material, increase in internal resistance and temperature rise occur compositely.

On the other hand, if the liquid keeping layers 109 and 110 are provided between the group of electrodes and the cell case 42 and cell cover 112 as shown in FIG. 4, then movement of electrolyte can be moderated and withering of electrolyte can be prevented.

Figure 64:
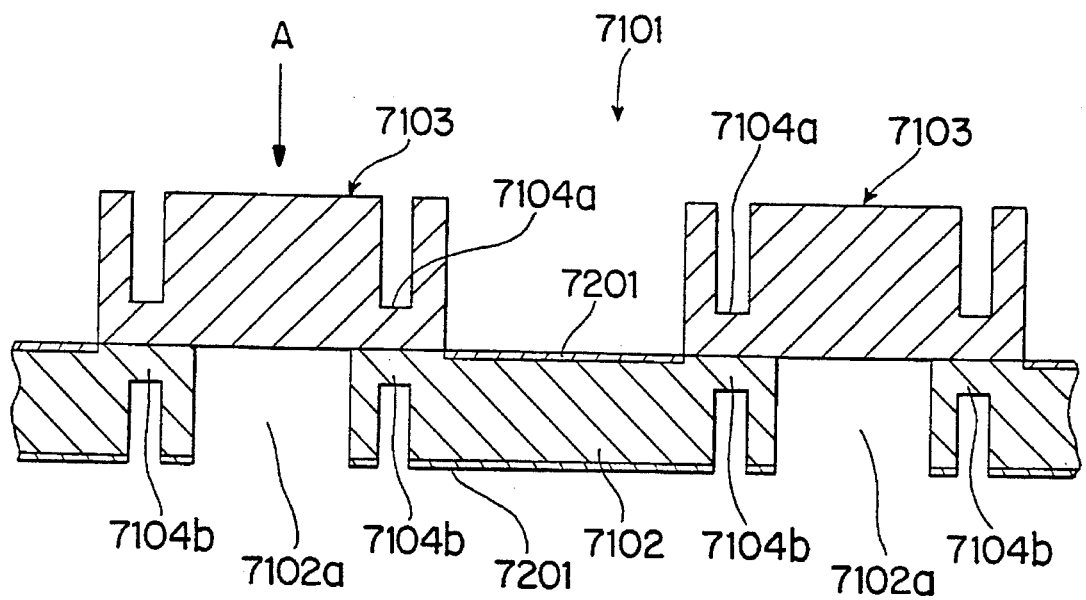
FIG. 64 is a plan view of a separator according to the present invention.
Figure 65:
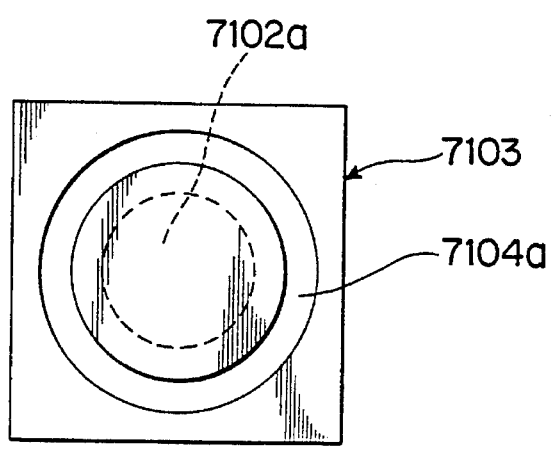
FIG. 65 is a view as viewed in the direction indicated by an arrow mark A in FIG. 64.

Here, further detailed construction and superiorities of such a wet type secondary battery which has a liquid complementing layer as shown in FIG. 4 will be described in detail. FIG. 64 is a partial vertical sectional view of a separator of the present invention, and FIG. 65 is a view as viewed in the direction of an arrow mark A in FIG. 64.

The hydrophilic ion permeable film 7102 is a micro-cellular porous film, and here it is composed of the trade name "Cellguard #3401" (produced by Daicel Kagaku Kogyo Kabushiki Kaisha) overlapped by two with each other. "Cellguard #3401" is a porous film made of polypropylene and has a thickness of 25 μm, a hole rate of 38% and a hole diameter of 0.05 to 0.125 μm. In other words, the thickness of the hydrophilic ion permeable film 7102 is 50 μm. And, processing with an interfacial active agent is applied to the hydrophilic ion permeable film 7102.

Cellulose which is an ion permeable resin is applied to the entire surface of the hydrophilic ion permeable film 7102. Though not shown, application of the cellulose 7201 is performed by applying viscose to the entire surface of the hydrophilic ion permeable film 7102 and decompressing the viscose to be impregnated into and solidified in the hydrophilic ion permeable film 7102.

The water repellent gas permeable films 7103 are each in the form of a micro-cellular porous film, and here, the trade name "Hipore 3100" (produced by Asahi Kasei Kogyo Kabushiki Kaisha) is employed. "Hipore 2100" is a porous film made of polyethylene. The thickness of the water repellent gas permeable films 7103 is 100 μm. Processing with an interfacial active agent is not performed for the water repellent gas permeable films 7103. In other words, the water repellent gas permeable films 7103 have a water repellency, hydrophobic property.

The water repellent gas permeable films 7103 have a square shape in plan and are applied by thermal or ultrasonic welding to a surface of the hydrophilic ion permeable film 7102 in such a manner as to close the opened portions 7102A. Reference character 7104a denotes a welding portion, and 7104b denotes a welded portion of the hydrophilic ion permeable film 7102.

The area of each of the water repellent gas permeable films 7103 is set to a value equal to or less than 20 mm$^2$, and here, a water repellent gas permeable film having a side of 4 mm is employed as such water repellent gas permeable film 7103. It is to be noted that the diameter of the opening portions 7102A is set to 3 mm. Each of the water repellent gas permeable films 7103 closes one of the opened portions 7102A, and the water repellent gas permeable films 7103 are provided such that they are distributed uniformly occupying, at faces thereof opposing to faces of the electrode plates, an area of 20% or less. In particular, the opening portions 7102A are formed taking it into consideration that the water repellent gas permeable films 7103 may be distributed in such a manner as described just above.

Figure 66:
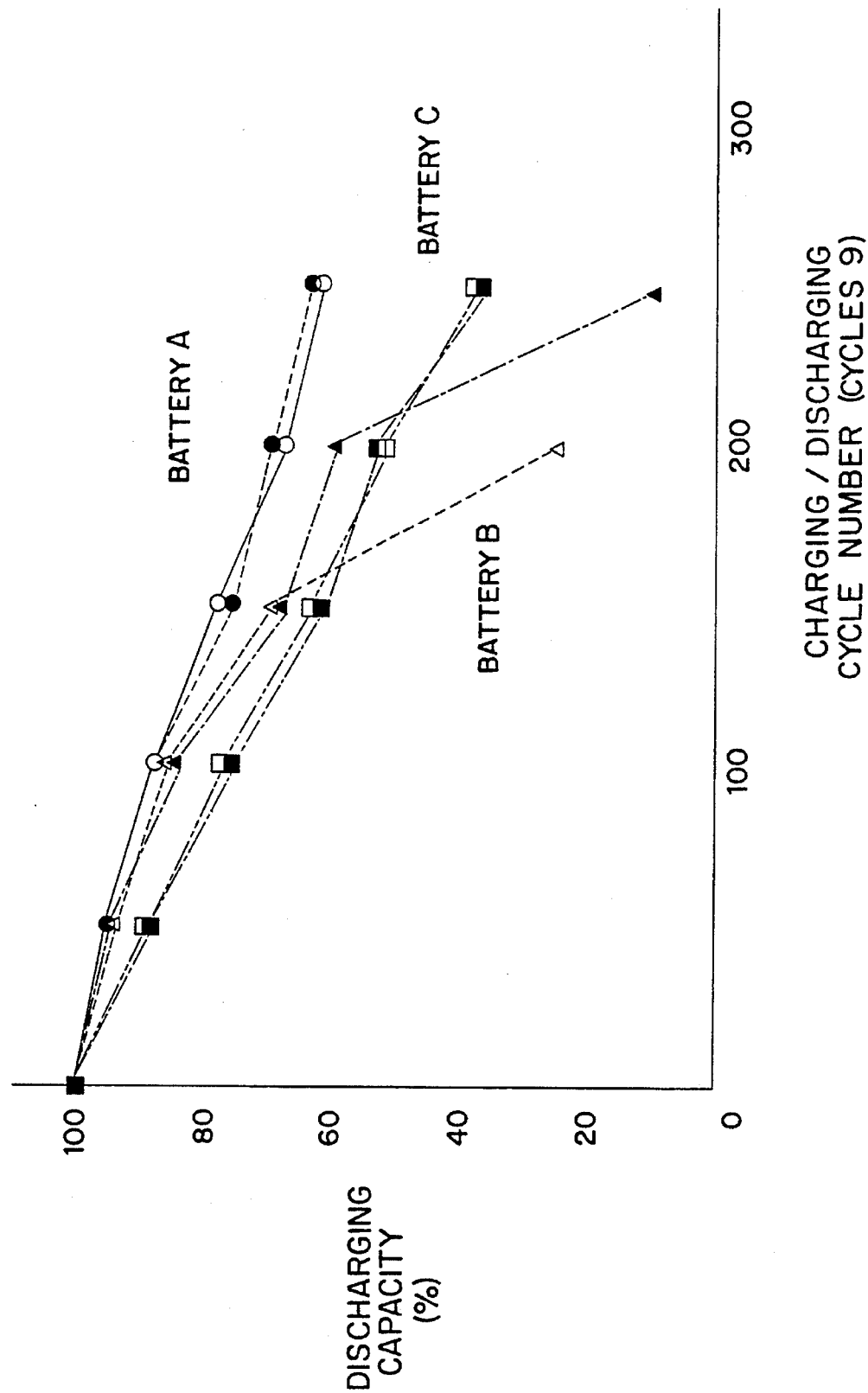
FIG. 66 is a view illustrating cycle life characteristics of a wet type secondary battery of the present invention and conventional wet type secondary batteries.

As illustrated in FIG. 66, the performance of the separator 7101 of the construction described above was examined in the following manner. First, a battery A which includes the separator 7101 having such construction as described above, another battery B which employs a separator formed from a mere micro-cellular porous film of polypropylene, and a further battery C which employs a separator which consists of a mere micro-cellular porous film of polypropylene and a cellophane film which is a semi-permeable membrane were prepared individually by two cells. The electrodes, liquid complementing layers and electrolyte constituting the batteries are all the same. In particular, the zinc electrode which is a negative electrode was produced by using a copper punched current collector in which a large number of holes were formed as a metal core and pressure applying a pair of active zinc sheets to the opposite faces of the metal core. Meanwhile, the nickel electrode which is a positive electrode was produced by filling a sintered nickel porous member with an active material consisting of nickel hydroxide as a principal component by a chemical impregnating method. Non-woven fabric made of polypropylene was employed for the liquid complementing layers. The electrolyte was aqueous solution of KOH having a specific gravity of 1.35. And, the nominal capacity of the batteries was 10 Ah.

Charging and discharging of the batteries A, B and C were repeated in accordance with the following conditions to investigate variations in capacity of them. Discharging was performed with 2 A till the point of time at which the voltage per cell became equal to 1 V. Charging was performed with 1 A and the charging rate was set to 105% of the discharging rate. It is to be noted that the closing voltage of the batteries A, B and c was 1.70 V, and the voltage upon discharging by 50% was 1.65 V. Results are illustrated in FIG. 66.

As seen from FIG. 66, with the battery A, even if the cycle is repeated, the reduction in capacity is little. With the battery B, since it consists of a micro-cellular porous film of polypropylene, absorption of gas is performed well and the reduction in capacity is substantially equal to that of the battery A, but since it is porous, short-circuiting is caused by a dendrite of zinc and the capacity is decreased suddenly. With the battery C, since cellophane is employed, absorption of gas is not performed well and the capacity is decreased.

As described so far, the separator 7101 is, since the cellulose 7201, ion permeable resin, is applied to the entire surface of the hydrophilic ion permeable film 7102, superior in persistency of the ion permeability compare to a separator in which only processing with an interfacial active agent is applied. Accordingly, at a portion of the hydrophilic ion permeable film 7102 to which the water repellent gas permeable films 7103 are not adhered, precipitation of ZnO is suppressed and dendrite short-circuiting of the battery can be prevented sufficiently.

Meanwhile, the water repellent gas permeable film 7103 has a water repellency since processing with an interfacial active agent is not applied thereto. Consequently, at a portion at which any of the water repellent gas permeable films 7103 is adhered, $O_2$ gas permeates well through the opening portions 7102A and the water repellent gas permeable films 7103, and the decrease of the capacity of the battery is suppressed. Besides, since the water repellent gas permeable films 7103 are distributed uniformly at faces thereof opposing to the faces of the electrode plates, absorption of $O_2$ gas is performed uniformly, and a variation in profile of the negative electrode can be reduced.

It is to be noted that, if the area of each of the water repellent gas permeable films 7103 is greater than 20 mm$_2$ and the area all of the water repellent gas permeable films 7103 occupy is greater than 20% at the faces thereof opposing to the faces of the electrode plates, the effective area of the zinc electrode is reduced, which is inappropriate.

It is to be noted that, while the water repellent gas permeable films 7103 are provided on only one face of the hydrophilic ion permeable film 7102 in the embodiment described above, they may be provided on both faces.

Figure 68:
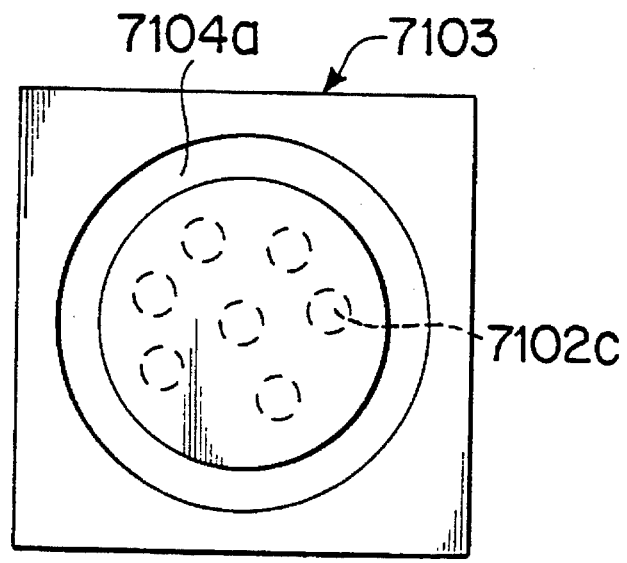
FIG. 68 is a plan view showing an example of an opened portion formed in the separator.
Figure 69:
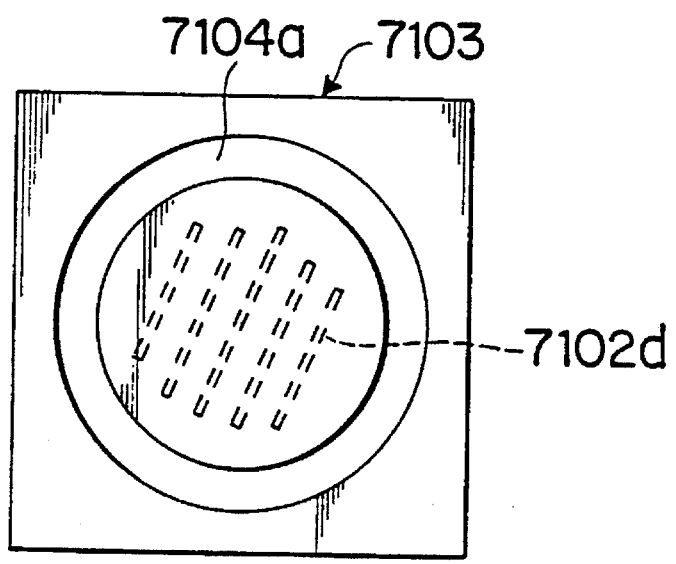
FIG. 69 is a plan view showing another example of an opened portion.

Further, while, in the embodiment described above, each of the opened portions 7102A closed by one water repellent gas permeable film 7103 is a single hole having a circular section, the present invention is not limited only to this, and it may be, for example, such a plurality of holes 7102C having a circular section as shown in FIG. 68 or such a plurality of slit-shaped holes 7102C as shown in FIG. 69. Naturally, the sectional shape is not limited to a circular shape but may be a polygonal shape.

Further, as a micro-cellular porous film employed for the hydrophilic ion permeable film 7102, a micro-cellular porous film made of polyethylene or nylon may be employed in place of a micro-cellular porous film made of polypropylene, and for an ion permeable resin, povar may be employed in place of cellulose.

It is to be noted that, while, in the embodiment shown in FIG. 4, the liquid complementing layer 109 is common to the electrodes, it is desirable to provide liquid complementing layers for individual liquid impenetrable paper sheets independently of each other as described in detail below in order to prevent short-circuiting arising from growth of crystal of zinc in the inside of the liquid complementing layer.

Figure 67:
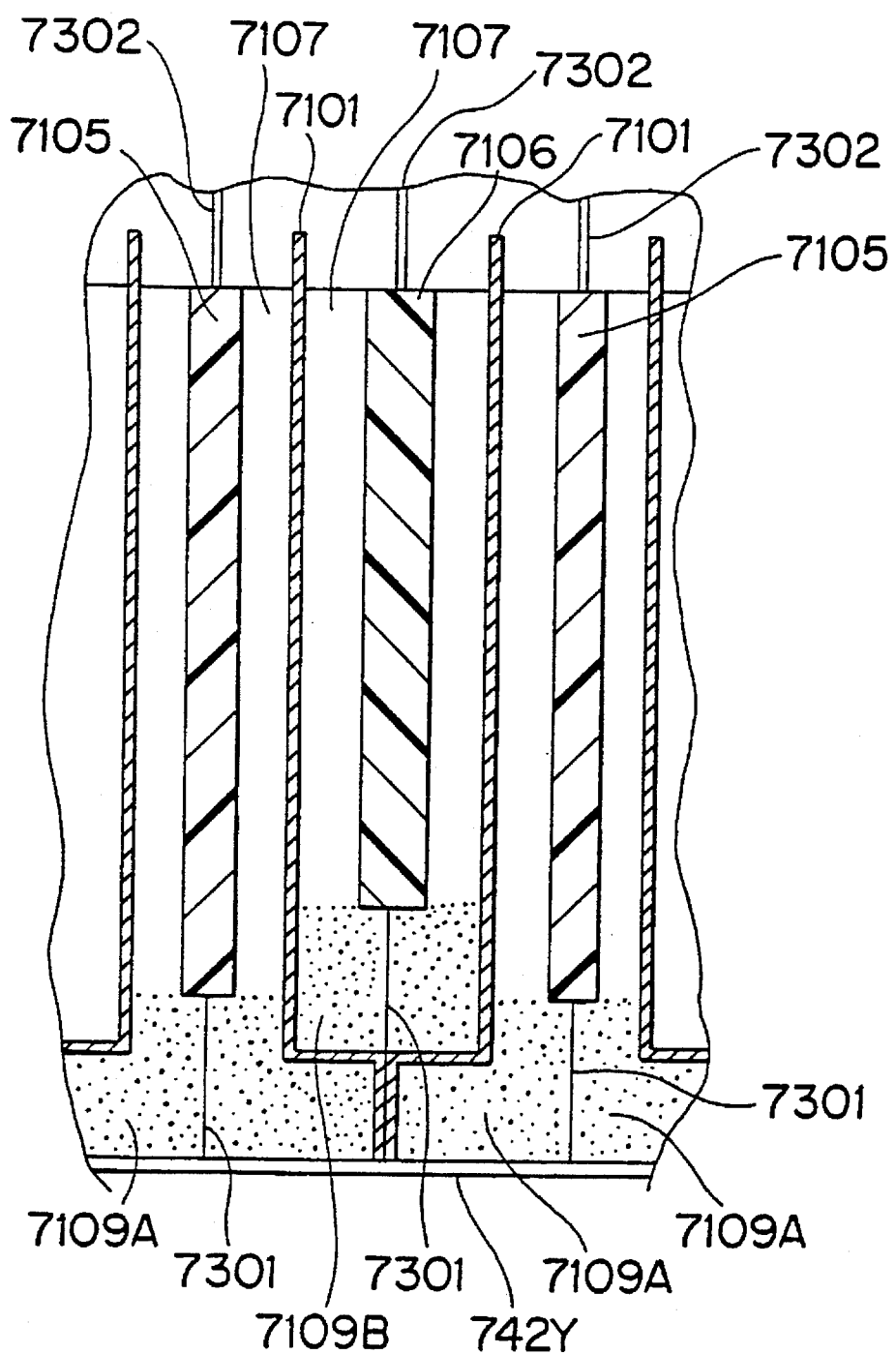
FIG. 67 is a plan view, partly broken, of a wet type secondary battery which is another embodiment of the present invention.

FIG. 67 is a view showing an internal structure of an embodiment wherein liquid complementing layers are provided for individual liquid keeping paper sheets independently of each other, and similar reference characters to those described above denote similar or equivalent portions.

Referring to FIG. 67, separators 7101 are extended to a cell case bottom portion 742Y and are securely mounted in a liquid-tight condition to the cell case bottom portion 742Y. The electrode plates 7105 and 7106 accommodated in regions partitioned by the separators 7101 are supported in a predetermined spaced relationship from the cell case bottom portion 742Y by suitable support members 7301. It is to be noted that the electrode plates 7105 and 7106 may be supported by current collecting bands 7301.

In each of the regions in which the electrode plates 7105 are accommodated, a gap portion between the cell case bottom portion 742Y and the electrode plate 7105 makes a liquid complementing layer 7109A, and in each of the regions in which the electrode plates 7106 are accommodated and part of the separator 7101 makes the bottom, a gap portion between the separator 7101 and the electrode plate 7106 makes a liquid complementing layer 7109B.

Each of the support members 7301 has a through-hole which makes a passageway for electrolyte in order to allow electrolyte to move between a region in which one of a pair of main faces of each of the electrode plates 7105 and 7106 is exposed and another region in which the other main face is exposed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An electric vehicle operable by utilizing power supplied from a chargeable battery, the electric vehicle comprising:

charging controller means for determiner a charging current and a charging voltage to be supplied to said chargeable battery and for outputting first information indicative of the determined charging current and charging voltage;

first storage for storing and outputting second information concerning characteristics of said chargeable battery; and second storage for storing and outputting a charging algorithm for charging said chargeable battery, said chargeable battery being charged with power supplied from a charging station, the charging power having charging current and charging voltage supplied in accordance with at least either one of the first information, the second information or the charging algorithm supplied from said charging controller means, said first storage and said second storage respectively.

2. The electric vehicle according to claim 1, said charging controller means comprising:

remaining capacity storage for storing therein remaining charge capacity information of said chargeable battery;

nominal capacity storage for storing therein nominal charge capacity information of said chargeable battery; and actual capacity storage for storing therein actual charge capacity information of said chargeable battery, the actual capacity information of said chargeable battery being supplied from the charging station, said remaining capacity information, nominal capacity information and actual capacity information being utilized for charging said chargeable battery.

3. A charging station for charging various types of chargeable batteries of electric vehicles comprising:

a transformer;

a rectifier;

a current regulator, said transformer, said rectifier and said current regulator being operatively connected relative to each other for supplying power from the charging station to a chargeable battery;

station controller means for determiner a charging current and a charging voltage based on information supplied relative to said chargeable battery for controlling a current of the power supplied to said chargeable battery during charging at the charging station; and ending time forecaster for forecasting a charging ending time using at least one of a nominal charge capacity and an actual charge capacity of said chargeable battery, a remaining charge capacity of said chargeable battery and a charging current value of the power supplied to said chargeable battery during charging.

4. The charging station according to claim 3, further comprising actual capacity detecting means for detecting an actual charge capacity of said chargeable battery in accordance with a charging capacity of said chargeable battery detected by charging capacity detecting means.

5. A charging station for simultaneously charging a plurality of chargeable batteries comprising:

a plurality of transformers;

a plurality of rectifiers;

a plurality of current regulators, said plurality of transformers, rectifiers and current regulators respectively being operatively connected relative to each other for supplying power from said charging station to said chargeable batteries;

station controller means for determiner a charging current and a charging voltage based on information supplied relative to each of said plurality of chargeable batteries for controlling a current of the power supplied to said plurality of chargeable batteries during charging at the charging station; and distribution switch means for selectively connecting outputs of said plurality of current regulators in accordance with an output of said station controller means to selectively control the current of the Dower supplied to said plurality of chargeable batteries.

6. The charging station according to claim 5, further comprising actual capacity detecting means for detecting an actual charge capacity of a corresponding one of said plurality of chargeable batteries in accordance with a charging capacity of the corresponding one of said plurality of chargeable batteries detected by charging capacity detecting means.

7. The charging station according to claim 5, further comprising ending time forecaster for forecasting a charging ending time for a corresponding one of said plurality of chargeable batteries using at least one of a nominal charge capacity and an actual charge capacity of the corresponding one of said plurality of chargeable batteries, a remaining charge capacity of the corresponding one of said plurality of chargeable batteries and a charging current value of the power supplied to the corresponding one of said plurality of chargeable batteries during charging.

8. An electric vehicle comprising:

a chargeable battery for powering the electric vehicle;

charging control means, coupled to said chargeable battery, for determiner a desired charging current value for charging of said chargeable battery in accordance with a battery voltage and a battery temperature of said chargeable battery and for outputting a charging current signal indicative of the desired charging current value to a charging station, the electric vehicle being removably coupled to the charging station; and storage for storing a charging algorithm for charging said chargeable battery and for outputting the charging algorithm to the charging station, the electric vehicle operable to receive charging power for said chargeable battery supplied from the charging station in accordance with at least either one of the charging current signal or the charging algorithm.

9. A charging station for charging electric vehicles, each of the electric vehicles having rechargeable batteries for providing vehicle power and storage means for storing and outputting vehicle information indicative of the respective electric vehicle, the charging station comprising:

vehicle information receiving means for receiving the vehicle information of an electric vehicle coupled to the charging station;

vehicle discriminating means, coupled to said vehicle information receiving means, for determiner vehicle type of the electric vehicle coupled to the charging station in accordance with the received vehicle information;

charging control means, coupled to said vehicle discriminating means, for selecting a charging method and current for charging the rechargeable battery of the electric vehicle coupled to the charging station in accordance with the determined vehicle type; and current regulating means, coupled to said charging control means, for generating and outputting a charging current for charging the rechargeable battery of the electric vehicle coupled to the charging station in accordance with the selected charging method and current.

10. The charging station of claim 9, further comprising display means, coupled to said current regulator means, for displaying the value of the charging power.

11. The charging station of claim 10, wherein said display means is a watt meter.

* * * * *